(12) United States Patent
Kanoh et al.

(10) Patent No.: US 11,570,432 B2
(45) Date of Patent: *Jan. 31, 2023

(54) ENCODER, DECODER, ENCODING METHOD, AND DECODING METHOD

(71) Applicant: Panasonic Intellectual Property Corporation of America, Torrance, CA (US)

(72) Inventors: Ryuichi Kanoh, Osaka (JP); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/141,440

(22) Filed: Jan. 5, 2021

(65) Prior Publication Data

US 2021/0127109 A1   Apr. 29, 2021

Related U.S. Application Data

(63) Continuation of application No. 16/450,066, filed on Jun. 24, 2019, now Pat. No. 10,917,641, which is a
(Continued)

(51) Int. Cl.
*H04N 19/117* (2014.01)
*H04N 19/136* (2014.01)
(Continued)

(52) U.S. Cl.
CPC ......... *H04N 19/117* (2014.11); *H04N 19/136* (2014.11); *H04N 19/159* (2014.11);
(Continued)

(58) Field of Classification Search
None
See application file for complete search history.

(56) References Cited

U.S. PATENT DOCUMENTS 6,539,060 B1 * 3/2003 Lee ............... H04N 19/117
                                               375/240.29
8,396,307 B2 * 3/2013 Nakagami ........... H04N 19/61
                                                  382/233
(Continued)

FOREIGN PATENT DOCUMENTS

EP    1 909 504 A1    4/2008
EP    1909504   A1 *  4/2008  ........... H04N 19/117
(Continued)

OTHER PUBLICATIONS

H.265 (ISO/IEC 23008-2 High Efficiency video coding (HEVC)), *International Standard*, Dec. 1, 2013, 312 pages.
(Continued)

*Primary Examiner* — Reza Aghevli
(74) *Attorney, Agent, or Firm* — Seed IP Law Group LLP

(57) ABSTRACT

A decoder includes a memory and processing circuitry. The processing circuitry, in operation, changes values of pixels in a first block and a second block to filter a boundary therebetween, using clipping such that change amounts of the respective values are within respective clip widths. The clip widths for the pixels in the first block and the second block are selected based on block sizes of the first block and the second block. The pixels in the first block include a first pixel located at a first position, and the pixels in the second block include a second pixel located at a second position corresponding to the first position with respect to the boundary. The clip widths include a first clip width and a second clip width corresponding to the first pixel and the second pixel, respectively, and the first clip width is different from the second width.

1 Claim, 48 Drawing Sheets

Related U.S. Application Data continuation of application No. PCT/JP2017/045911, filed on Dec. 21, 2017.

(60) Provisional application No. 62/439,237, filed on Dec. 27, 2016.

(51) Int. Cl.
| | |
|---|---|
| *H04N 19/159* | (2014.01) |
| *H04N 19/176* | (2014.01) |
| *H04N 19/182* | (2014.01) |
| *H04N 19/61* | (2014.01) |
| *H04N 19/82* | (2014.01) |

(52) U.S. Cl.
CPC ......... *H04N 19/176* (2014.11); *H04N 19/182* (2014.11); *H04N 19/61* (2014.11); *H04N 19/82* (2014.11)

(56) References Cited

U.S. PATENT DOCUMENTS

| | | | | |
|---|---|---|---|---|
| 8,526,509 | B2* | 9/2013 | Norkin | H04N 19/82 |
| | | | | 375/240.29 |
| 8,761,538 | B2 | 6/2014 | Pereira et al. | |
| 8,805,100 | B2* | 8/2014 | Ikai | G06T 9/004 |
| | | | | 384/233 |
| 8,855,434 | B2* | 10/2014 | Sato | H04N 19/80 |
| | | | | 382/233 |
| 9,083,978 | B2* | 7/2015 | Narroschke | H04N 19/105 |
| 9,118,925 | B2* | 8/2015 | Narroschke | H04N 19/15 |
| 9,167,267 | B2* | 10/2015 | Sato | H04N 19/157 |
| 9,253,506 | B2* | 2/2016 | Sato | H04N 19/44 |
| 9,407,912 | B2* | 8/2016 | Norkin | H04N 19/176 |
| 9,503,749 | B2* | 11/2016 | Narroschke | H04N 19/13 |
| 9,749,654 | B2* | 8/2017 | Narroschke | H04N 19/124 |
| 10,917,641 | B2* | 2/2021 | Kanoh | H04N 19/117 |
| 2004/0076237 | A1* | 4/2004 | Kadono | H04N 19/61 |
| | | | | 375/240.29 |
| 2007/0147515 | A1* | 6/2007 | Kawashima | H04N 19/156 |
| | | | | 375/E7.135 |
| 2010/0080472 | A1* | 4/2010 | Asano | H04N 19/176 |
| | | | | 382/248 |
| 2010/0142835 | A1* | 6/2010 | Nakagami | H04N 19/159 |
| | | | | 382/233 |
| 2010/0142844 | A1 | 6/2010 | Pereira et al. | |
| 2012/0093217 | A1* | 4/2012 | Jeon | H04N 19/51 |
| | | | | 375/240.02 |
| 2013/0003865 | A1* | 1/2013 | Norkin | H04N 19/865 |
| | | | | 375/E7.193 |
| 2013/0028531 | A1* | 1/2013 | Sato | H04N 19/117 |
| | | | | 382/233 |
| 2013/0294525 | A1 | 11/2013 | Norkin et al. | |
| 2013/0322548 | A1* | 12/2013 | Narroschke | H04N 19/117 |
| | | | | 375/240.24 |
| 2014/0050272 | A1* | 2/2014 | Norkin | H04N 19/176 |
| | | | | 375/240.29 |
| 2014/0056350 | A1* | 2/2014 | Wedi | H04N 19/50 |
| | | | | 375/240.12 |
| 2014/0133564 | A1 | 5/2014 | Lim et al. | |
| 2014/0140416 | A1* | 5/2014 | Yamazaki | H04N 19/44 |
| | | | | 375/240.25 |
| 2014/0233659 | A1* | 8/2014 | Narroschke | H04N 19/15 |
| | | | | 375/240.29 |
| 2014/0355670 | A1* | 12/2014 | Sato | H04N 19/60 |
| | | | | 375/240.02 |
| 2014/0355696 | A1* | 12/2014 | Sato | H04N 19/176 |
| | | | | 375/240.29 |
| 2015/0016541 | A1* | 1/2015 | Narroschke | H04N 19/124 |
| | | | | 375/240.24 |
| 2015/0281731 | A1* | 10/2015 | Kadono | H04N 19/159 |
| | | | | 375/240.27 |
| 2015/0326877 | A1* | 11/2015 | Narroschke | H04N 19/55 |
| | | | | 375/240.12 |
| 2016/0044312 | A1 | 2/2016 | Sato | |
| 2016/0142739 | A1* | 5/2016 | Norkin | H04N 19/82 |
| | | | | 375/240.29 |
| 2017/0048548 | A1* | 2/2017 | Narroschke | H04N 19/593 |
| 2017/0324977 | A1* | 11/2017 | Narroschke | H04N 19/44 |
| 2018/0160113 | A1* | 6/2018 | Jeong | H04N 19/593 |
| 2019/0052895 | A1 | 2/2019 | Narroschke et al. | |

FOREIGN PATENT DOCUMENTS

| | | | | |
|---|---|---|---|---|
| EP | 1 909 504 | A4 | 3/2011 | |
| EP | 1909504 | A4 * | 3/2011 | ........... H04N 19/117 |
| EP | 2 574 055 | A1 | 3/2013 | |
| EP | 2574055 | A1 * | 3/2013 | ........... H04N 19/117 |
| EP | 2 574 055 | A4 | 4/2017 | |
| EP | 2574055 | A4 * | 4/2017 | ........... H04N 19/117 |
| JP | 2007-180767 | A | 7/2007 | |
| JP | 2010-141883 | A | 6/2010 | |
| KR | 10-2010-0007728 | A | 1/2010 | |
| KR | 20100007728 | A * | 1/2010 | ........... H04N 19/00 |
| KR | 10-1552639 | B1 | 9/2015 | |
| KR | 101552639 | B1 * | 9/2015 | ........... H04N 19/00 |
| WO | 2007/013437 | A1 | 2/2007 | |
| WO | WO-2007013437 | A1 * | 2/2007 | ........... H04N 19/117 |
| WO | 2010/005269 | A1 | 1/2010 | |
| WO | WO-2010005269 | A1 * | 1/2010 | ........... H04N 19/00 |
| WO | 2011/145601 | A1 | 11/2011 | |
| WO | WO-2011145601 | A1 * | 11/2011 | ........... H04N 19/117 |

OTHER PUBLICATIONS

International Search Report, dated Mar. 20, 2018, for corresponding International Application No. PCT/JP2017/045911, 4 pages.
Korean Notification of Reason for Refusal dated Sep. 18, 2020, for the corresponding Korean Patent Application No. 10-2019-7017806, 17 pages. (With English Translation).
The Extended European Search Report, dated Apr. 15, 2020, for the related European Patent Application No. 17886479.9, 10 pages.
Video/JVET, "Algorithm Description of Joint Exploration Test Model 1 (JEM 1)", *International Organization for Standardization Organisation Internationale De Normalisation ISO/IEC JTC1/SC29/WG11 Coding of Moving Pictures and Audio*, ISO/IEC JTC1/SC29/WG11/N15790, Oct. 2015, Geneva, CH, 28 pages.
Indian Examination Report dated Mar. 24, 2021, for the corresponding Indian Patent Application No. 201947025632, 7 pages.

\* cited by examiner

FIG. 3

| TRANSFORM TYPE | BASIS FUNCTION $T_i(j)$, $i, j = 0, 1, ..., N - 1$ |
|---|---|
| DCT - II | $T_i(j) = \omega_0 \cdot \sqrt{\dfrac{2}{N}} \cdot \cos\left(\dfrac{\pi \cdot i \cdot (2j + 1)}{2N}\right)$<br>WHERE $\omega_0 = \begin{cases} \sqrt{\dfrac{2}{N}} & i = 0 \\ 1 & i \neq 0 \end{cases}$ |
| DCT - V | $T_i(j) = \omega_0 \cdot \omega_1 \cdot \sqrt{\dfrac{2}{2N - 1}} \cdot \cos\left(\dfrac{2\pi \cdot i \cdot j}{2N - 1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT - VIII | $T_i(j) = \sqrt{\dfrac{4}{2N + 1}} \cdot \cos\left(\dfrac{\pi \cdot (2i + 1) \cdot (2j + 1)}{4N + 2}\right)$ |
| DST - I | $T_i(j) = \sqrt{\dfrac{2}{N + 1}} \cdot \sin\left(\dfrac{\pi \cdot (i + 1) \cdot (j + 1)}{N + 1}\right)$ |
| DST - VII | $T_i(j) = \sqrt{\dfrac{4}{2N + 1}} \cdot \sin\left(\dfrac{\pi \cdot (2i + 1) \cdot (j + 1)}{2N + 1}\right)$ |

ENCODER, DECODER, ENCODING METHOD, AND DECODING METHOD

CROSS REFERENCE TO RELATED APPLICATIONS

This is a continuation application of U.S. application Ser. No. 16/450,066, filed Jun. 24, 2019, which is a continuation application of PCT International Application No. PCT/JP2017/045911 filed on Dec. 21, 2017, designating the United States of America, which is based on and claims priority of U.S. Patent Application No. 62/439,237 filed on Dec. 27, 2016. The entire disclosures of the above-identified applications, including the specifications, drawings and claims are incorporated herein by reference in their entirety.

BACKGROUND

1. Technical Field

The present disclosure relates to an encoder, a decoder, an encoding method, and a decoding method.

2. Description of the Related Art

A video coding standard called high-efficiency video coding (HEVC) has been standardized by Joint Collaborative Team on Video Coding (JCT-VC). See H.265 (ISO/IEC 23008-2 HEVC)/HEVC (High Efficiency Video Coding).

SUMMARY

According to one aspect of the present disclosure, an encoder includes processing circuitry; and a memory coupled to the processing circuitry. Using the memory, the processing circuitry is configured to: change values of pixels in a first block and a second block to filter the boundary between the first block and the second block such that change amounts of the respective values are smaller than respective thresholds, the pixels being arranged along a line across the boundary; and encode a third block by referring to at least one of the first block or the second block after the boundary is filtered. The pixels in the first block include a first pixel located at a first position, and the pixels in the second block include a second pixel located at a second position corresponding to the first position with respect to the boundary. The thresholds include a first threshold and a second threshold corresponding to the first pixel and the second pixel, respectively. The first threshold is different from the second threshold.

BRIEF DESCRIPTION OF DRAWINGS

FIG. 3 is a chart indicating transform basis functions for each transform type;

DETAILED DESCRIPTION OF THE EMBODIMENTS

Figure 1:
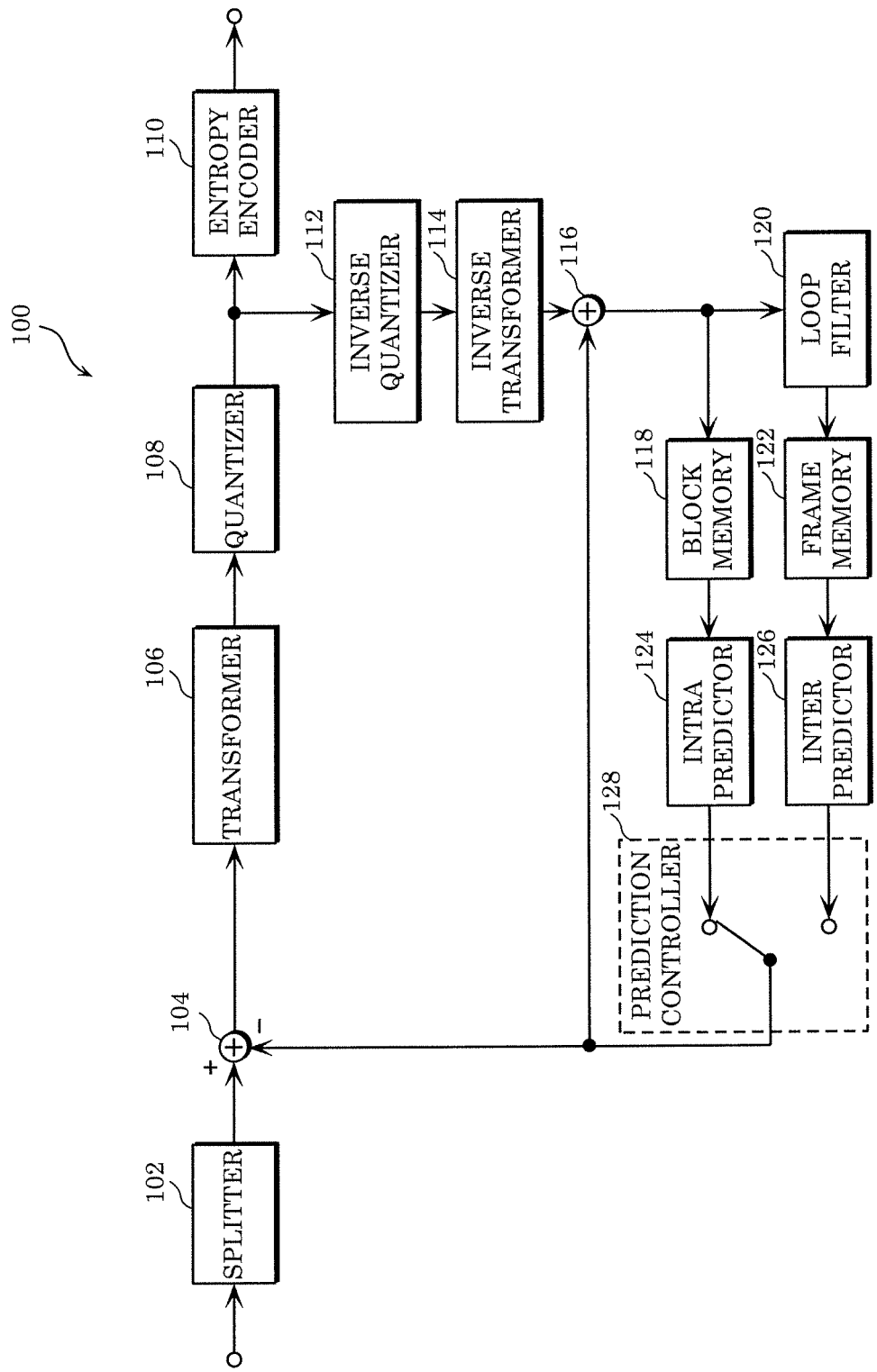
FIG. 1 is a block diagram illustrating a configuration of an encoder according to Embodiment 1.

An encoder according to an aspect of the present disclosure includes: processing circuitry; and memory. Using the memory, for each of blocks each including a plurality of pixels, the processing circuitry: transforms, using a basis, the block into a block including a plurality of transform coefficients; for each of the blocks each including the plurality of transform coefficients, performs at least inverse transform on the block to reconstruct a block including a plurality of pixels; based on a combination of bases respectively used to transform two blocks which neighbor each other and have been reconstructed, determines a filter characteristic for a boundary between the two blocks; and performs, on the boundary, deblocking filtering with the filter characteristic determined.

An error distribution around a boundary between two blocks neighboring each other varies according to a combination of bases used to transform the two blocks. For example, transform of the two blocks may cause a large error in one of the two blocks around the boundary but may cause a small error around the boundary in the other block. It is to be noted that each error is the difference between the pixel value of an original image or an input image and the pixel value of a reconstructed image. When deblocking filtering with a symmetrical filter characteristic is performed on the boundary in such a case, the pixel value having the small difference may be significantly affected by the pixel value of the pixel having the large error. In other words, there is a possibility that errors cannot be sufficiently reduced. In view of this, an encoder according an aspect of the present disclosure determines a filter characteristic for the boundary between two blocks which neighbor each other and have been reconstructed, based on a combination of bases respectively used to transform the two blocks. In this way, for example, an asymmetrical filter characteristic can be determined for the boundary. As a result, even when errors vary around the boundary between the two blocks as described above, it is possible to increase the possibility of reducing the errors by performing, on the boundary, deblocking filtering with the asymmetrical filter characteristic.

In addition, when determining the filter characteristic, the processing circuitry may determine, as the filter characteristic, a smaller filter coefficient for a pixel which is located at a position at which an amplitude of a basis used to transform the block is larger.

For example, a pixel located at a position at which an amplitude of a basis is larger is likely to have a pixel value with a larger error. The encoder according to an aspect of the present disclosure determines a small filter coefficient for the pixel having the pixel value with the large error. Accordingly, deblocking filtering with such filter coefficients further reduces influence of the pixel value with the large error onto the pixel value with the small error. In short, the deblocking filtering further increases the possibility of error reduction.

In addition, the amplitude of the basis may be an amplitude of a zero-order basis.

A lower-order basis affects errors more significantly. Accordingly, it is possible to further increase the possibility of error reduction by determining a small filter coefficient for a pixel located at a position at which an amplitude of a zero-order basis is larger.

In addition, the two blocks may be composed of a first block and a second block located to a right of or below the first block, and when determining the filter characteristic. When a basis used to transform the first block is a first basis, and a basis used to transform the second block is a second basis, based on the first basis and the second basis, the processing circuitry may determine, as the filter characteristic, each of a first filter coefficient for a pixel located around the boundary in the first block and a second filter coefficient for a pixel located around the boundary in the second block. For example, when determining the filter characteristic, the processing circuitry: when the first basis and the second basis are of DST-VII (DST denotes discrete sine transform), may determine, as the filter coefficient, the second filter coefficient which is larger than the first filter coefficient.

In the case where the first basis and the second basis are of DST-VII, it is highly likely that an error in a first block around a boundary is large and an error in a second block around the boundary is small. Accordingly, it is possible to further increase the possibility of reducing errors appropriately around the boundary by determining a second filter coefficient which is larger than a first filter coefficient in such a case and performing deblocking filtering with the first and second filter coefficients.

In addition, when determining the filter characteristic, when the first basis and the second basis are of DCT-II (DCT denotes discrete cosine transform), the processing circuitry may determine, as the filter coefficient, the second filter coefficient which is equal to the first filter coefficient.

In the case where the first basis and the second basis are of DCT-II, it is highly likely that an error in a first block around a boundary and an error in a second block around the boundary are equal to each other. Accordingly, it is possible to further increase the possibility of reducing errors appropriately around the boundary by determining a second filter coefficient which is equal to a first filter coefficient in such a case and performing deblocking filtering with the first and second filter coefficients.

In addition, when determining the filter characteristic, when the first basis and the second basis are of DST-VII (DST denotes discrete sine transform), and a size of the second block is smaller than a size of the first block, the processing circuitry may determine, as the filter coefficient, the second filter coefficient which is larger than the first filter coefficient. A filter coefficient gradient between the first filter coefficient and the second filter coefficient is gentler than a filter coefficient gradient in the case where the first block and the second block are equal in size.

In the case where the first basis and the second basis are of DST-VII and the size of the second block is smaller than the size of the first block, it is likely that an error in the first block around the boundary is large and an error in the second block around the boundary is at a medium level. In other words, it is likely that an error distribution between the first block and the second block around the boundary has a gentle gradient.

An encoder according to an aspect of the present disclosure determines the second filter coefficient which is larger than the first filter coefficient in such a case, and performs deblocking filtering with the first and second filter coefficients. Here, the determined filter coefficient gradient between the first filter coefficient and the second filter coefficient is gentler than in the case where the first block and the second block are equal in size. Accordingly, even when the error distribution around the boundary between the first block and the second block has a gentle gradient, it is possible to increase the possibility of reducing errors appropriately around the boundary.

In addition, when determining the filter characteristic, based on a combination of bases for the first block and the second block, the processing circuitry may further determine, as the filter characteristic, each of a first threshold value for the first block and a second threshold value for the second block; and when performing the deblocking filtering, the processing circuitry may: perform a calculation using the first filter coefficient and the second filter coefficient on a pixel value of a current pixel to obtain a calculated pixel value of the current pixel; determine whether an amount of change from a to-be-calculated pixel value of the current pixel to a calculated pixel value of the current pixel is larger than one of the first threshold value and the second threshold value which is for a block to which the current pixel belongs among the first block and the second block; and when the amount of change is larger than the threshold value for the block, clip the calculated pixel value of the current pixel to a sum of or a difference between the to-be-calculated pixel value of the current pixel and the threshold value for the block.

In this way, when the amount of change between the to-be-calculated pixel value of the current pixel and the calculated pixel value is larger than the threshold value, the calculated pixel value of the current pixel is clipped to the sum of or the difference between the to-be-calculated pixel value of the current pixel and the threshold value. Thus, it is possible to prevent the pixel value of the current pixel from being changed significantly by the deblocking filtering. In addition, the first threshold value for the first block and the second threshold value for the second block are determined based on the combination of bases for the first block and the second block. Accordingly, for each of the first block and the second block, it is possible to determine a large threshold value for a pixel located at a position at which the amplitude of a basis is large, that is, a pixel having a large error, and determine a small threshold value for a pixel located at a position at which the amplitude of a basis is small, that is a pixel having a small error. As a result, the deblocking filtering makes it possible to allow the pixel value of the pixel having the large error to change significantly and prohibit the pixel value of the pixel having the small error from changing significantly. Accordingly, it is further increase the possibility of reducing errors appropriately around the boundary between the first block and the second block.

In addition, using the memory, based on block sizes of a first block and a second block neighboring the first block, the processing circuitry may: determine a filter characteristic for a boundary between the first block and the second block; and perform, on the boundary, deblocking filtering with the filter characteristic determined. For example, when determining the filter characteristic, the processing circuitry may: define, as the filter characteristic, each of a first filter coefficient for a pixel around the boundary in the first block and a second filter coefficient for a pixel around the boundary in the second block; and determine, as the filter characteristic, the second filter coefficient which is larger than the first filter coefficient, when a size of the second block is smaller than a size of the first block.

In this way, for example, an asymmetrical filter characteristic can be determined for the boundary according to the difference in block size. As a result, even when errors vary around the boundary between two blocks as described above, it is possible to increase the possibility of reducing errors by performing deblocking filtering with the asymmetrical filter characteristic.

A decoder according to an aspect of the present disclosure includes: processing circuitry; and memory. Using the memory, for each of blocks each including a plurality of transform coefficients obtained by transform using a basis, the processing circuitry: performs at least inverse transform on the block to reconstruct a block including a plurality of pixels; based on a combination of bases respectively used to transform two blocks which neighbor each other and have been reconstructed, determines a filter characteristic for a boundary between the two blocks; and performs, on the boundary, deblocking filtering with the filter characteristic determined.

An error distribution around a boundary between two blocks neighboring each other varies according to a combination of bases used to transform the two blocks. For example, transform of the two blocks may cause a large error in one of the two blocks around the boundary but may cause a small error in the other block. It is to be noted that each error is the difference between the pixel value of an original image or an input image and the pixel value of a reconstructed image. When deblocking filtering with a symmetrical filter characteristic is performed on the boundary in such a case, the pixel value having the small difference may be significantly affected by the pixel value of the pixel having the large error. In other words, there is a possibility that errors cannot be sufficiently reduced. In view of this, a decoder according an aspect of the present disclosure determines a filter characteristic for the boundary between two blocks which neighbor each other and have been reconstructed, based on a combination of bases respectively used to transform the two blocks. In this way, for example, an asymmetrical filter characteristic can be determined for the boundary. As a result, even when errors vary around the boundary between the two blocks as described above, it is possible to increase the possibility of reducing the errors by performing deblocking filtering with the asymmetrical filter characteristic.

In addition, when determining the filter characteristic, the processing circuitry may determine, as the filter characteristic, a smaller filter coefficient for a pixel which is located at a position at which an amplitude of a basis used to transform the block is larger.

For example, a pixel located at a position at which the amplitude of a basis is larger is likely to have a pixel value with a larger error. The decoder according to an aspect of the present disclosure determines a small filter coefficient for the pixel having the pixel value with the large error. Accordingly, deblocking filtering with such filter coefficients further reduces influence of the pixel value with the large error onto the pixel value with the small error. In short, the deblocking filtering further increases the possibility of error reduction.

In addition, the amplitude of the basis may be an amplitude of a zero-order basis.

A lower-order basis affects errors more significantly. Accordingly, it is possible to further increase the possibility of error reduction by determining a small filter coefficient for a pixel located at a position at which an amplitude of a zero-order basis is larger.

In addition, the two blocks may be composed of a first block and a second block located to a right of or below the first block, and when determining the filter characteristic. When a basis used to transform the first block is a first basis, and a basis used to transform the second block is a second basis, based on the first basis and the second basis, the processing circuitry may determine, as the filter characteristic, each of a first filter coefficient for a pixel located around the boundary in the first block and a second filter coefficient for a pixel located around the boundary in the second block. For example, in the case where the first basis and the second basis are of DST-VII (DST denotes discrete sine transforms), when determining the filtering characteristic, the processing circuitry may determine, as the filter characteristic, the second filter coefficient which is larger than the first filter coefficient.

In the case where a first basis and a second basis are of DST-VII, it is highly likely that an error in a first block around a boundary is large and an error in a second block around the boundary is small. Accordingly, it is possible to further increase the possibility of reducing errors appropriately around the boundary by determining a second filter coefficient which is larger than a first filter coefficient in such a case and performing deblocking filtering with the first and second filter coefficients.

In addition, when determining the filter characteristic, when the first basis and the second basis are of DCT-II (DCT denotes discrete cosine transform), the processing circuitry may determine, as the filter coefficient, the second filter coefficient which is equal to the first filter coefficient.

In the case where the first basis and the second basis are of DCT-II, it is highly likely that an error in a first block around a boundary and an error in a second block around the boundary are equal to each other. Accordingly, it is possible to further increase the possibility of reducing errors appropriately around the boundary by determining a second filter coefficient which is equal to a first filter coefficient in such a case and performing deblocking filtering with the first and second filter coefficients.

In addition, when determining the filter characteristic, when the first basis and the second basis are of DST-VII (DST denotes discrete sine transform), and a size of the second block is smaller than a size of the first block, the processing circuitry may determine, as the filter coefficient, the second filter coefficient which is larger than the first filter coefficient. A filter coefficient gradient between the first filter coefficient and the second filter coefficient is gentler than a filter coefficient gradient in the case where the first block and the second block are equal in size.

In the case where the first basis and the second basis are of DST-VII and the size of the second block is smaller than the size of the first block, it is likely that an error in the first block around the boundary is large and an error in the second block around the boundary is at a medium level. In other words, it is likely that an error distribution between the first block and the second block around the boundary has a gentle gradient.

A decoder according to an aspect of the present disclosure determines the second filter coefficient larger than the first filter coefficient in such a case, and performs deblocking filtering with the first and second filter coefficients. Here, the determined filter coefficient gradient between the first filter coefficient and the second filter coefficient is gentler than in the case where the first block and the second block are equal in size. Accordingly, even when the error distribution around the boundary between the first block and the second block has a gentle gradient, it is possible to increase the possibility of reducing errors appropriately around the boundary.

In addition, when determining the filter characteristic, based on a combination of bases for the first block and the second block, the processing circuitry may further determine, as the filter characteristic, each of a first threshold value for the first block and a second threshold value for the second block; and when performing the deblocking filtering, the processing circuitry: perform a calculation using the first filter coefficient and the second filter coefficient on a pixel value of a current pixel to obtain a calculated pixel value of the current pixel; determine whether an amount of change from a to-be-calculated pixel value of the current pixel to a calculated pixel value of the current pixel is larger than one of the first threshold value and the second threshold value which is for a block to which the current pixel belongs among the first block and the second block; and when the amount of change is larger than the threshold value for the block, clip the calculated pixel value of the current pixel to a sum of or a difference between the to-be-calculated pixel value of the current pixel and the threshold value for the block. In this way, when the amount of change between the pixel value of a to-be-calculated pixel value of a current pixel and the calculated pixel value of the current pixel is larger than the threshold value, the pixel value of the calculated current pixel is clipped to the sum of or the difference between the to-be-calculated pixel value of the current pixel and the threshold value. Thus, it is possible to prevent the pixel value of the current pixel from being changed significantly by the deblocking filtering. In addition, the first threshold value for the first block and the second threshold value for the second block are determined based on the combination of bases for the first block and the second block. Accordingly, for each of the first block and the second block, it is possible to determine a large threshold value for a pixel located at a position at which the amplitude of a basis is large, that is, a pixel having a large error, and determine a small threshold value for a pixel located at a position at which the amplitude of a basis is small, that is a pixel having a small error. As a result, the deblocking filtering makes it possible to allow the pixel value of the pixel having the large error to change significantly and prohibit the pixel value of the pixel having the small error from changing significantly. Accordingly, it is further increase the possibility of reducing errors appropriately around the boundary between the first block and the second block.

In addition, a decoder according to an aspect of the present disclosure includes: processing circuitry; and memory. Using the memory, based on block sizes of a first block and a second block neighboring the first block, the processing circuitry: determines a filter characteristic for a boundary between the first block and the second block; and performs, on the boundary, deblocking filtering with the filter characteristic determined. For example, when determining the filter characteristic, the processing circuitry may: define, as the filter characteristic, each of a first filter coefficient for a pixel around the boundary in the first block and a second filter coefficient for a pixel around the boundary in the second block; and determine, as the filter characteristic, the second filter coefficient which is larger than the first filter coefficient, when a size of the second block is smaller than a size of the first block.

In this way, for example, an asymmetrical filter characteristic can be determined for the boundary according to the difference in block size. As a result, even when errors vary around the boundary between two blocks as described above, it is possible to increase the possibility of reducing errors by performing deblocking filtering with the asymmetrical filter characteristic.

It is to be noted that these general and specific aspects may be implemented using a system, a method, an integrated circuit, a computer program, or a non-transitory computer-readable recording medium such as a CD-ROM, or any combination of systems, methods, integrated circuits, computer programs, or computer-readable recording media.

Hereinafter, embodiments are described in detail with reference to the drawings.

It is to be noted that the embodiments described below each show a general or specific example. The numerical values, shapes, materials, constituent elements, the arrangement and connection of the constituent elements, steps, order of the steps, etc., indicated in the following embodiments are mere examples, and therefore are not intended to limit the scope of the claims. Therefore, among the constituent elements in the following embodiments, those not recited in any of the independent claims defining the most generic inventive concepts are described as optional constituent elements.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure. Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
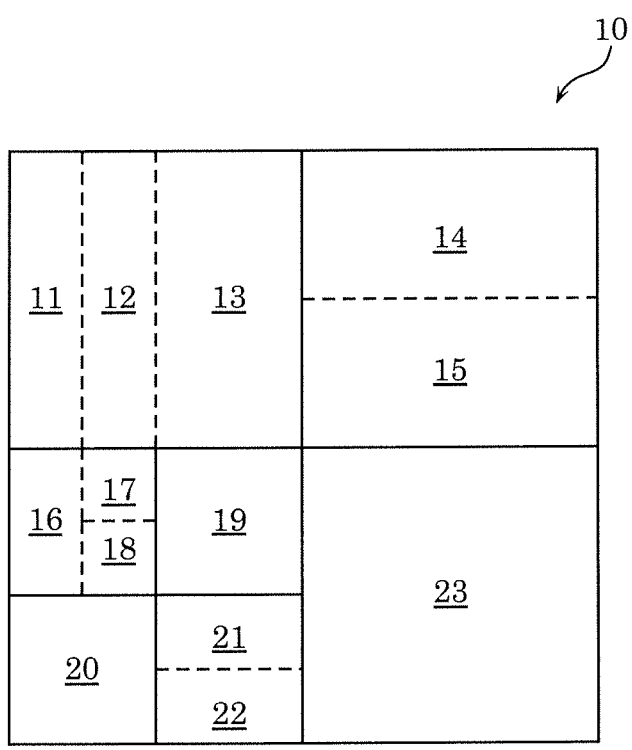
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
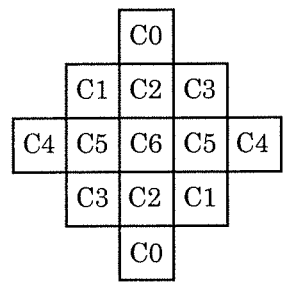
FIG. 4A illustrates one example of a filter shape used in ALF.
Figure 4B:
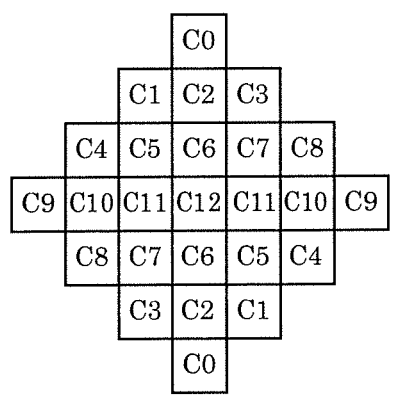
FIG. 4B illustrates another example of a filter shape used in ALF.
Figure 4C:
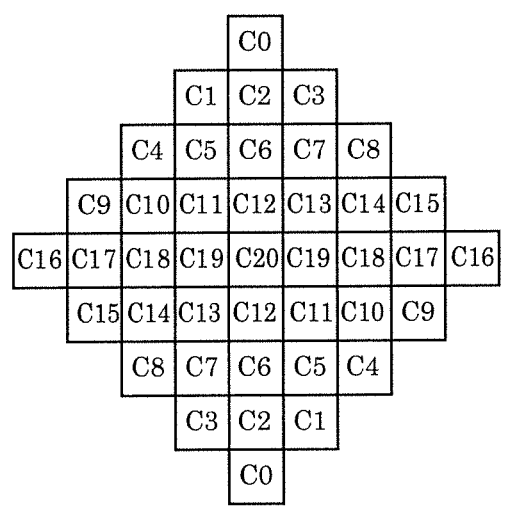
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5A:
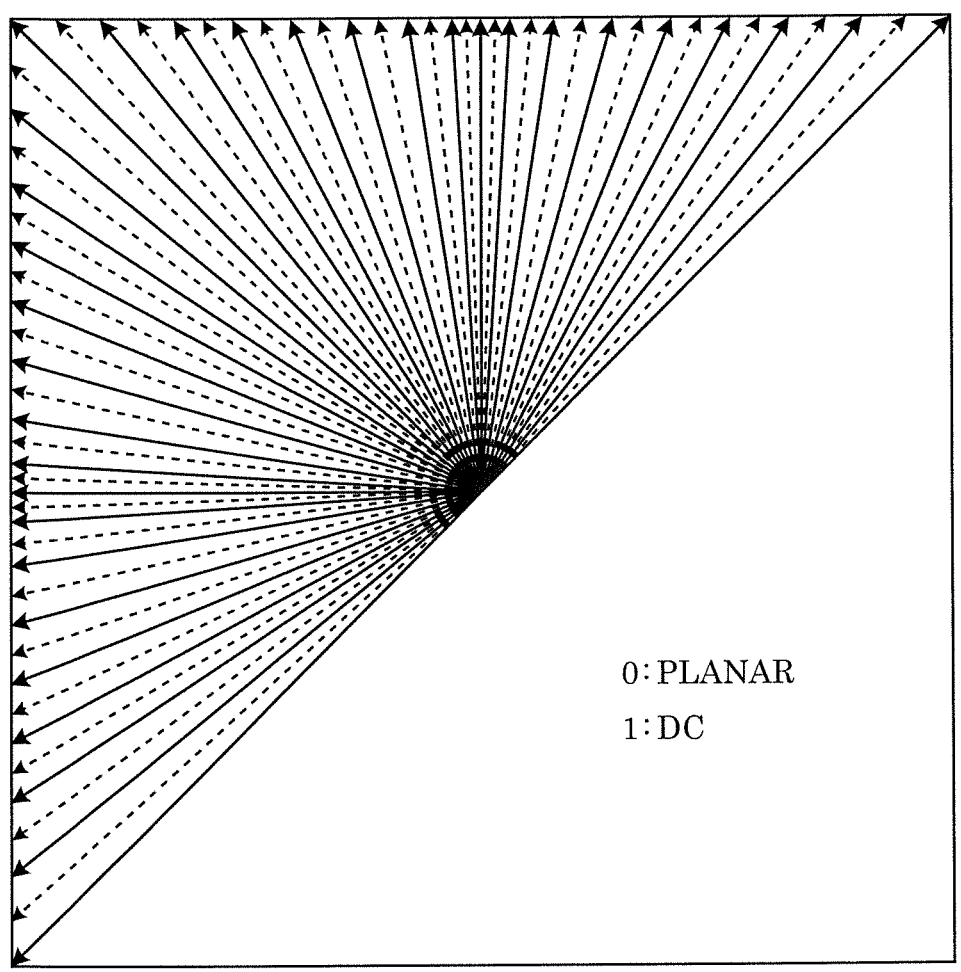
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
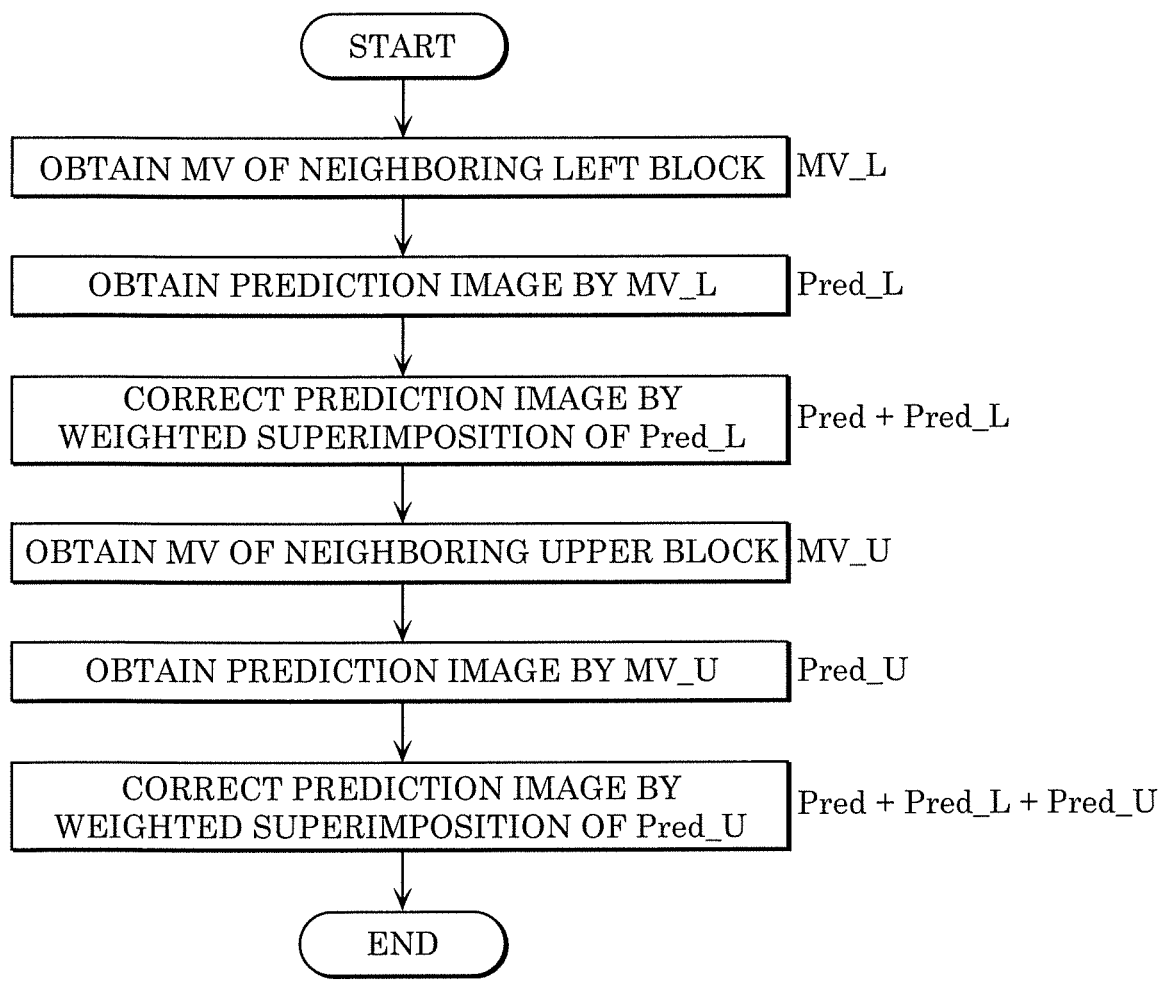
FIG. 5B is a flow chart for illustrating an outline of a prediction image correction process performed via OBMC processing.
Figure 5C:
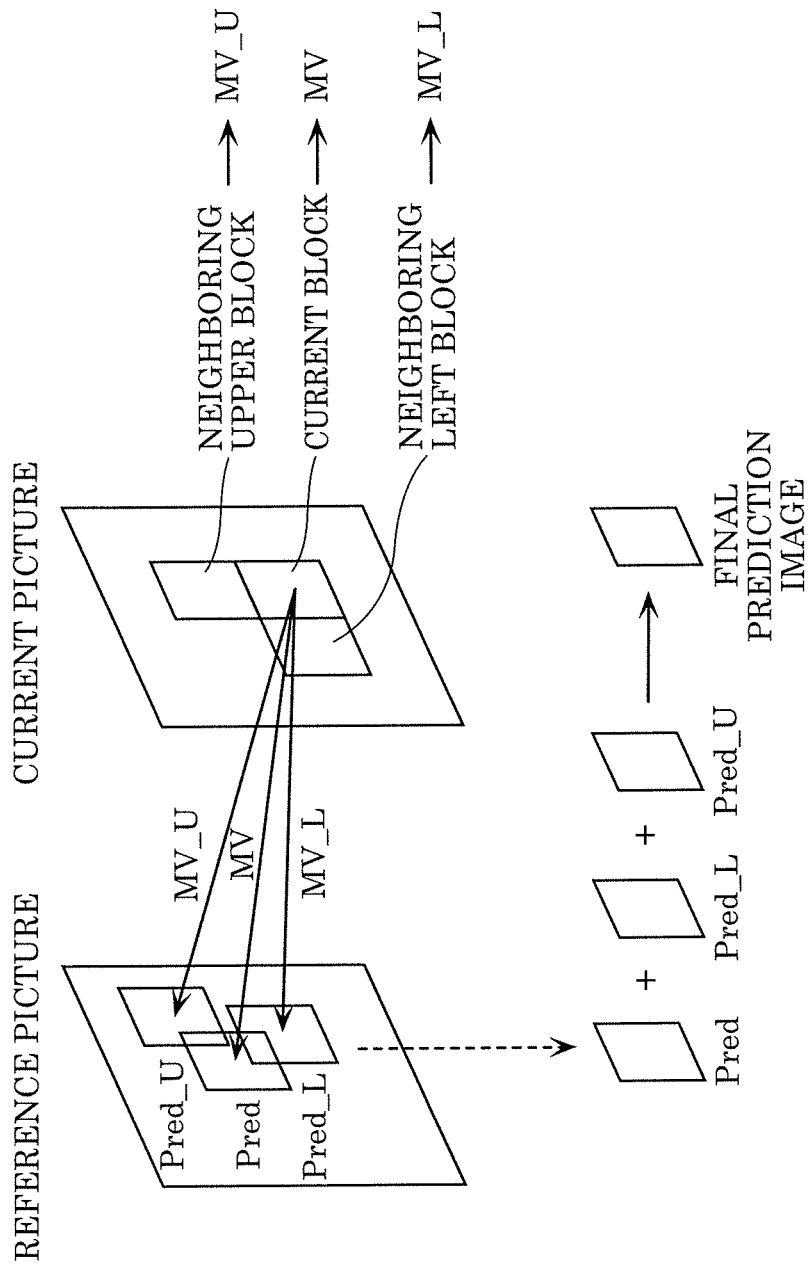
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
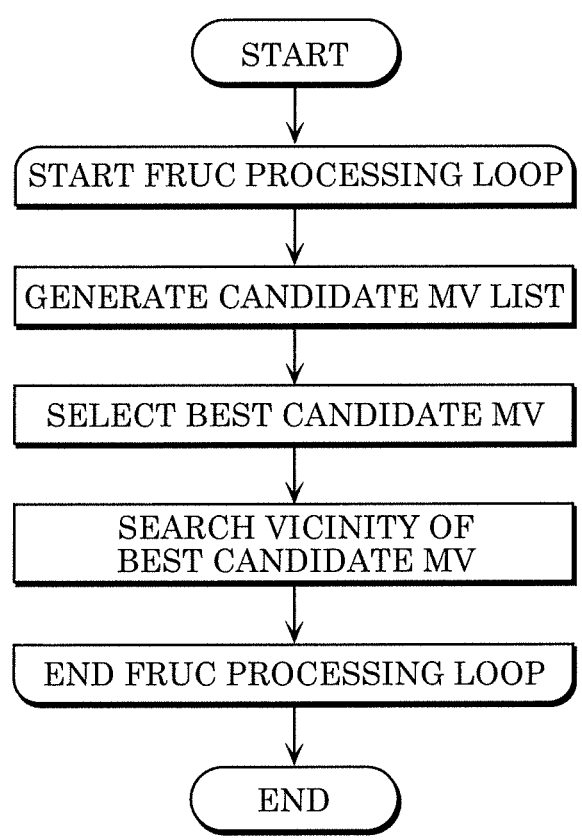
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
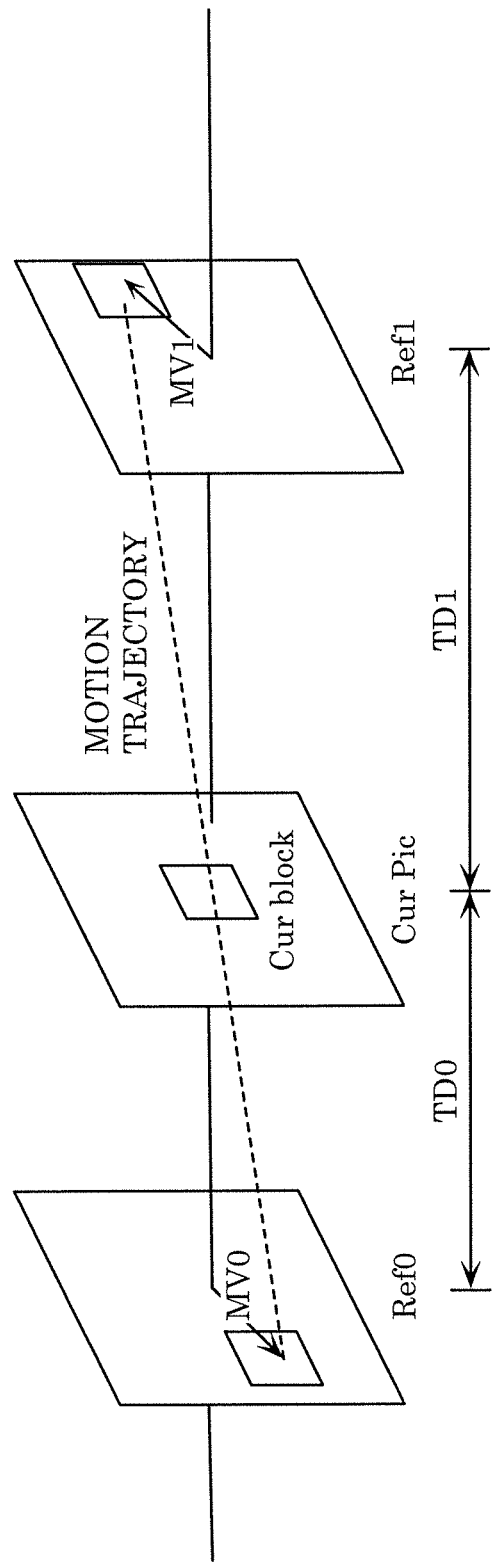
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
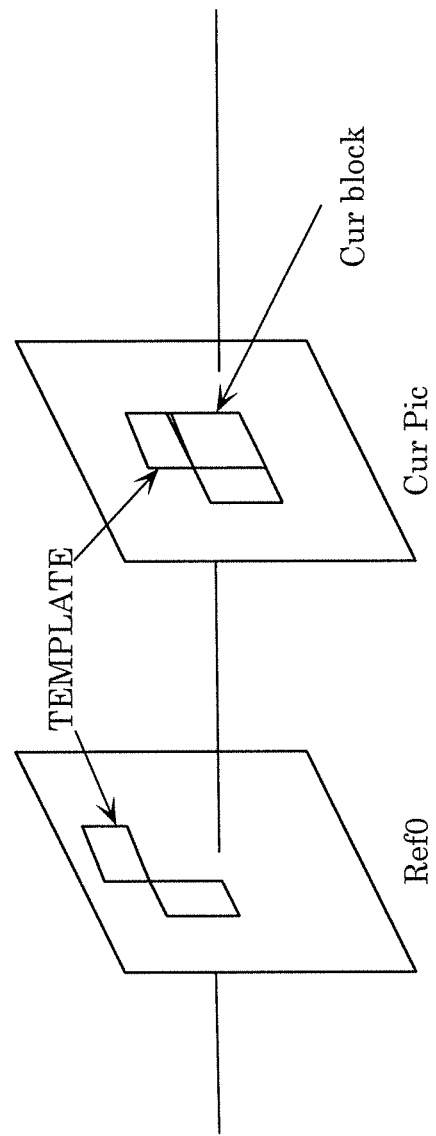
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
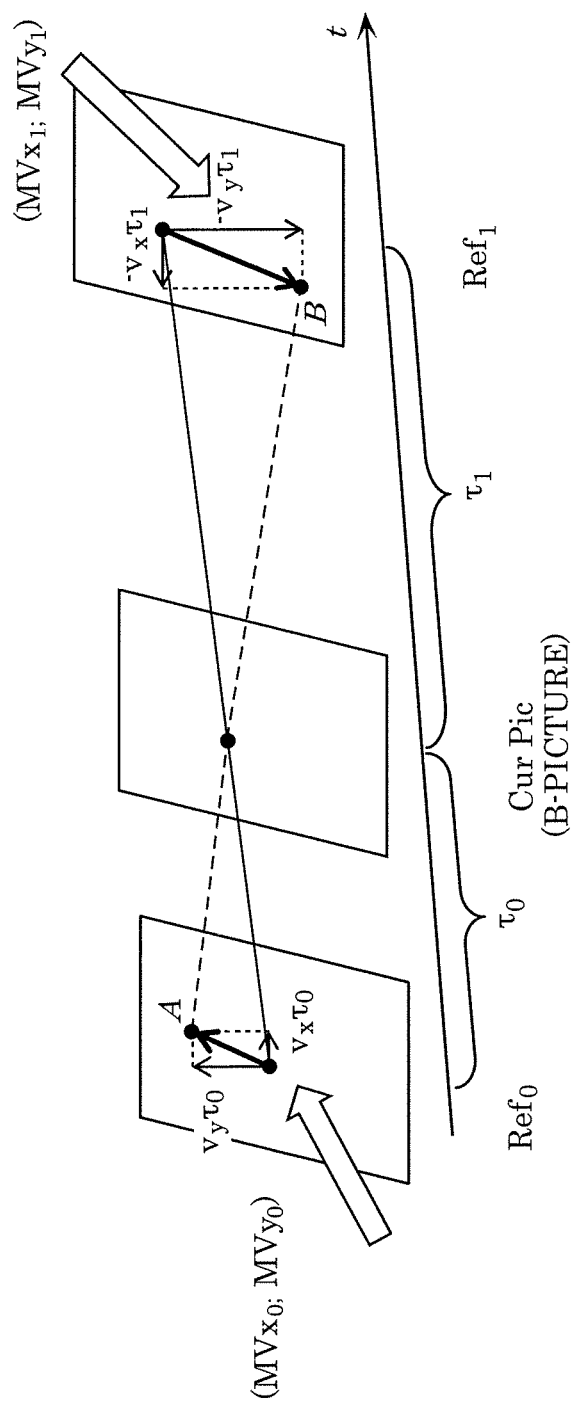
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \tag{1}$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
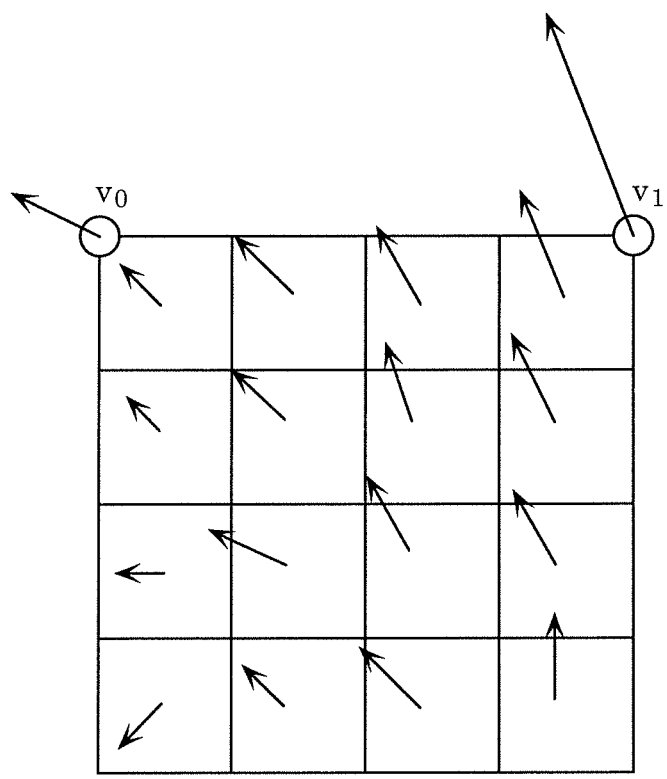
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \tag{2}$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
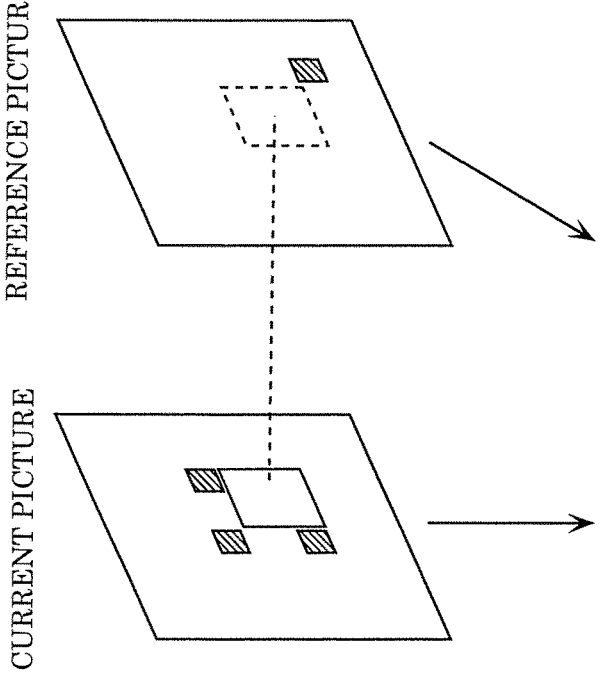
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
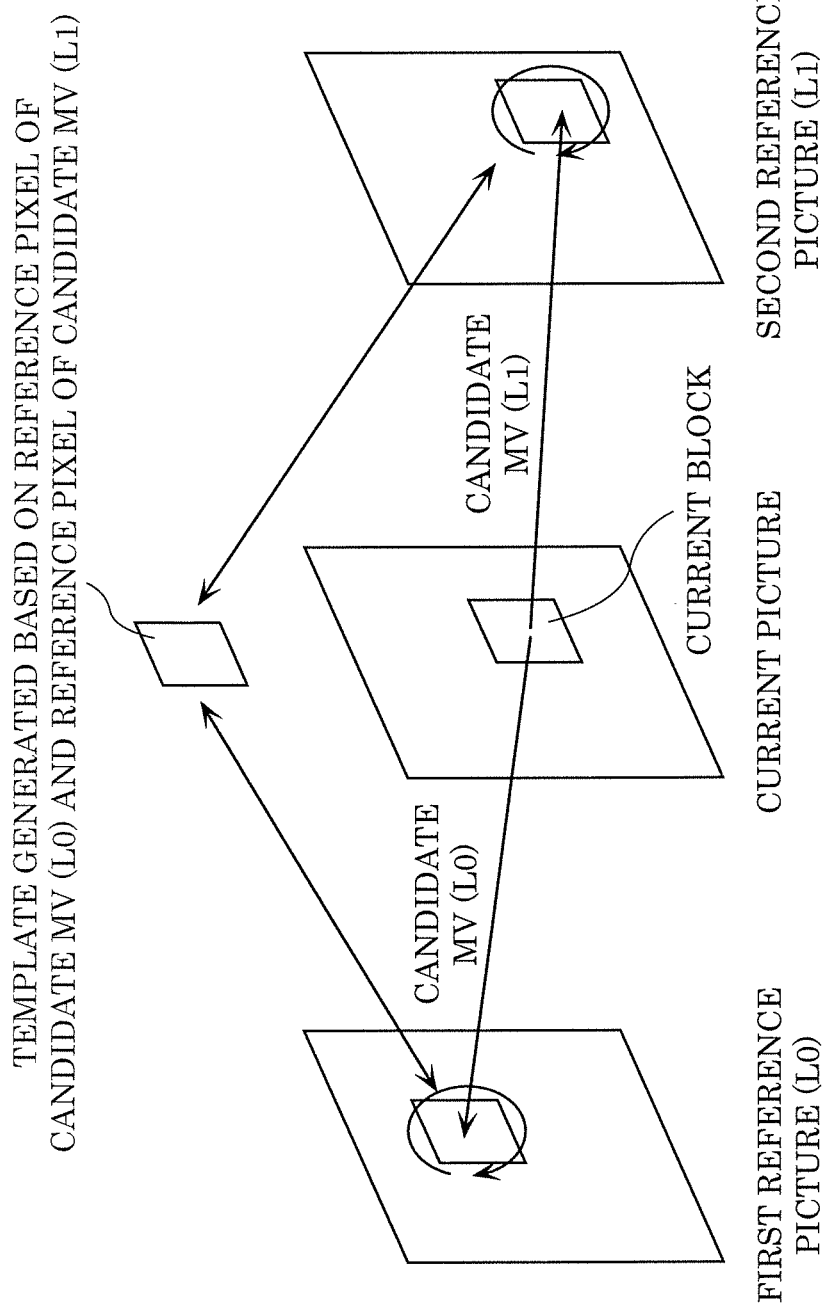
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
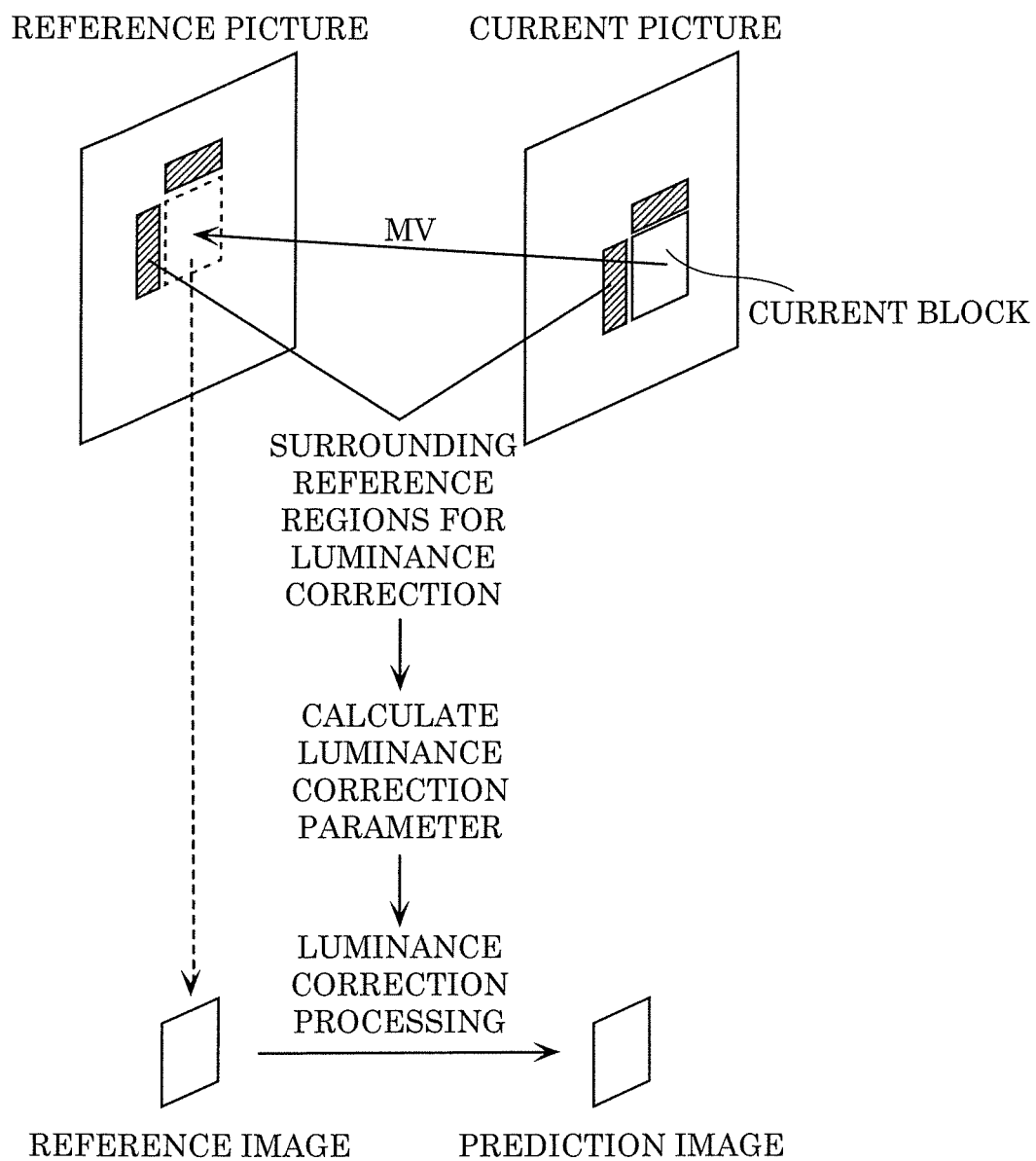
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
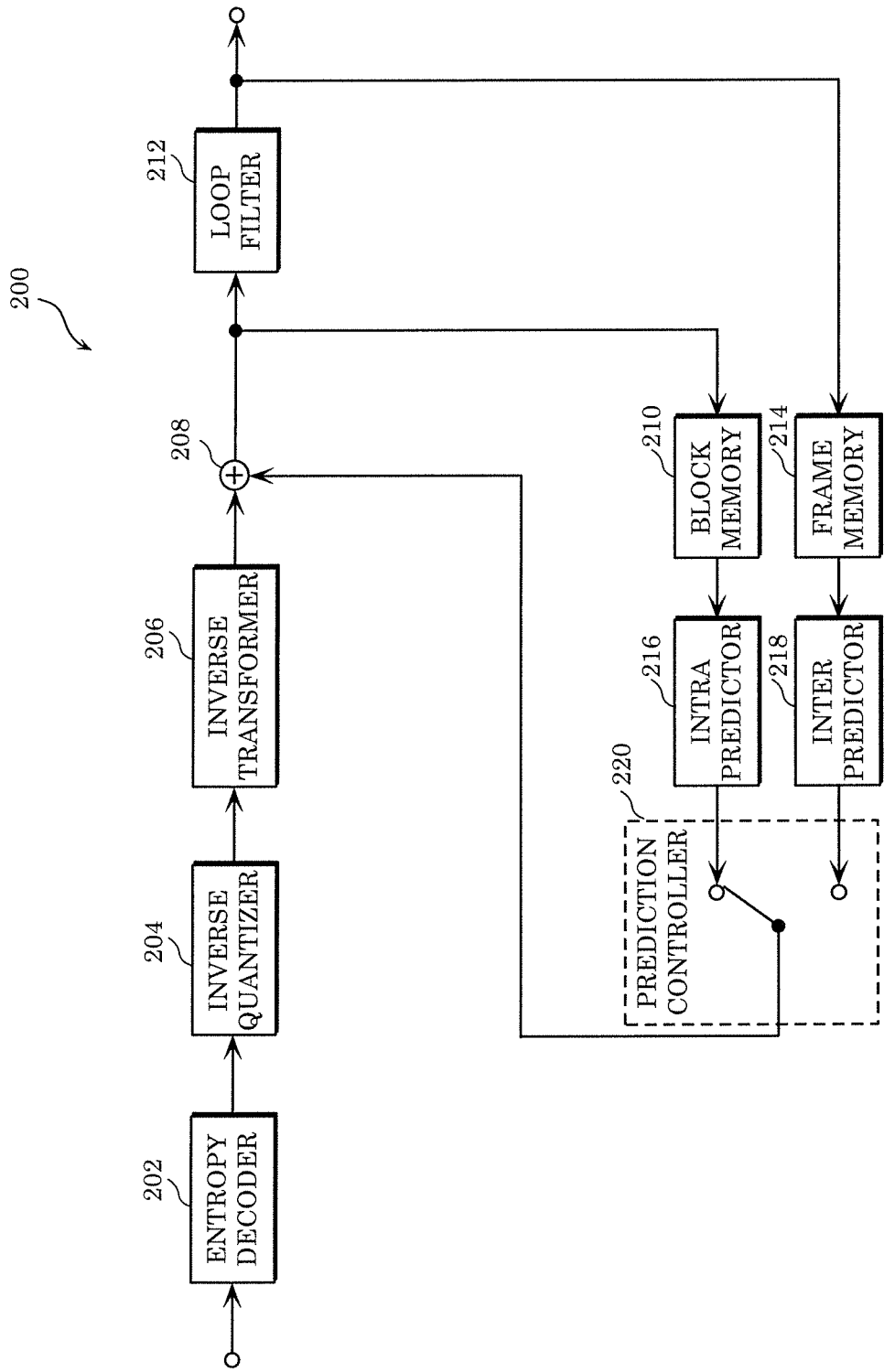
FIG. 10 is a block diagram illustrating a configuration of a decoder according to Embodiment 1.

Next, a decoder capable of decoding an encoded signal (encoded bitstream) output from encoder 100 will be described. FIG. 10 is a block diagram illustrating a configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type. Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[Deblocking Filtering]

Next, deblocking filtering performed in encoder 100 and decoder 200 configured as described above are described specifically with reference to the drawings. It is to be noted that operations performed by loop filter 120 included in encoder 100 are mainly described below, and loop filter 212 included in decoder 200 performs similar operations.

As described above, when encoding an image, encoder 100 calculates a prediction error by subtracting, from an original signal, a prediction signal which is generated by intra predictor 124 or inter predictor 126. Encoder 100 generates quantized coefficients by performing an orthogonal transform process and a quantization process on a prediction error. Furthermore, encoder 100 restores the prediction error by performing inverse quantization and inverse orthogonal transform on the resulting quantized coefficients. Here, a quantization process is irreversible processing, and thus the restored prediction error has an error (quantization error) from the pre-transform prediction error.

Deblocking filtering performed by loop filter 120 is a kind of filtering performed with an aim to reduce the quantization error. Deblocking filtering is applied to block boundaries to remove block noise. It is to be noted that deblocking filtering is also simply referred to as filtering hereinafter.

Figure 11:
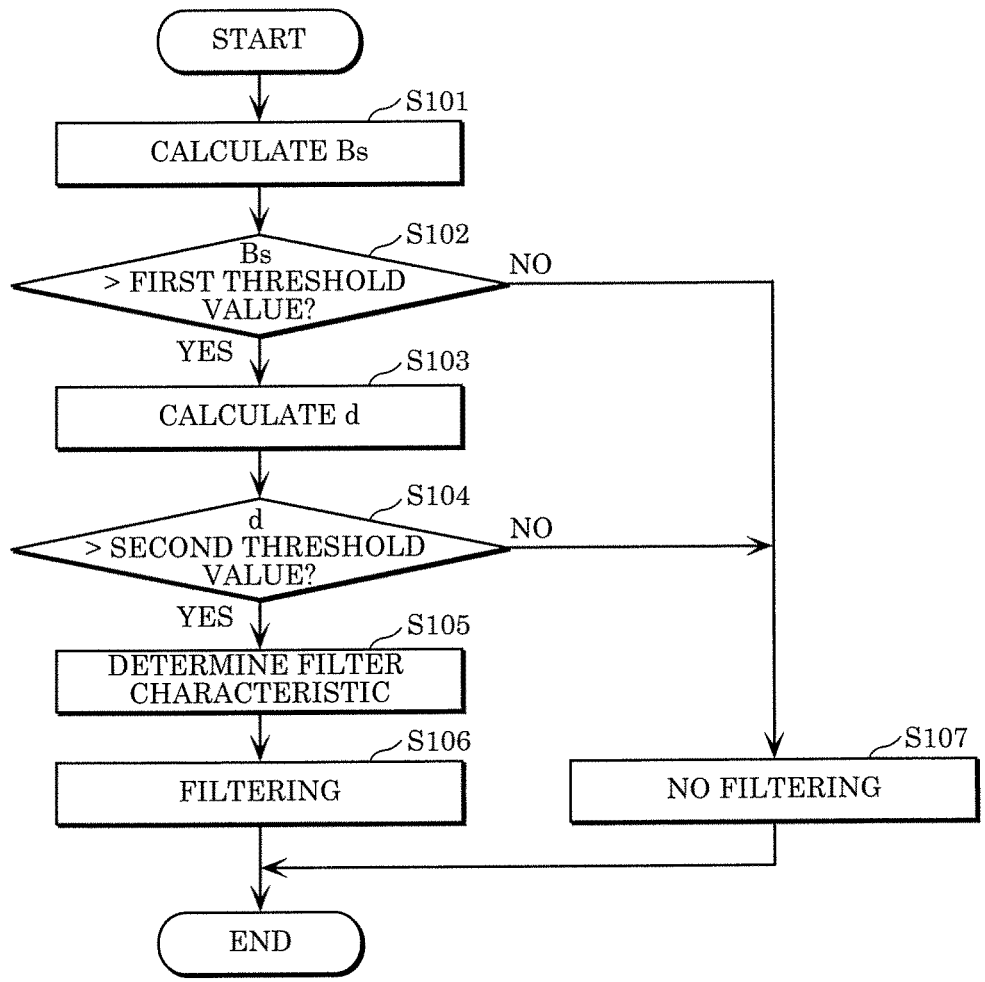
FIG. 11 is a flowchart of deblocking filtering according to Embodiment 1.

FIG. 11 is a flowchart indicating an example of deblocking filtering performed by loop filter 120. For example, processing indicated in FIG. 11 is performed for each of block boundaries.

First, loop filter 120 calculates a block boundary strength (Bs) in order to determine a behavior of deblocking filtering (S101). More specifically, loop filter 120 determines a Bs using a prediction mode of a block to be a target of a filter or a property of a motion vector. For example, Bs=2 is set when at least one of blocks across a boundary is an intra prediction block. In addition, Bs=1 is set when at least one of the following conditions (1) to (3) is satisfied: (1) at least one of blocks across a boundary includes a higher orthogonal transform coefficient; (2) the difference between motion vectors of both blocks across a boundary is larger than or equal to a threshold value; and (3) the numbers of motion vectors or reference images of both blocks across a boundary are different from each other. Bs=0 is set when none of the conditions (1) to (3) is satisfied.

Next, loop filter 120 determines whether the set Bs is larger than a first threshold value (S102). When Bs is smaller than or equal to the first threshold value (No in S102), loop filter 120 does not perform filtering (S107).

When the set Bs is larger than the first threshold value (Yes in S102), loop filter 120 calculates a pixel difference d in a boundary area, using pixel values of blocks located at both sides of a block boundary (S103). This processing is described with reference to FIG. 12. When the pixel values at the block boundary are defined as in FIG. 12, loop filter 120 calculates, for example, d=|p30−2×p20+p10|+|p33−2× p23+p13|+|q30−2×q20+g10|+|q33−2×q23+q13|.

Next, loop filter 120 determines whether the calculated d is larger than a second threshold value (S104). When the calculated d is smaller than or equal to the second threshold value (No in S104), loop filter 120 does not perform filtering (S107). It is to be noted that the first threshold value is different from the second threshold value.

When the calculated d is larger than the second threshold value (Yes in S104), loop filter 120 determines a filter characteristic (S105), and performs filtering with the determined filter characteristic (S106). For example, a 5-tap filter of (1, 2, 2, 2, 1)/8 is used. Specifically, for p10 indicated in FIG. 12, a calculation of (1×p30+2×p20+2×p10+2×q10+1× q20)/8 is performed. Here, in the filtering, clipping is performed so that variation falls within a certain range without excessive smoothing. Clipping here is threshold processing which, for example, when a threshold value for clipping is tc and a pixel value to be filtered is q, only allows the filtered pixel value to take a value within the range of q±tc.

Hereinafter, a description is given of an example of applying an asymmetrical filter across a block boundary in deblocking filtering performed by loop filter 120 according to this embodiment.

Figure 13:
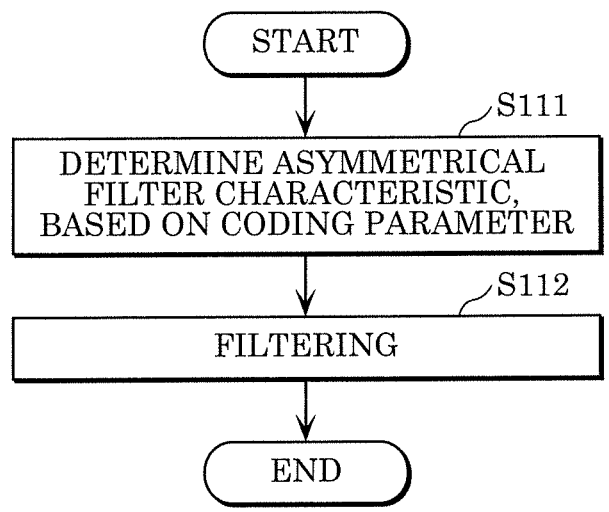
FIG. 13 is a flowchart of deblocking filtering according to Embodiment 1.

FIG. 13 is a flowchart indicating an example of deblocking filtering according to this embodiment. It is to be noted that the processing indicated in FIG. 13 may be performed for each block boundary, or for each unit of one or more pixels.

First, loop filter 120 obtains a coding parameter, and determines an asymmetrical filter characteristic across a boundary, using the obtained coding parameter (S111). In the present disclosure, the obtained coding parameter is assumed to, for example, characterize an error distribution.

Here, filter characteristics are filter coefficients and parameters, etc. used to control filtering. In addition, a coding parameter may be any parameter which can be used to determine a filter characteristic. A coding parameter may be information indicating an error per se, or may be information or a parameter (which, for example, affects the magnitude of the error) related to the error.

In addition, hereinafter, a pixel which has been determined to have a large or small error based on a coding parameter, that is, a pixel which is likely to have a large or small error is also simply referred to as a pixel having a large or small error.

Here, a determination process does not need to be performed each time, and a process may be performed according to a predetermined rule which associates a coding parameter and a filter characteristic.

It is to be noted that, when each pixel is seen, even a pixel which is statistically likely to have a small error may have an error larger than an error of a pixel which is likely to have a large error.

Next, loop filter 120 executes filtering with the determined filter characteristic (S112).

Here, a filter characteristic determined in Step S111 does not always need to be asymmetrical, and can be designed to be symmetrical. It is to be noted that, hereinafter, a filter having an asymmetrical filter characteristic across a block boundary is also referred to as an asymmetrical filter, and a filter having a symmetrical filter characteristic across a block boundary is also referred to as a symmetrical filter.

More specifically, the filter characteristic is determined considering the following two points that: a pixel determined to have a small error is less affected by a neighboring pixel having a large error; and the pixel determined to have the large error is more affected by the neighboring pixel having the small error. In other words, the filter characteristic is determined such that a pixel having a larger error is more affected by filtering. In other words, a filter characteristic is determined such that the pixel value of a pixel having a larger error is changed by a larger amount before and after filtering. In this way, as for a pixel which is likely to have a small error, it is possible to prevent the pixel from departing from a true value by a large change in value. As for the pixel which is likely to have the large error, it is possible to reduce the error of the pixel by changing the value after being more affected by the pixel having the small error.

It is to be noted that an element which changes variation by a filer is defined as a weight of a filter. In other words, a weight indicates a degree of influence of filtering on a current pixel. Increasing a weight means increasing influence of filtering on the pixel. In other words, increasing a weight means that a filtered pixel value is more affected by another pixel. More specifically, increasing a weight means determining a filter characteristic so that the pixel value of a pixel can be changed by a larger amount before and after filtering, or filtering is likely to be performed.

In other words, loop filter 120 increases the weight of a pixel having a larger error more significantly. It is to be noted that increasing the weight of a pixel having a larger error more significantly is not limited to changing the weight continuously and includes changing the weight stepwise. In other words, it is only necessary that the weight of a first pixel is smaller than the weight of a second pixel having a larger error than the first pixel. In addition, similar expressions are also used below.

It is to be noted that a pixel having a larger error does not need to have a larger weight in a finally determined filtering characteristic. In other words, for example, it is only necessary for loop filter 120 to change a filter characteristic which becomes a reference determined according to a conventional approach to have a tendency that a pixel having a larger error has a larger weight.

Hereinafter, a plurality of specific approaches for changing weights asymmetrically are described. It is to be noted that any of the approaches indicated below may be used, or a combination of a plurality of approaches may be used.

As a first approach, loop filter 120 decreases a filter coefficient more significantly for a pixel having a larger error. For example, loop filter 120 decreases a filter coefficient for a pixel having a large error, and increases a filter coefficient for a pixel having a small error.

Figure 12:
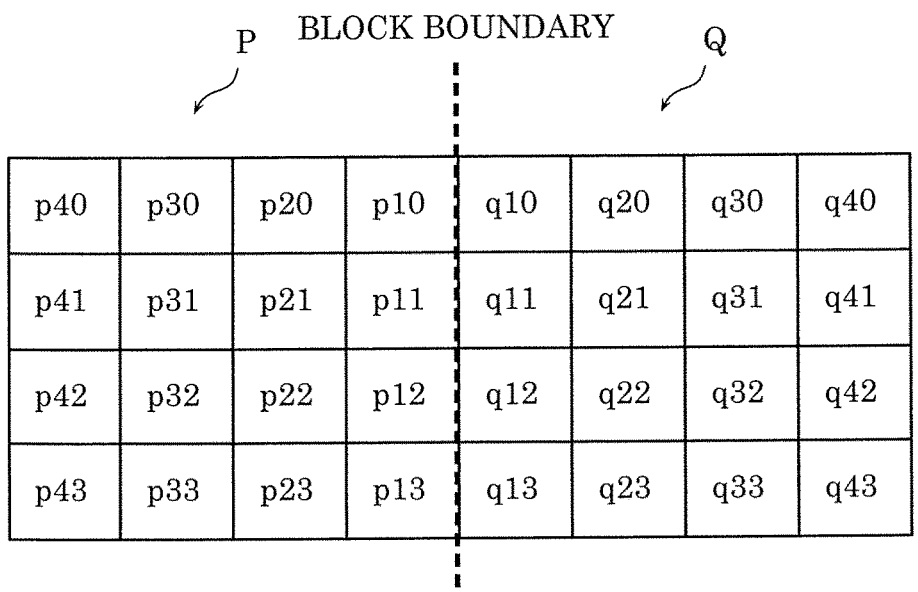
FIG. 12 is a diagram indicating an example of a pixel arrangement at a boundary according to Embodiment 1.

For example, a description is given of an example of deblocking filtering performed on pixel p1 indicated in FIG. 12. This approach is not applied hereinafter, and, for example, a filter determined according to a conventional approach is referred to as a reference filter. It is assumed that the reference filter is a 5-tap filter vertical to a block boundary, and is set for (p3, p2, p1, q1, q2). In addition, a filter coefficient is determined to be (1, 2, 2, 2, 1)/8. In addition, it is assumed that an error of block P is likely to be large, and that an error of block Q is likely to be small. In this way, a filter coefficient is set so that block P having a large error is more affected by block Q having a small error.

More specifically, a filter coefficient used for a pixel having a small error is set to be large, and a filter coefficient used for a pixel having a large error is set to be small. For example, as a filter coefficient, (0.5, 1.0, 1.0, 2.0, 1.5)/6 is used.

As another example, 0 is used as a filter coefficient for a pixel having a small error. For example, (0, 0, 1, 2, 2)/5 may be used as a filter coefficient. In other words, a filter tap may be changed. A filter coefficient which is currently 0 may be set to a value other than 0. For example, (1, 2, 2, 2, 1, 1)/9 may be used as a filter coefficient. In other words, loop filter 120 may increase the number of filter taps at a small error side.

It is to be noted that a reference filter is not a filter which is horizontally symmetrical about a current pixel as in the case of (1, 2, 2, 2, 1)/8 described above. In such a case, loop filter 120 further adjusts the filter. For example, the filter coefficient for a reference filter to be used for a left-end pixel in block Q is (1, 2, 3, 4, 5)/15, and the filter coefficient for a reference filter to be used for a right-end pixel in block P is (5, 4, 3, 2, 1)/15. In other words, in this case, the reverse-landscape filter coefficients are used between the pixels across the block boundary. Such a filter characteristic which is reverse-symmetrical across a block boundary can be said to be "a filter characteristic which is symmetrical across a block boundary". In other words, a filter characteristic which is asymmetrical across a block boundary is a filter characteristic which is not reverse-symmetrical across a block boundary.

In addition, similarly to the above, when block P has a large error and block Q has a small error, loop filter 120 changes, for example, (5, 4, 3, 2, 1)/15 which is the filter coefficient for a reference filter to be used for a right-end pixel in block P to (2.5, 2.0, 1.5, 2.0, 1.0)/9.

In this way, in deblocking filtering, a filter having filter coefficients which change asymmetrically across a block boundary are used. For example, loop filter 120 determines a reference filter having filter coefficients which are symmetrical across a boundary according to a predetermined reference. Loop filter 120 changes the reference filter to have filter coefficients which are asymmetrical across a boundary. More specifically, loop filter 120 performs at least one of: increasing a filter coefficient of at least one pixel having a small error among the filter coefficients of the reference filter; and decreasing a filter coefficient of at least one pixel having a large error among the filter coefficients of the reference filter.

Next, a second approach for changing weights asymmetrically is described. First, loop filter 120 performs a filter calculation using a reference filter. Next, loop filter 120 performs asymmetrical weighting across a block boundary onto reference change amount $\Delta 0$ which is the amount of change in pixel value before and after the filter calculation using a reference filter. It is to be noted that, hereinafter, for distinction, processing using a reference filter is referred to as a filter calculation, and sequential processing including a filter calculation and subsequent correction (for example, asymmetrical weighting) is referred to as filtering (deblocking filtering).

For example, in the case of a pixel having a small error, loop filter 120 calculates corrected change amount $\Delta 0$ by multiplying reference change amount $\Delta 0$ with a coefficient smaller than 1. In addition, in the case of a pixel having a large error, loop filter 120 calculates a corrected change amount $\Delta 0$ by multiplying reference change amount $\Delta 0$ with a coefficient larger than 1. Next, loop filter 120 generates a filtered pixel value by adding a pixel value before a filter calculation to corrected change amount $\Delta 1$. It is to be noted that loop filter 120 may perform only one of processing on the pixel having a small error and processing on the pixel having a large error.

For example, similarly to the above, it is assumed that block P has a large error and block Q has a small error. In this case, in the case of a pixel included in block Q having a small error, loop filter 120 calculates corrected change amount $\Delta 1$ by, for example, multiplying reference change amount $\Delta 0$ by 0.8. In addition, in the case of a pixel included in block P having a large error, loop filter 120 calculates corrected change amount $\Delta 1$ by, for example, multiplying reference change amount $\Delta 0$ by 1.2. In this way, it is possible to decrease variation in pixel value having a small error. In addition, it is possible to increase variation in pixel value having a large error.

It is to be noted that 1:1 may be selected as a ratio between a coefficient that is multiplied with reference change amount $\Delta 0$ of a pixel having a small error and a coefficient that is multiplied with reference change amount $\Delta 0$ having a large error. In this case, the filter characteristic is symmetrical across a block boundary.

In addition, loop filter 120 may calculate a coefficient that is multiplied with reference change amount $\Delta 0$ by multiplying the reference coefficient by a constant. In this case, loop filter 120 uses a larger constant for a pixel having a large error than a constant for a pixel having a small error. As a result, the change amount in pixel value of the pixel having the large error increases, and the change amount in pixel value of the pixel having the small error decreases. For example, loop filter 120 uses 1.2 or 0.8 as a constant for a pixel that neighbors a block boundary, and uses 1.1 or 0.9 as a constant for a pixel that is apart by one pixel from the pixel that neighbors the block boundary. In addition, a reference coefficient is calculated according to, for example, $(A \times (q1-p1) - B \times (q2-p2) + C)/D$. Here, A, B, C, and D are constants. For example, A=9, B=3, C=8, and D=16 are satisfied. In addition, p1, p2, q1, and q2 are pixel values of pixels located across a block boundary and are in a positional relationship indicated in FIG. 12.

Next, a third approach for changing weights asymmetrically is described. Loop filter 120 performs a filter calculation using a filter coefficient of a reference filter similarly to the second approach. Next, loop filter 120 adds asymmetrical offset values to pixel values after being subjected to the filter calculation across a block boundary. More specifically, loop filter 120 adds a positive offset value to a pixel value of a pixel having a large error so that the value of the pixel having the large error is made closer to the value of pixel which is likely to have a small error and the variation of the pixel having the large error becomes large. In addition, loop filter 120 adds a negative offset value to the pixel value of the pixel having the small error so that the value of the pixel having the small error is not made closer to the value of the pixel having the large error and the variation of the pixel having the small error becomes small. As a result, the change amount in pixel value of the pixel having the large error increases, and the change amount in pixel value of the pixel having the small error decreases. It is to be noted that loop filter 120 may perform only one of processing on the pixel having a small error and processing on the pixel having a large error.

For example, for a pixel included in a block having a large error, loop filter 120 calculates corrected change amount $\Delta 1$ by adding a positive offset value (for example, 1) to the absolute value of reference change amount $\Delta 0$. In addition, for a pixel included in a block having a small error, loop filter 120 calculates corrected change amount Δ1 by adding a negative offset value (for example, −1) to the absolute value of reference change amount Δ0. Next, loop filter 120 generates a filtered pixel value by adding corrected change amount Δ1 to the pixel value before being subjected to the filter calculation. It is to be noted that loop filter 120 may add an offset value to the filtered pixel value instead of adding an offset value to a change amount. In addition, the offset values may not be symmetrical across a block boundary.

In addition, when a filter tap is set for a plurality of pixels neighboring a block boundary, loop filter 120 may change only the weights for particular pixels or may change the weights for all the pixels. In addition, loop filter 120 may change the weights of the target pixels according to the distances from the block boundary to the target pixels. For example, loop filter 120 may make filter coefficients for two pixels from a block boundary asymmetrical, and make the other filter coefficients for subsequent pixels symmetrical. In addition, filter weights may be common to a plurality of pixels, or may be set for each pixel.

Next, a fourth approach for changing weights asymmetrically is described. Loop filter 120 performs a filter calculation using a filter coefficient of a reference filter. Next, when a change amount Δ in pixel value before and after the filter calculation exceeds a clip width which is a reference value, loop filter 120 clips the change amount Δ to the clip width. Loop filter 120 sets asymmetrical clip widths across a block boundary.

Specifically, loop filter 120 makes a clip width for a pixel having a large error wider than the clip width of a pixel having a small error. For example, loop filter 120 makes the clip width for the pixel having the large error to a constant multiple of the clip width for the pixel having the smaller error. As a result of changing the clip width, the value of the pixel having the small error is prohibited from changing significantly. In addition, the value of the pixel having the large error is allowed to change significantly.

It is to be noted that loop filter 120 may adjust the absolute values of the clip widths instead of specifying a clip width ratio. For example, loop filter 120 fixes the clip width for a pixel having a large error at a multiple of a predetermined reference clip width. Loop filter 120 sets the ratio between the clip width for the pixel having the large error and the clip width for a pixel having a small error to 1.2:0.8. Specifically, for example, it is assumed that the reference clip width is 10, and that the change amount Δ before and after a filter calculation is 12. In this case, in the case where the reference clip width is used as it is, the change amount Δ is corrected to 10 by threshold processing. In the opposite case where a target pixel is a pixel having a large error, the reference clip width is multiplied by, for example, 1.5. In this way, since the clip width becomes 15, no threshold processing is performed, and the change amount Δ is 12.

Next, a fifth approach for changing weights asymmetrically is described. Loop filter 120 sets an asymmetrical condition for determining whether to perform filtering across a block boundary. Here, the condition for determining whether to perform filtering is, for example, a first threshold value or a second threshold value indicated in FIG. 11.

More specifically, loop filter 120 sets a condition for increasing the likeliness of filtering on a pixel having a large error and a condition for decreasing the likeliness of filtering on a pixel having a small error. For example, loop filter 120 sets a higher threshold value for a pixel having a small error than a threshold value for a pixel having a large error. For example, loop filter 120 sets the threshold value for the pixel having the small error to be a constant multiple of the threshold value for the pixel having the large error.

In addition, loop filter 120 may adjust the absolute values of the threshold values not only specifying the threshold value ratio. For example, loop filter 120 may fix a threshold value for a pixel having a small error to a multiple of a predetermined reference threshold value, and may set the ratio between the threshold value for the pixel having the small error and a threshold value for a pixel having a large error to be 1.2:0.8.

Specifically, it is assumed that a reference threshold value for a second threshold value in Step S104 is 10, and that the d calculated from the pixel value in a block is 12. In the case where the reference threshold value is used as the second threshold value as it is, it is determined that filtering is performed. In the opposite case where a target pixel is a pixel having a small error, for example, a value obtained by multiplying the reference threshold value by 1.5 is used as the second threshold value. In this case, the second threshold value becomes 15 which is larger than d. In this way, it is determined that no filtering is performed.

In addition, constants, etc. indicating weights based on errors used in the above-described first to fifth approaches may be values predetermined in encoder 100 and decoder 200, or may be variable. Specifically, these constants include: a filter coefficient or a coefficient that is multiplied with a filter coefficient of a reference filter in the first approach; a coefficient that is multiplied with reference change amount Δ0 or a constant that is multiplied with a reference coefficient in the second approach; an offset value in the second approach; a clip width or a constant multiplied with a reference clip width in the fourth approach; and a threshold value or a constant that is multiplied with a reference threshold value in the fifth approach.

When a constant is variable, information indicating the constant may be included in a bitstream as a parameter in units of a sequence or a slice, and may be transmitted from encoder 100 to decoder 200. It is to be noted that the information indicating the constant may be information indicating the constant as it is, or may be information indicating a ratio with or a difference from a reference value.

In addition, according to errors, as methods for changing coefficients or constants, for example, there are a method for changing them linearly, a method for changing them quadratically, a method for changing them exponentially, a method using a look-up table indicating the relationships between errors and constants, or other methods.

In addition, when an error is larger than or equal to a reference, or when an error is smaller than or equal to a reference, a fixed value may be used as a constant. For example, loop filter 120 may set a variable to a first value when an error is below a predetermined range, may set a variable to a second value when an error is above the predetermined range, or may change a variable to a continuous variable according to an error, in a range from the first value to the second value when the error is within the predetermined range.

In addition, when an error exceeds a predetermined reference, loop filter 120 may use a symmetrical filter (reference filter) without using an asymmetrical filter.

In addition, in the case of using a look-up table, etc, loop filter 120 may hold tables for both a case where an error is large and a case where an error is small, or may hold only one of the tables and may calculate a constant for the other according to a rule predetermined based on the content of the table.

As described above, encoder 100 and decoder 200 according to this embodiment are capable of reducing errors in a reconstructed image by using an asymmetrical filter, and thereby increasing coding efficiency.

Embodiment 2

Embodiments 2 to 6 describe specific examples of coding parameters which characterize the above-described error distributions. In this embodiment, loop filter 120 determines a filter characteristic according to the position of a current pixel in a block.

Figure 14:
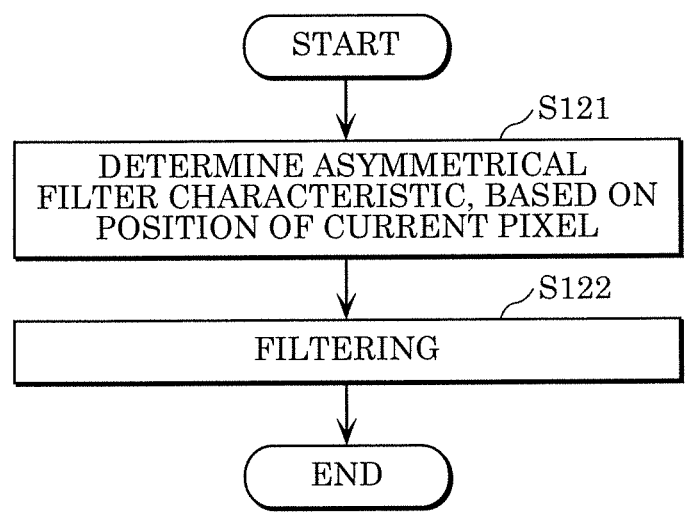
FIG. 14 is a flowchart of deblocking filtering according to Embodiment 2.

FIG. 14 is a flowchart indicating an example of deblocking filtering according to this embodiment. First, loop filter 120 obtains information indicating the position of the current pixel in a block, as a coding parameter which characterizes an error distribution. Loop filter 120 determines an asymmetrical filter characteristic across a block boundary based on the position (S121).

Next, loop filter 120 executes filtering with the determined filter characteristic (S122).

Here, a pixel distant from a reference pixel in intra prediction is likely to have a large error than a pixel close to the reference pixel in intra prediction. Accordingly, loop filter 120 determines the filter characteristic so that the pixel value of the pixel more distant from the reference pixel in intra prediction changes by a larger change amount before and after filtering.

Figure 15:
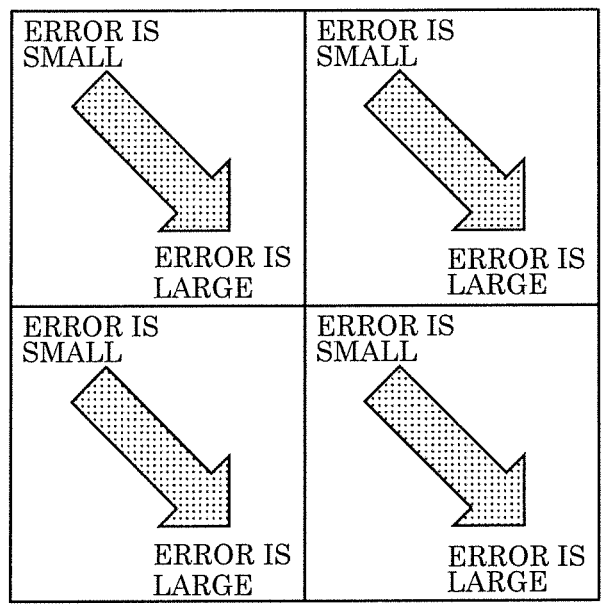
FIG. 15 is a diagram indicating relationships between pixel positions and errors in blocks according to Embodiment 2.

For example, in the case of H.265/HEVC or JEM, as indicated in FIG. 15, a pixel close to a reference pixel is a pixel present at an upper-left part of a block, and a pixel distant from a reference pixel is a pixel present at a lower-right part of the block. Accordingly, loop filter 120 determines the filter characteristic so that the weight for the lower-right pixel in the block becomes larger than the weight for the upper-left pixel.

Specifically, loop filter 120 determines the filter characteristic so that the pixel distant from the reference pixel in intra prediction is more affected by filtering as described in Embodiment 1. In other words, loop filter 120 increases the weight for the pixel distant from the reference pixel in intra prediction. Here, as described above, increasing a weight is performing at least one of: (1) decreasing a filter coefficient; (2) increasing a filter coefficient for a pixel across a boundary (that is, a pixel close to a reference pixel in intra prediction); (3) increasing a coefficient which is multiplied with a change amount; (4) increasing an offset value for a change amount; (5) increasing a clip width; and (6) changing a threshold value so as to increase the likeliness of filtering. As for the pixel close to the reference pixel in intra prediction, loop filter 120 determines a filter characteristic so that the pixel is less affected by filtering. In other words, loop filter 120 decreases the weight for the pixel close to the reference pixel in intra prediction. Here, as described above, decreasing a weight is performing at least one of: (1) increasing a filter coefficient; (2) decreasing a filter coefficient for a pixel across a boundary (that is, a pixel close to a reference pixel in intra prediction); (3) decreasing a coefficient which is multiplied with a change amount; (4) decreasing an offset value for a change amount; (5) decreasing a clip width; and (6) changing a threshold value so as to decrease the likeliness of filtering.

It is to be noted that the above processing may be performed when intra prediction is used, and may not by performed for a block for which inter prediction is used. However, since the property of an intra prediction block may have an influence in inter prediction, the above-described processing may be performed also on an inter prediction block.

In addition, loop filter 120 may change weights by arbitrarily specifying positions in a particular block. For example, loop filter 120 may increase the weight of a lower-right pixel in a block and decrease the weight of an upper-left pixel in the block as described above. It is to be noted that loop filter 120 may change weights by arbitrarily specifying positions other than the upper-left and lower-right positions in the particular block.

In addition, as indicated in FIG. 15, left-side blocks have a large error and right-side blocks have a small error at the boundaries of horizontally neighboring blocks. Thus, loop filter 120 may increase the weights for the left-side blocks and decrease the weights for the right-side blocks at the boundaries of horizontally neighboring blocks.

Likewise, at the boundaries of vertically neighboring blocks, upper-side blocks have a large error, and lower-side blocks have a small error. Thus, loop filter 120 may increase the weights for the upper-side blocks and decrease the weights for the lower-side blocks at the boundaries of vertically neighboring blocks.

In addition, loop filter 120 may change weights according to the distances from a reference pixel in intra prediction. In addition, loop filter 120 may determine weights in units of a block boundary, or may determine weights in units of a pixel. Errors are likely to be large with increase in distance from a reference pixel. Thus, loop filter 120 determines a filter characteristic so that the gradient of weights becomes sharp with increase in distance from the reference pixel. In addition, loop filter 120 determines the filter characteristic so that the weight gradient in the upper side of the right side of a block is gentler than the weight gradient in the lower side thereof.

Embodiment 3

In this embodiment, loop filter 120 determines a filter characteristic according to an orthogonal transform basis.

Figure 16:
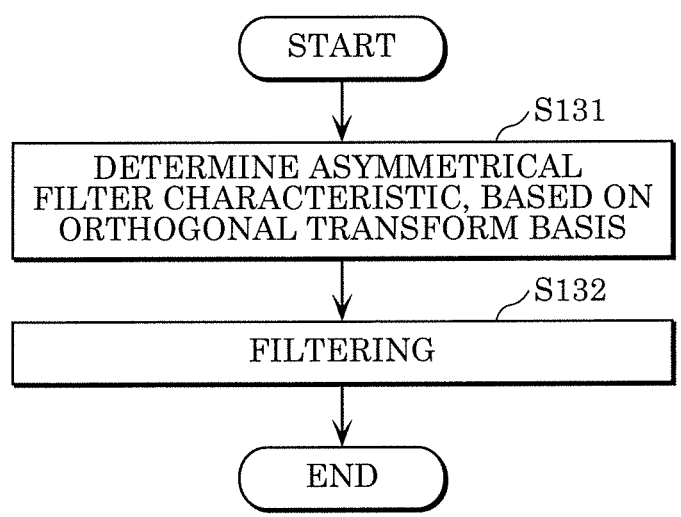
FIG. 16 is a flowchart of deblocking filtering according to Embodiment 3.

FIG. 16 is a flowchart indicating an example of deblocking filtering according to this embodiment. First, loop filter 120 obtains information indicating orthogonal transform basis used for a current block, as a coding parameter which characterizes an error distribution. Loop filter 120 determines an asymmetrical filter characteristic across a block boundary based on the orthogonal transform basis (S131).

Next, loop filter 120 executes filtering with the determined filter characteristic (S132).

Figure 17:
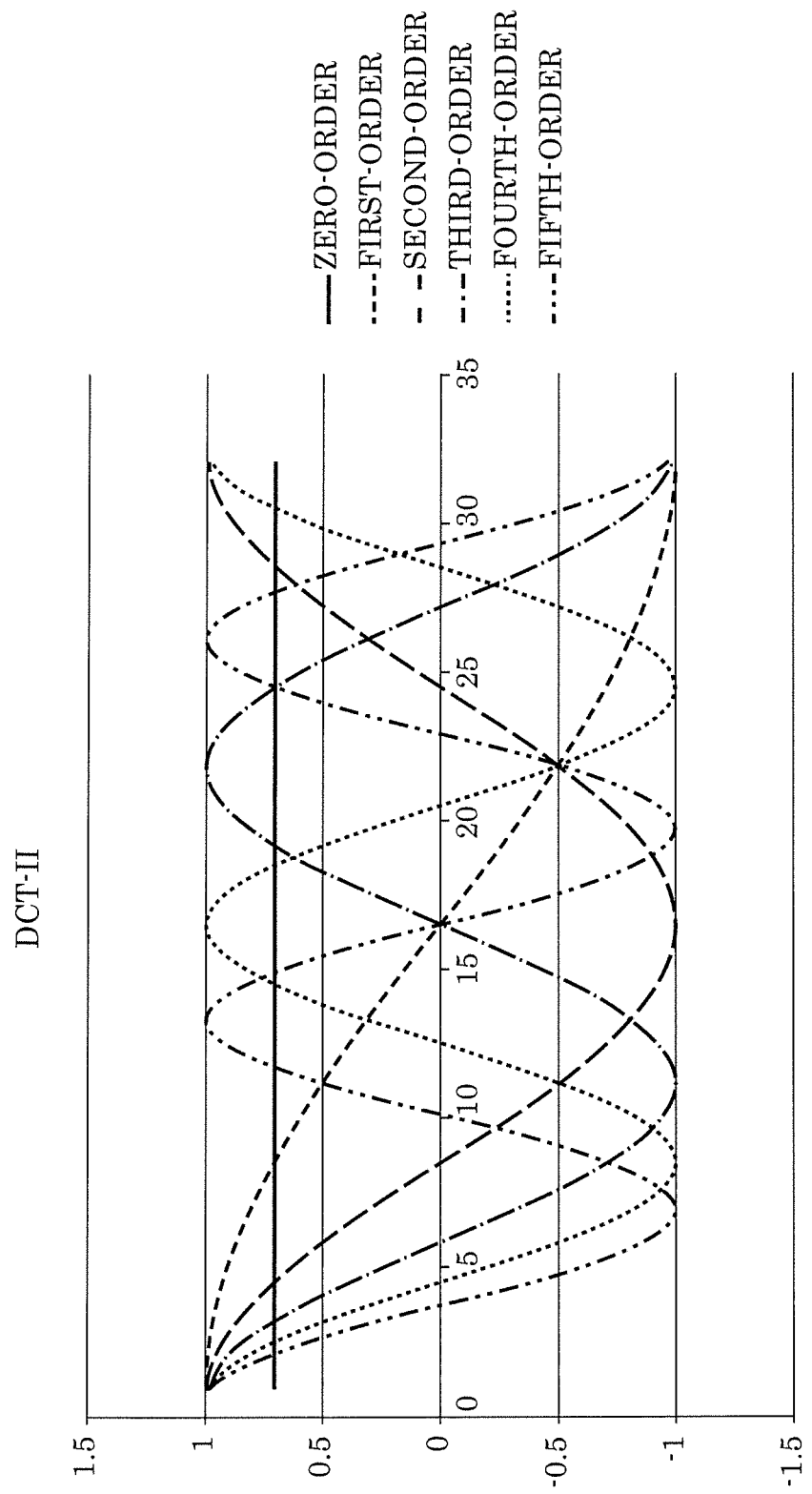
FIG. 17 is a diagram indicating DCT-II transform basis according to Embodiment 3.
Figure 18:
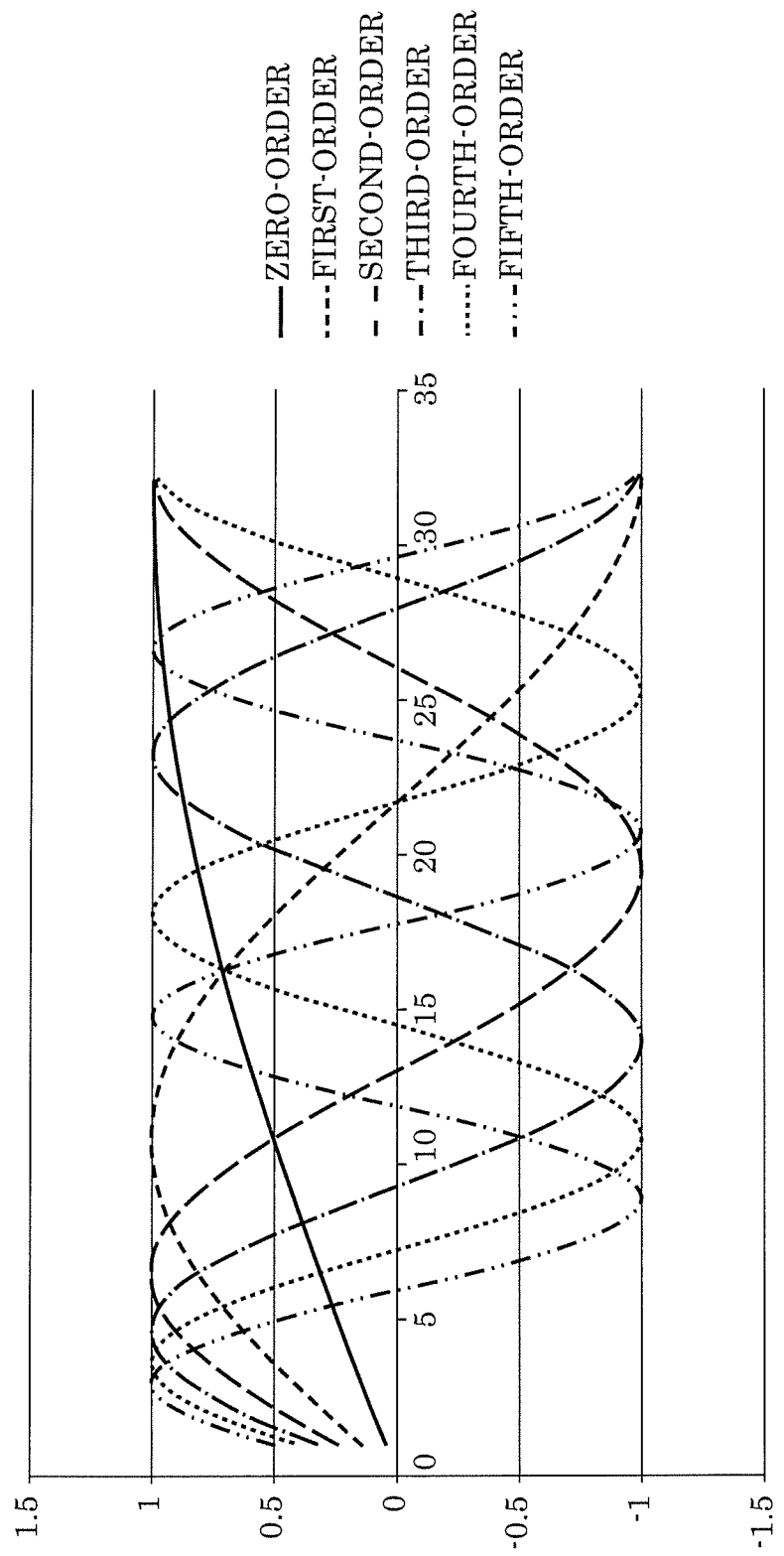
FIG. 18 is a diagram indicating DST-VII transform basis according to Embodiment 3.

Encoder 100 selects an orthogonal transform basis which is a transform basis at the time when orthogonal transform is performed, from a plurality of candidates. The plurality of candidates include, for example, a flat basis whose zero-order transform basis is flat such as DCT-II, or the like, and a basis whose zero-order transform basis is not flat such as DST-VII, or the like. FIG. 17 is a diagram indicating a DCT-II transform basis. FIG. 18 is a diagram indicating a DCT-VII transform basis.

The zero-order basis in DCT-II is constant regardless of the positions in a block. In other words, when DCT-II is used, errors in the blocks are constant. Thus, when both blocks across a block boundary have been transformed using DCT-II, loop filter 120 performs filtering using a symmetrical filter without using an asymmetrical filter.

In contrast, the value of the zero-order basis in DST-VII becomes large with increase in distance from a left or upper block boundary. In other words, errors are likely to be large with increase in distance from the left or upper block boundary. Thus, loop filter 120 uses an asymmetrical filter when at least one of the two blocks across a block boundary has been transformed using DST-VII. Specifically, loop filter 120 determines a filter characteristic so that a pixel having a smaller value of a lower-order (for example, zero-order) basis in a block is less affected by filtering.

More specifically, when both blocks across a block boundary have been transformed using DST-VII, loop filter 120 determines the filter characteristic so that a lower-right pixel in the block is more affected by filtering according to the above-described approach. In addition, loop filter 120 determines the filter characteristic so that an upper-left pixel in the block is less affected by filtering.

In addition, also when a block for which DST-VII has been used and a block for which DCT-II has been used neighbor vertically, loop filter 120 determines a filter characteristic so that a filter weight for a pixel in the lower part of the upper block for which DST-VII has been used and which neighbors a block boundary becomes larger than a filter weight for a pixel in the upper part of the lower block for which DCT-II has been used and which neighbors the block boundary. However, the difference in the amplitude of a low-order basis in this case is smaller than the difference in the amplitude of the lower-order basis when blocks for which DST-VII has been used neighbor each other. Thus, loop filter 120 sets a filter characteristic so that the weight gradient in this case becomes smaller than the weight gradient in the case where blocks for which DST-VII has been used neighbor each other. For example, loop filter 120 sets the weights in the case where a block for which DCT-II has been used and a block for which DCT-II has been used neighbor vertically to 1:1 (a symmetrical filter), the weights in the case where a block for which DST-VII has been used and a block for which DST-VII has been used neighbor vertically to 1.3:0.7, and the weights in the case where a block for which DST-VII has been used and a block for which DCT-II has been used neighbor vertically to 1.2:0.8.

Embodiment 4

In this embodiment, loop filter 120 determines a filter characteristic according to the pixel values of pixels across a block boundary.

Figure 19:
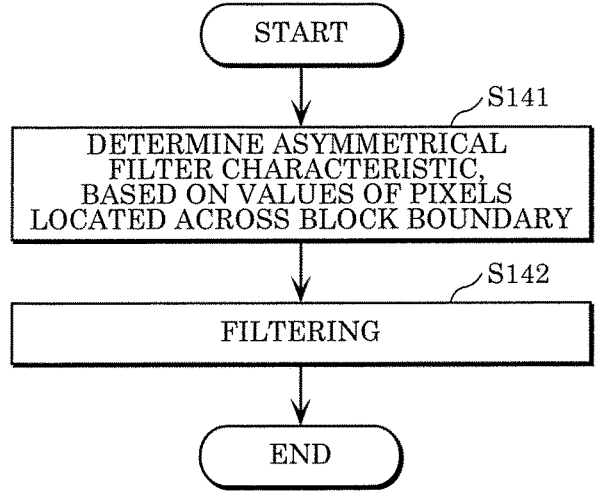
FIG. 19 is a flowchart of deblocking filtering according to Embodiment 4.

FIG. 19 is a flowchart indicating an example of deblocking filtering according to this embodiment. First, loop filter 120 obtains information indicating the pixel values of pixels in blocks across a boundary, as a coding parameter which characterizes an error distribution. Loop filter 120 determines an asymmetrical filter characteristic across the block boundary based on the pixel values (S141).

Next, loop filter 120 executes filtering with the determined filter characteristic (S142).

For example, loop filter 120 increases the difference in filter characteristic across a block boundary with increase in difference d0 in pixel value. Specifically, loop filter 120 determines a filter characteristic so that the difference in influence by filtering becomes large. For example, loop filter 120 sets weights to 1.4:0.6 when d0>(quantization parameter)×(constant) is satisfied, and sets weights to 1.2:0.8 when d0>(quantization parameter)×(constant) is not satisfied. In other words, loop filter 120 compares difference d0 in pixel value and a threshold value based on a quantization parameter, and when difference d0 in pixel value is larger than the threshold value, increases the difference in filter characteristic across the block boundary so that the difference becomes larger than when difference d0 in pixel value is smaller than the threshold value.

As another example, loop filter 120 increases the difference in filter characteristic across a block boundary with increase in average value b0 of variance in pixel value in both blocks across the boundary. Specifically, loop filter 120 may determine a filter characteristic so that the difference in influence by filtering becomes large. For example, loop filter 120 sets weights to 1.4:0.6 when b0>(quantization parameter)×(constant) is satisfied, and sets weights to 1.2:0.8 when b0>(quantization parameter)×(constant) is not satisfied. In other words, loop filter 120 compares variance b0 in pixel value and a threshold value based on a quantization parameter, and when variance b0 in pixel value is larger than the threshold value, increases the difference in filter characteristic across the block boundary so that the difference becomes larger than when variance b0 in pixel value is smaller than the threshold value.

It is to be noted that the block whose weight is to be increased among neighboring blocks, that is, the block having a larger error can be identified according to the approach of Embodiment 2 or 3 described above or approaches, etc. according to Embodiment 6 to be described later. In other words, loop filter 120 determines an asymmetrical filter characteristic across a block boundary according to a predetermined rule (for example, the approach according to Embodiment 2, 3, or 6). Next, loop filter 120 changes the determined filter characteristic so that the difference in filter characteristic across the block boundary becomes large based on difference d0 in pixel values. In other words, loop filter 120 increases the ratio or difference between the weight for a pixel having a large error and the weight for a pixel having a small error.

Here, when difference d0 in pixel value is large, there is a possibility that a block boundary coincides with the edge of an object in an image. In such a case, it is possible to reduce unnecessary smoothing by decreasing the difference in filter characteristic across the block boundary.

On the contrary, it is to be noted that loop filter 120 may decrease the difference in filter characteristic across the block boundary with increase in difference d0 in pixel value. Specifically, loop filter 120 determines a filter characteristic so that the difference in influence by filtering becomes small. For example, loop filter 120 sets weights to 1.2:0.8 when d0>(quantization parameter)×(constant) is satisfied, and sets weights to 1.4:0.6 when d0>(quantization parameter)×(constant) is not satisfied. It is to be noted that the weights may be set to 1:1 (symmetrical filter) when the above relationship is satisfied. In other words, loop filter 120 compares difference d0 in pixel value and a threshold value based on a quantization parameter, and when difference d0 in pixel value is larger than the threshold value, decreases the difference in filter characteristic across the block boundary so that the difference becomes smaller than when difference d0 in pixel value is smaller than the threshold value.

For example, when difference d0 in pixel value is large, a block boundary tends to be noticeable. In such a case, it is possible to reduce weakening of smoothing by an asymmetrical filter by decreasing the difference in filter characteristic across the block boundary.

It is to be noted that these two processes may be performed at the same time. For example, loop filter 120 may use a first weight when difference d0 in pixel value is less than a first threshold value, uses a second weight for a larger difference than the difference for which the first weight is used, when difference d0 in pixel value is larger than or equal to the first threshold value and less than the second threshold value, and uses a third weight for a smaller difference than the difference for which the second weight is used, when difference d0 in pixel value is larger than or equal to the second threshold value.

In addition, difference d0 in pixel value may be the difference per se between pixel values of pixels across a boundary, or the average or variance of the differences between the pixel values of the pixels. For example, difference d0 in pixel value is calculated according to $(A \times (q1-p1) - B \times (q2-p2) + C)/D$. Here, A, B, C, and D are constants. For example, A=9, B=3, C=8, and D=16 are satisfied. In addition, p1, p2, q1, and q2 are pixel values of pixels located across a block boundary and are in a positional relationship indicated in FIG. 12.

It is to be noted that difference d0 in pixel value and weights for pixels may be set in units of a pixel, in units of a block boundary, or in units of a block group including a plurality of blocks (for example, in units of a largest coding unit (LCU)).

Embodiment 5

In this embodiment, loop filter 120 determines a filter characteristic according to an intra prediction direction and a block boundary direction.

Figure 20:
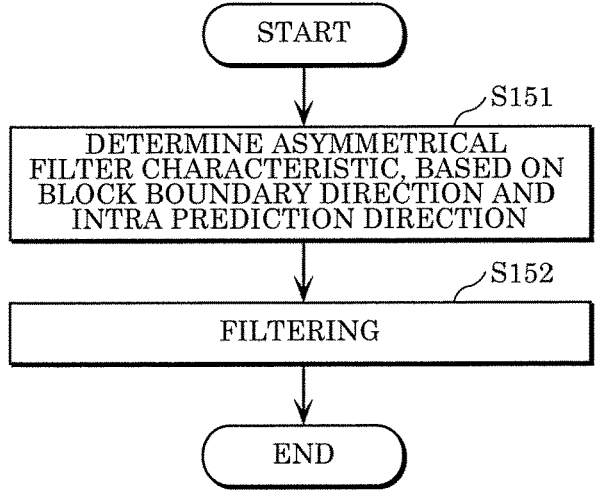
FIG. 20 is a flowchart of deblocking filtering according to Embodiment 5.

FIG. 20 is a flowchart indicating an example of deblocking filtering according to this embodiment. First, loop filter 120 obtains information indicating an angle between the intra prediction direction and the block boundary, as a coding parameter which characterizes an error distribution. Loop filter 120 determines an asymmetrical filter characteristic across a block boundary, based on the angle (S151).

Next, loop filter 120 executes filtering with the determined filter characteristic (S152).

Figure 21:
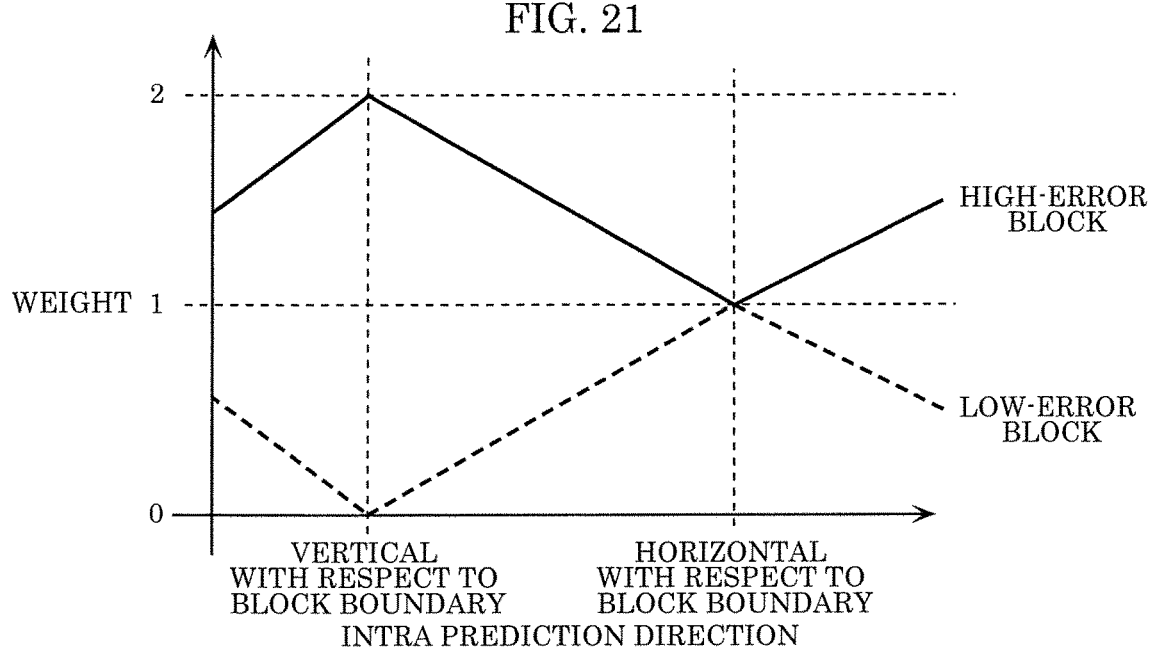
FIG. 21 is a diagram indicating examples of weights based on intra prediction directions and block boundary directions according to Embodiment 5.

Specifically, loop filter 120 increases the difference in filter characteristic across a block boundary more significantly as the angle is closer to the vertical axis, and decreases the difference in filter characteristic across a block boundary more significantly as the angle is closer to the horizontal axis. More specifically, loop filter 120 determines the filter characteristic so that the difference between filter weights for pixels at both sides across a block boundary becomes large when the intra prediction direction is close to the vertical axis relative to the block boundary, and the difference between filter weights for pixels at both sides across a block boundary becomes small when the intra prediction direction is close to the horizontal axis relative to the block boundary. FIG. 21 is a diagram indicating examples of weights for relationships between intra prediction directions and block boundary directions.

It is to be noted that the block whose weight is to be increased among neighboring blocks, that is, the block having a larger error can be identified according to the approach of Embodiment 2 or 3 described above or approaches, etc. according to Embodiment 6 to be described later. In other words, loop filter 120 determines an asymmetrical filter characteristic across a block boundary according to a predetermined rule (for example, the approach according to Embodiment 2, 3, or 6). Next, loop filter 120 changes the determined filter characteristic so that the difference in filter characteristic across the block boundary becomes large based on the intra prediction direction and the block boundary direction.

In addition, encoder 100 and decoder 200 identify the intra prediction direction using, for example, an intra prediction mode.

It is to be noted that when the intra prediction mode is Planner mode or DC mode, loop filter 120 does not always need to consider the block boundary direction. For example, when the intra prediction mode is Planar mode or DC mode, loop filter 120 may use a predetermined weight or the difference in weight regardless of the block boundary direction. Alternatively, loop filter 120 may use a symmetrical filter when the intra prediction mode is Planar mode or DC mode.

Embodiment 6

In this embodiment, loop filter 120 determines a filter characteristic according to a quantization parameter indicating a quantization width.

Figure 22:
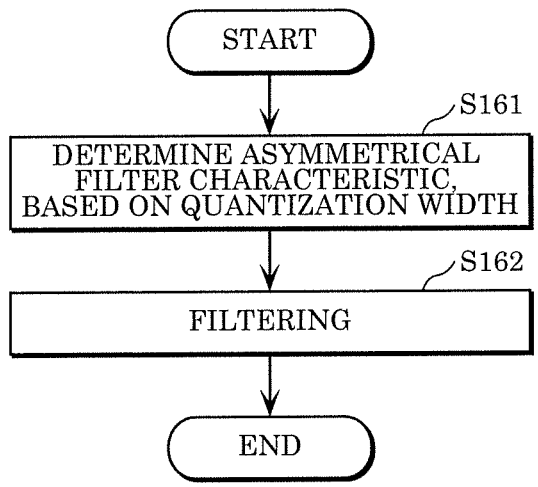
FIG. 22 is a flowchart of deblocking filtering according to Embodiment 6.

FIG. 22 is a flowchart indicating an example of deblocking filtering according to this embodiment. First, loop filter 120 obtains information indicating the quantization parameter used in the quantization of a current block, as a coding parameter which characterizes an error distribution. Loop filter 120 determines an asymmetrical filter characteristic across a block boundary, based on the quantization parameter (S161).

Next, loop filter 120 executes filtering with the determined filter characteristic (S162).

Here, an error is likely to be large when a quantization parameter is larger. Thus, loop filter 120 determines a filter characteristic so that influence of filtering becomes large as the quantization parameter becomes larger.

Figure 23:
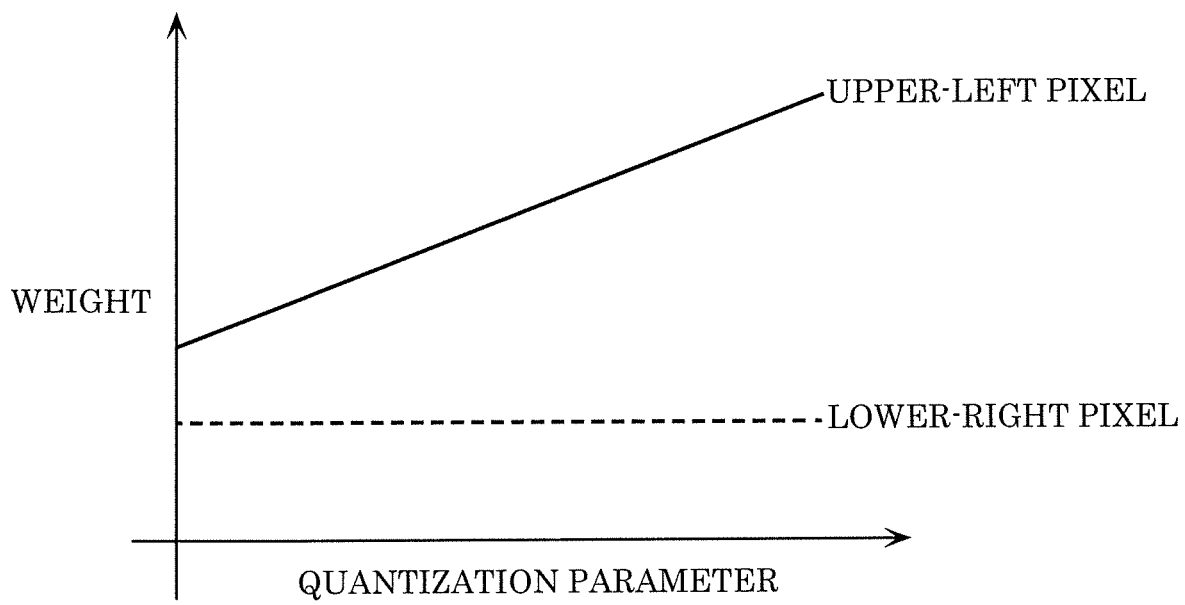
FIG. 23 is a diagram indicating examples of weights based on quantization parameters according to Embodiment 6.

FIG. 23 is a diagram indicating an example of weights for quantization parameters. As shown in FIG. 23, loop filter 120 increases the weight for the upper-left pixel in a block with increasing quantization parameter. On the contrary, loop filter 120 decreases the weight for the lower-right pixel in the block with increasing quantization parameter. In other words, loop filter 120 determines a filter characteristic so that change in influence of filtering with changing quantization parameter for the upper-left pixel becomes larger than change in influence of filtering with changing quantization parameter for the lower-right pixel.

Here, the upper-left pixel in the block is more likely to be affected by a quantization parameter than the lower-right pixel in the block. Thus, it is possible to reduce errors appropriately by performing the processing as described above.

In addition, loop filter 120 may determine, for each of two blocks across a boundary, a weight for the block based on the quantization parameter for the block, or may calculate an average value of quantization parameters for the two blocks and determine weights for the two blocks based on the average value. Alternatively, loop filter 120 may determine weights for the two blocks based on the quantization parameter for one of the blocks. For example, loop filter 120 determines a weight for the one block based on the quantization parameter for the block using the above-described approach. Next, based on the determined weight, loop filter 120 determines a weight for the other block according to a predetermined rule.

In addition, loop filter 120 may use a symmetrical filter when the quantization parameters for the two blocks are different or when the difference between the quantization parameters for the two blocks exceeds a threshold value.

In addition, in FIG. 23, although weights are set using a linear function, but an arbitrary function other than the linear function or a table may be used. For example, a curve indicating the relationships between quantization parameters and quantization steps (quantization widths) may be used.

In addition, loop filter 20 may use a symmetrical filter without using an asymmetrical filter when a quantization parameter exceeds a threshold value.

In addition, when a quantization parameter is described at a decimal accuracy, loop filter 120 may perform a calculation that is, for example, a round-off, a round-up, a cut-off, or the like onto the quantization parameter and use the quantization parameter after being subjected to the calculation in the above-described processing. Alternatively, loop filter 120 may perform the processing taking into account the decimal point level.

Although the plurality of approaches for determining errors have been described in Embodiments 2 to 6, two or more of these approaches may be combined. In this case, loop filter 120 may perform weighting on combined two or more elements.

Hereinafter, a variation is described.

Examples other than the examples of coding parameters described above may be used. For example, coding parameters may be the kind of orthogonal transform (such as Wavelet, DFT, lapped transform, or the like), a block size (the width and height of a block), a motion vector direction, the length of a motion vector, the number of reference pictures which are used in inter prediction, and information indicating a reference filter characteristic. Alternatively, these parameters may be used in combination. For example, loop filter 120 may use an asymmetrical filter only when the length of a block boundary corresponds to 16 pixels or less and a current pixel to be filtered is close to a reference pixel in intra prediction, and may use a symmetrical filter in the other cases. As another example, asymmetrical processing may be performed only when a filter of a predetermined type among a plurality of filter candidates has been used. For example, an asymmetrical processing may be used only when a variation by a reference filter is calculated according to $(A \times (q1-p1) - B \times (q2-p2) + C) / D$. Here, A, B, C, and D are constants. For example, $A=9$, $B=3$, $C=8$, and $D=16$ are satisfied. In addition, p1, p2, q1, and q2 are pixel values of pixels located across a block boundary and are in a positional relationship indicated in FIG. 12.

In addition, loop filter 120 may perform the processing on only one of a luminance signal and a chrominance signal or on the both. In addition, loop filter 120 may perform common processing or different processing on the luminance signal and the chrominance signal. For example, loop filter 120 may use different weights for the luminance signal and the chrominance signal, or may determine weights according to different rules.

In addition, various kinds of parameters for use in the above processing may be determined by encoder 100, or may be preset fixed values.

In addition, whether to perform the above processing or the details of the processing may be switched based on a predetermined unit. Examples of the predetermined unit include a slice unit, a tile unit, a wavefront dividing unit, or a CTU unit. In addition, the details of the processing are which one of the plurality of approaches described above is used, or parameters indicating weights, etc., or parameters for determining these.

In addition, loop filter 120 may limit the area in which the above processing are performed to a CTU boundary, a slice boundary, or a tile boundary.

In addition, the number of filter taps may vary between a symmetrical filter and an asymmetrical filter.

In addition, loop filter 120 may change whether to perform the above processing or the details of the processing according to a frame type (I-frame, P-frame, or B-frame).

In addition, loop filter 120 may determine whether to perform the processing or the details of the processing according to whether particular processing at a pre-stage or a post-stage has been performed.

In addition, loop filter 120 may perform different processing according to the kind of the prediction mode used for a block, or may perform the above processing only on a block for which a particular prediction mode is used. For example, loop filter 120 may perform different processing between a block for which intra prediction is used, a block for which inter prediction is used, and a merged block.

In addition, encoder 100 may encode filter information which is parameters indicating whether to perform the above processing or the details of the processing. In other words, encoder 100 may generate an encoded bitstream including filter information. This filter information may include information indicating whether to perform the above processing on a luminance signal, information indicating whether to perform the above processing on a chrominance signal, information indicating whether to change processing according to respective prediction modes, or other information.

In addition, decoder 200 may perform the above processing based on filter information included in an encoded bitstream. For example, decoder 200 may determine whether to perform the above processing or the details of the processing, based on the filter information.

Embodiment 7

In this embodiment, loop filter 120 determines a filter characteristic according to an orthogonal transform basis, as in Embodiment 3 described above. It is to be noted that this embodiment indicates the configuration and processing in Embodiment 3 described above more specifically, and particularly describes the configuration and processing for determining a filter characteristic according to combinations of orthogonal transform bases of mutually neighboring blocks. In addition, loop filter 212 in decoder 200 is configured similarly to loop filter 120 of encoder 100, and performs processing operation similar to that of loop filter 120. Accordingly, in this embodiment, the configuration and processing operation of loop filter 120 of encoder 100 is described, and the configuration and processing operation of loop filter 212 of decoder 200 is not described in detail.

Various orthogonal transform bases are used for orthogonal transform which is used in image encoding. For this reason, an error distribution may not be spatially uniform. It is to be noted that an orthogonal transform basis is also referred to as a transform basis, or simply as a basis.

Specifically, in image encoding, a residual between a prediction signal and an original signal which is generated by inter prediction or intra prediction is orthogonal-transformed, and quantized. In this way, the amount of data is reduced. Quantization is irreversible processing, and thus encoded image includes differences from a pre-encoding image, that is, errors.

However, an error distribution caused by encoding is not always spatially uniform even with the use of a constant quantization parameter. The error distribution is considered to depend on orthogonal transform bases.

In other words, transformer 106 selects a transform basis at the time of performing orthogonal transform from a plurality of candidates. At this time, for example, a DCT-II basis may be selected as a basis whose zero-order transform basis is flat, and a DST-VII basis may be selected as a basis whose zero-order transform basis is not flat.

Figure 24:
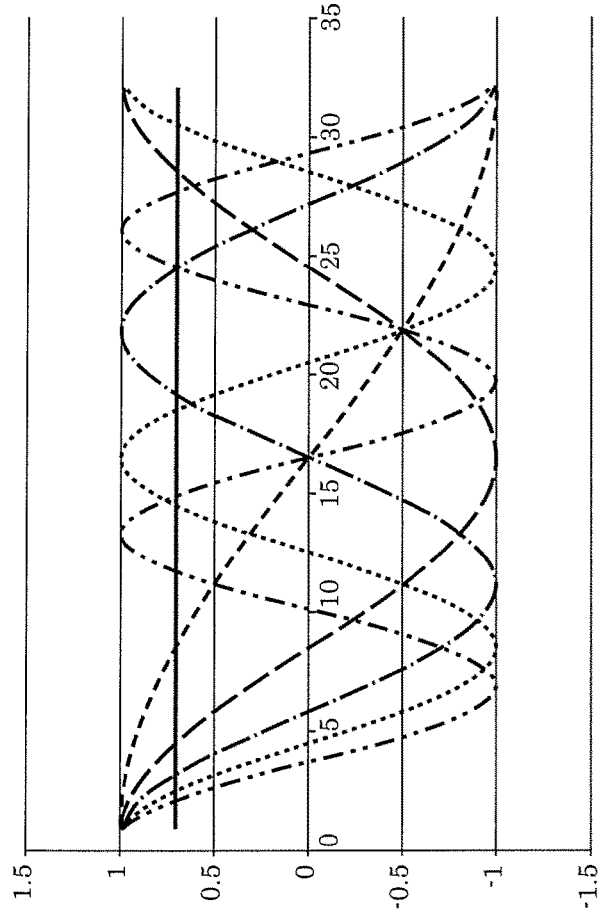
FIG. 24 is a diagram indicating DCT-II which is an example of a basis.

FIG. 24 is a diagram indicating DCT-II which is an example of a basis. It is to be noted that the horizontal axis of the graph in FIG. 24 indicates positions on a one-dimensional space, and the vertical axis thereof indicates basis values (that is, amplitudes). Here, k denotes a basis order, n denotes a position on the one-dimensional space, and N denotes the number of pixels to be orthogonal-transformed. It is to be noted that position n on the one-dimensional space is a position in the horizontal direction or a position in the vertical direction, and that the values of n increase from left to right in the horizontal direction and from top to bottom in the vertical direction. Furthermore, $x_n$ denotes the pixel value (specifically, a residual) of a pixel at position n, and Xk denotes a result of frequency transform in the k-th order, that is a transform coefficient.

In DCT-II, transform coefficient Xo is indicated according to Expression (3) below when k=0 is satisfied.

[Math. 3]

$$X_0 = \sqrt{\frac{2}{N}} \cdot \sqrt{\frac{1}{2}} \quad (3)$$

In DCT-II, transform coefficient Xk is indicated according to Expression (4) below when 1≤k≤N−1 is satisfied.

[[Math. 4]]

$$X_k = \sqrt{\frac{2}{N}} \cdot \sum_{n=0}^{N-1} x_n \cdot \cos\left\{\frac{\pi}{N}\left(n + \frac{1}{2}\right)k\right\} \quad (4)$$

Figure 25:
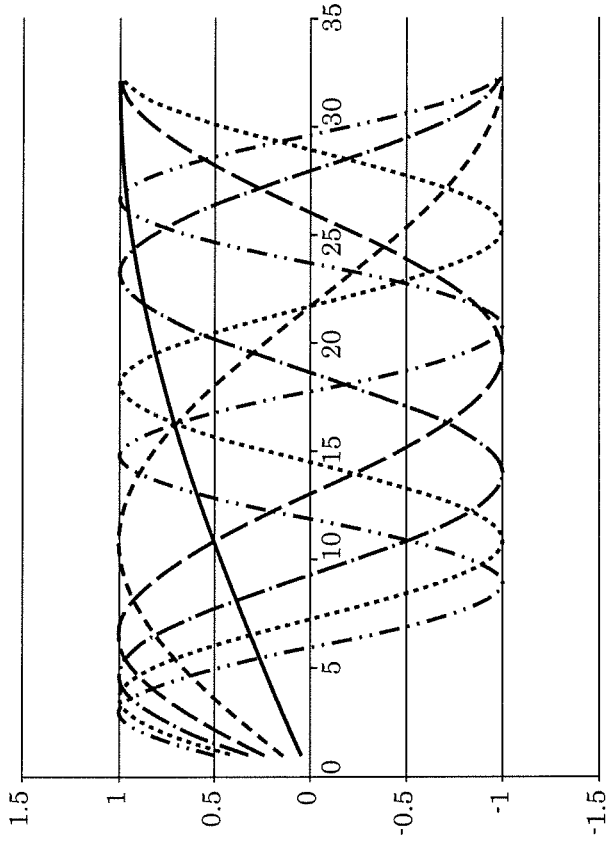
FIG. 25 is a diagram indicating DST-VII which is an example of a basis.

FIG. 25 is a diagram indicating DST-VII which is an example of a basis. It is to be noted that the horizontal axis in FIG. 25 indicates positions on a one-dimensional space, and the vertical axis thereof indicates basis values (that is, amplitudes).

In DST-VII, transform coefficient Xk is indicated according to Expression (5) below when 0≤k≤N−1 is satisfied.

[[Math. 5]]

$$X_k = \sqrt{\frac{2}{N + \frac{1}{2}}} \cdot \sum_{n=0}^{N-1} x_n \cdot \sin\left\{\frac{\pi}{N + \frac{1}{2}}(n + 1)\left(k + \frac{1}{2}\right)\right\} \quad (5)$$

In this way, a transform coefficient is basically determined according to Σ (pixel value×transform basis). In addition, a transform coefficient for a lower-order basis is likely to be larger than a transform coefficient for a higher-order basis. For this reason, if a DST-VII basis whose zero-order basis is not flat is used as a transform basis, deviation occurs in an error distribution according to the values of a low-order bases (that is, amplitudes) even if the same amount of quantization errors are added to transform coefficients. In other words, in a block, in an upper-side or left-side area in which the value of a low-order basis is small is likely to have a small error, and, on the contrary, in the block, in a lower-side or right-side area in which the value of a low-order basis is large is likely to have a large error.

Figure 26:
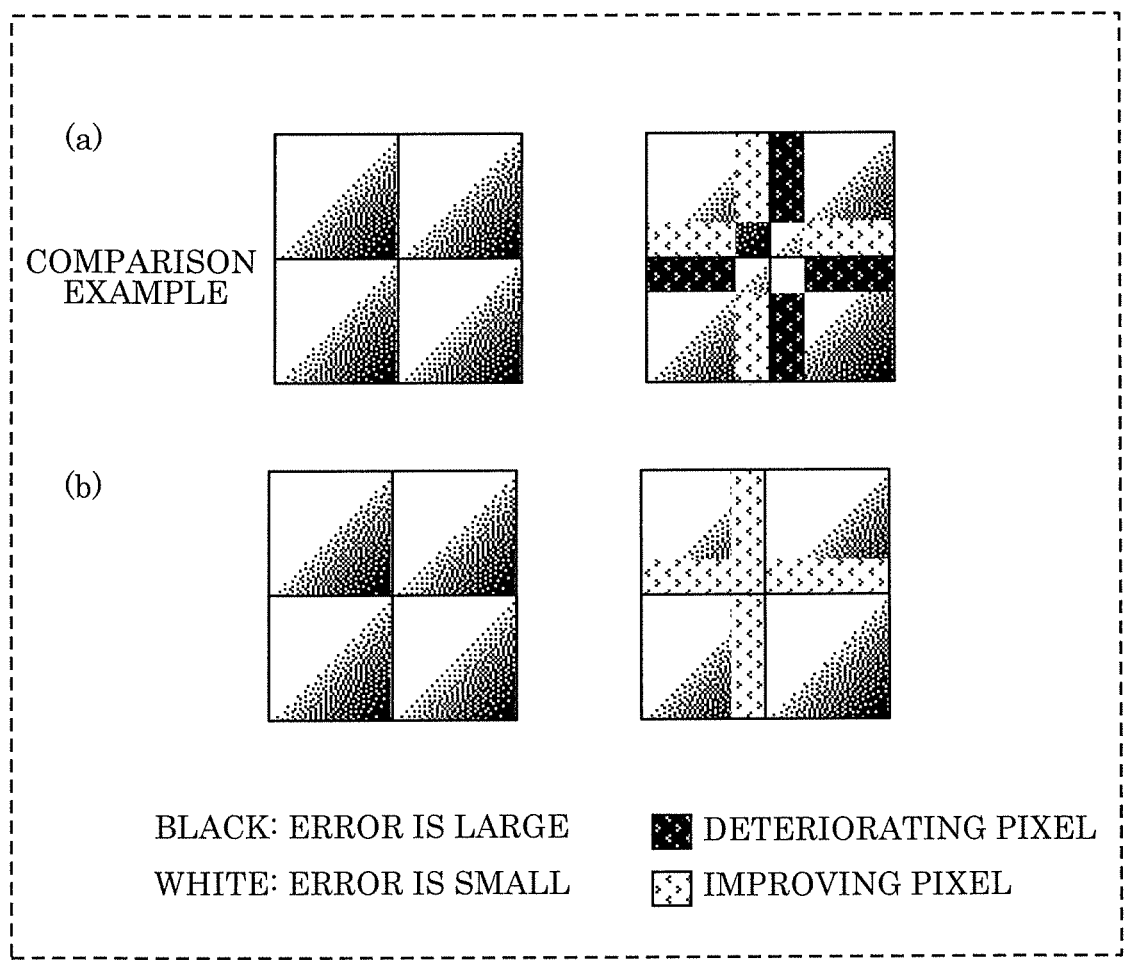
FIG. 26 is a diagram indicating error distributions of four blocks which neighbor each other and deblocking-filtered error distributions of the four blocks.

FIG. 26 is a diagram indicating error distributions of four neighboring blocks and deblocking-filtered error distributions of the four neighboring blocks.

As indicated in the left sides of (a) and (b) in FIG. 26, when DST-VII is used for orthogonal transform of the respective four blocks, errors are small in the upper-side or left-side areas in these blocks, and, on the contrary, errors are large in the lower-side or right-side areas in these blocks.

When an error distribution is not uniform in this way, there is a problem that areas in which errors which inevitably become large occur as indicated in the right sides of (a) in FIG. 26 when deblocking filtering having a symmetrical filter characteristic is performed on block boundaries. In other words, when an area having a large error and an area having a small error neighbor each other, an unnecessary error is inevitably included in the pixels which originally have a small error.

For this reason, in this embodiment, an error distribution is estimated based on the basis used in the orthogonal transform of a block, and deblocking filtering is performed based on the result. In this way, as indicated in (b) of FIG. 26, it is possible to reduce errors in the pixels which have originally a large error without including an error in the pixels which have originally have a small error.

Figure 27:
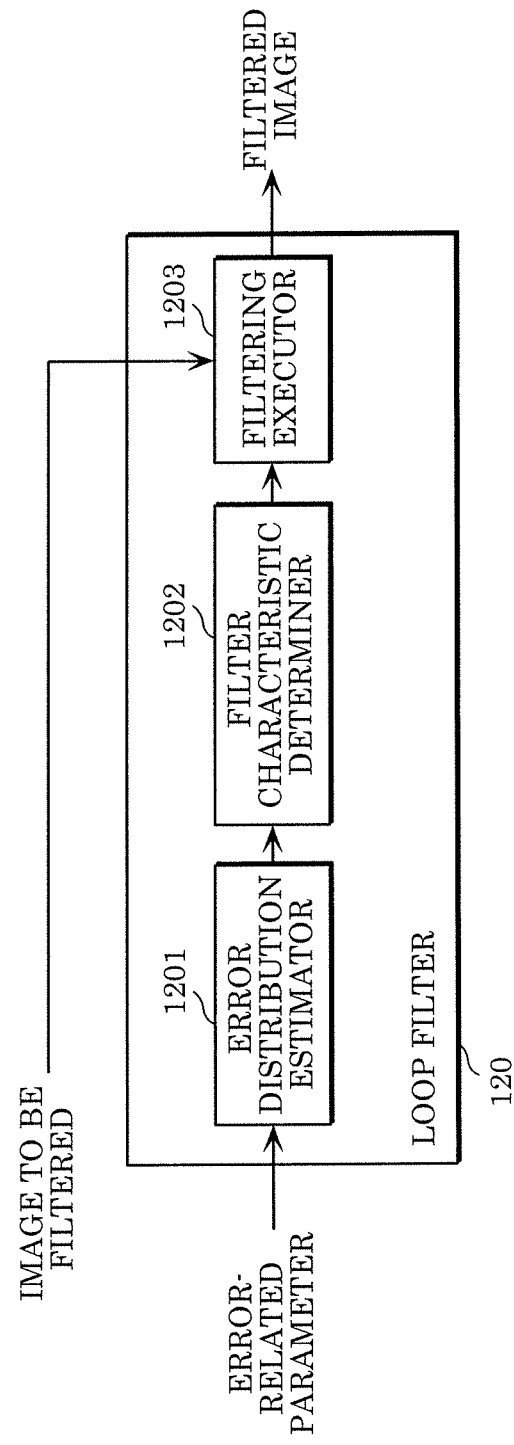
FIG. 27 is a diagram indicating main constituent elements of a loop filter according to Embodiment 7.

FIG. 27 is a block diagram indicating main constituent elements of loop filter 120 according to this embodiment.

Loop filter 120 includes: error distribution estimator 1201; filter characteristic determiner 1202; and filtering executor 1203.

Error distribution estimator 1201 estimates an error distribution based on an error-related parameter. The error-related parameter is a parameter which affects the magnitude of an error, and, for example, indicates each of the types of bases applied in the orthogonal transform of respective two blocks across a block boundary to be deblocking-filtered.

Filter characteristic determiner 1202 determines a filter characteristic based on an error distribution estimated by error distribution estimator 1201.

Filtering executor 1203 performs deblocking filtering with a filter characteristic determined by filter characteristic determiner 1202 on a block boundary area.

Figure 28:
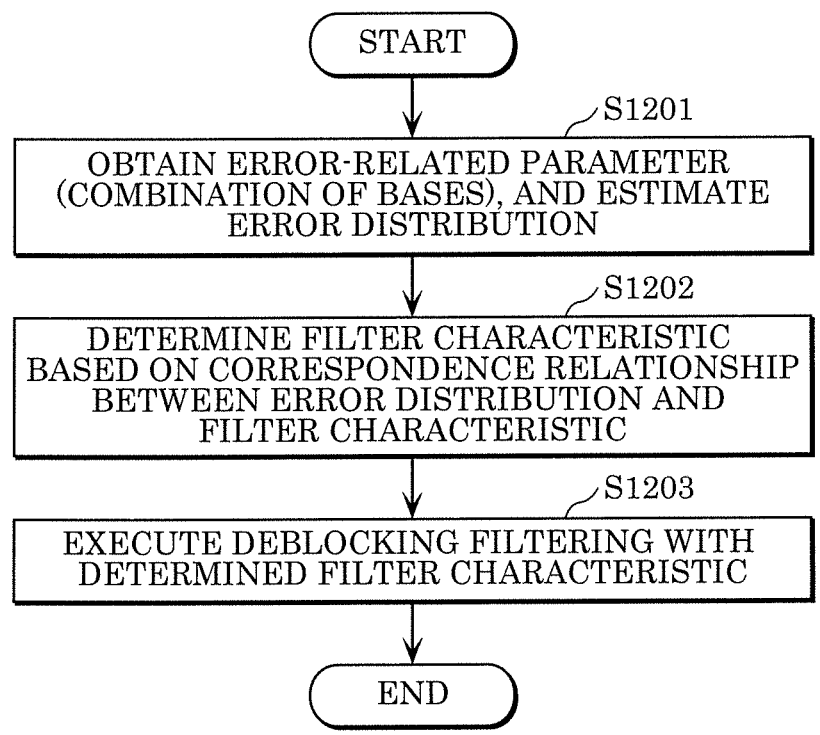
FIG. 28 is a flowchart indicating schematic processing operations performed by the loop filter according to Embodiment 7.

FIG. 28 is a flowchart indicating schematic processing operations performed by loop filter 120 according to this embodiment.

First, error distribution estimator 1201 estimates an error-related parameter. This error-related parameter is a parameter which affects the magnitude of an error. In other words, the error-related parameter is information which characterizes an error distribution in an area to be a target of deblocking filtering. Specifically, an error-related parameter indicates the types of the bases applied in the orthogonal transform of two blocks across a block boundary to be deblocking-filtered, that is, a combination of bases for the two blocks. Error distribution estimator 1201 estimates an error distribution in the area to be a target of deblocking filtering based on the error-related parameter (Step S1201). Specifically, error distribution estimator 1201 selects an i(1≤i≤N)-th error distribution corresponding to the error-related parameter from error distributions classified into N. In this way, the error distribution is estimated.

Next, filter characteristic determiner 1202 determines a filter characteristic according to the estimated distribution error (Step S1202). In other words, filter characteristic determiner 1202 refers to a table in which filter characteristics are associated one-to-one with the N error distributions. Filter characteristic determiner 1202 then finds out, from the table, the filter characteristic associated with the error distribution estimated in Step S1201. In this way, the filter characteristic is determined.

Lastly, filtering executor 1203 executes deblocking filtering in which the filter characteristic determined in Step S1202 is reflected onto an image indicated by an input signal (Step S1203). It is to be noted that the image indicated by the input signal is, for example, a reconstructed image.

In this embodiment, the error-related parameter indicates the types of the bases used in the transform of blocks. Accordingly, in this embodiment, deblocking filtering is performed based on the bases For example, loop filter 120 determines, as a filter characteristic, at least one of filter coefficients and a threshold value according to a combination of orthogonal transform bases used for two blocks which neighbor each other. In other words, the filter coefficient and the threshold value are designed based on the magnitude relationship between errors. Loop filter 120 then performs deblocking filtering with the determined filter characteristic on a current pixel.

In other words, encoder 100 according to this embodiment includes, for example, processing circuitry and memory. The processing circuitry performs the following processing using the memory. In other words, the processing circuitry transforms, using a basis, each of blocks each including a plurality of pixels into a block including a plurality of transform coefficients. Next, the processing circuitry performs at least inverse transform on each of the blocks each including the plurality of transform coefficients to reconstruct the block including the plurality of pixels. Next, the processing circuitry determines a filter characteristic for the boundary between two blocks which neighbor each other and have been reconstructed, based on a combination of bases used to transform the two blocks. The processing circuitry then performs deblocking filtering with the determined filter characteristic.

It is to be noted that, for example, the processing circuitry includes a central processing unit (CPU), and functions as loop filter 120 indicated in FIG. 1. In addition, the memory may be block memory 118 or frame memory 122, or another memory.

Likewise, decoder 200 according to this embodiment includes, for example, processing circuitry and memory. The processing circuitry performs the following processing using the memory. In other words, the processing circuitry performs at least inverse transform on each of the blocks each including a plurality of transform coefficients obtained by transform using a basis, to reconstruct a block including a plurality of pixels. Next, the processing circuitry determines a filter characteristic for the boundary between two blocks which neighbor each other and have been reconstructed, based on a combination of bases respectively used to transform the two blocks. The processing circuitry then performs deblocking filtering with the determined filter characteristic.

It is to be noted that, for example, the processing circuitry includes a central processing unit (CPU), and functions as loop filter 212 indicated in FIG. 10. In addition, the memory may be block memory 210 or frame memory 214, or any other memory.

In this way, the filter characteristic for the boundary between the two blocks which neighbor each other and have been reconstructed are determined based on the combination of the bases used to transform the respective two blocks. Thus, for example, it is possible to determine an asymmetrical filter characteristic for the boundary. As a result, even when errors vary between pixel values of pixels in the two blocks across the boundary, it is possible to increase the possibility of reducing errors by performing deblocking filtering with an asymmetrical filter characteristic.

Figure 29:
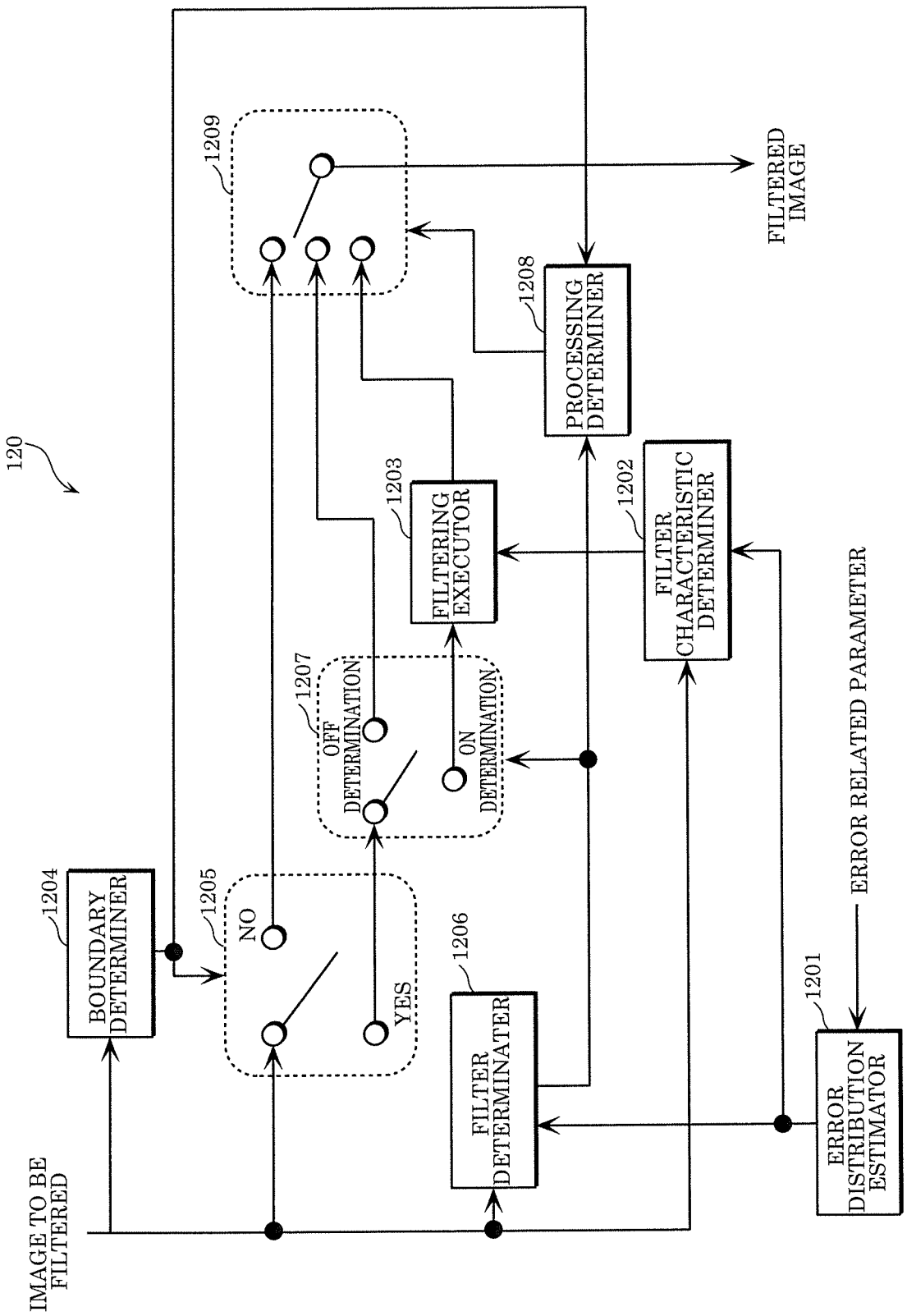
FIG. 29 is a diagram indicating specific constituent elements of the loop filter according to Embodiment 7.

FIG. 29 is a block diagram indicating specific constituent elements of loop filter 120 according to this embodiment.

As in the configuration indicated in FIG. 27, loop filter 120 includes: error distribution estimator 1201; filter characteristic determiner 1202; and filtering executor 1203. Loop filter 120 further includes: switches 1205, 1207, and 1209; boundary determiner 1204; filter determiner 1206; and processing determiner 1208.

Boundary determiner 1204 determines whether a pixel to be deblocking-filtered (that is, a current pixel) is present around a block boundary. Boundary determiner 1204 then outputs the determination result to switch 1205 and processing determiner 1208.

In the case where boundary determiner 1204 has determined that a pixel to be deblocking-filtered is present around a block boundary, switch 1205 outputs a pre-filtering image to switch 1207. In the opposite case where boundary determiner 1204 has determined that no pixel to be deblocking-filtered is present around a block boundary, switch 1205 outputs a pre-filtering image to switch 1209.

Filter determiner 1206 determines whether to perform deblocking filtering on a current pixel, based on the pixel value of at least one neighboring pixel around the current pixel and an error distribution estimated by error distribution estimator 1201. Filter determiner 1206 then outputs the determination result to switch 1207 and processing determiner 1208.

In the case were filter determiner 1206 has determined to perform deblocking filtering on the current pixel, switch 1207 outputs the pre-filtering image obtained through switch 1205 to filtering executor 1203. In the opposite case where filter determiner 1206 has determined not to perform deblocking filtering on the current pixel, switch 1207 outputs the pre-filtering image obtained through switch 1205 to switch 1209.

When obtaining the pre-filtering image through switches 1205 and 1207, filtering executor 1203 executes, on the current pixel, deblocking filtering with the filter characteristic determined by filter characteristic determiner 1202. Filtering executor 1203 outputs the filtered pixel to switch 1209.

Under control by processing determiner 1208, switch 1209 selectively outputs a pixel which has not been deblocking-filtered and a pixel which has been deblocking-filtered by filtering executor 1203.

Processing determiner 1208 controls switch 1209 based on the results of determinations made by boundary determiner 1204 and filter determiner 1206. In other words, processing determiner 1208 causes switch 1209 to output the pixel which has been deblocking-filtered when boundary determiner 1204 has determined that the current pixel is present around the block boundary and filter determiner 1206 has determined to perform deblocking filtering on the current pixel. In addition, other than the above case, processing determiner 1208 causes switch 1209 to output the pixel which has not been deblocking-filtered. A filtered image is output from switch 1209 by repeating output of a pixel in this way.

Figure 30:
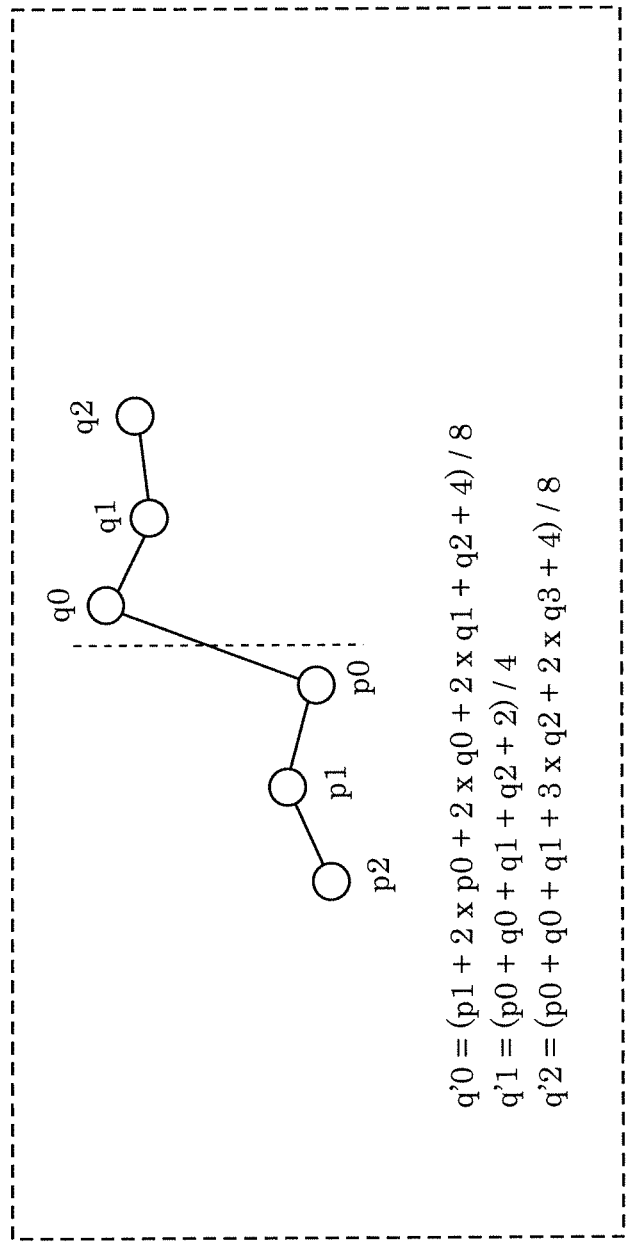
FIG. 30 is a diagram indicating an example of a debloking filter having a symmetrical filtering characteristic with respect to a block boundary.

FIG. 30 is a diagram indicating an example of a debloking filter having a symmetrical filtering characteristic with respect to a block boundary.

In HEVC deblocking filtering, one of two deblocking filters having different properties, that is, a strong filter and a weak filter is selected using pixel values and quantization parameters. In the case of a strong filter, pixels p0 to p2 and pixels q0 to q2 are present across a block boundary as indicated in FIG. 30, the pixel values of the respective pixel q0 to q2 are changed to pixel values q'0 to q'2 by performing calculations according to the expressions below.

$$q'0 = (p1 + 2 \times p0 + 2 \times q0 + 2 \times q1 + q2 + 4)/8$$

$$q'1 = (p0 + q0 + q1 + q2 + 2)/4$$

$$q'2 = (p0 + q0 + q1 + 3 \times q2 + 2 \times q3 + 4)/8$$

It is to be noted that, in the above expressions, p0 to p2 and q0 to q2 are the pixel values of respective pixels p0 to p2 and pixels q0 to q2. In addition, q3 is the pixel value of neighboring pixel q3 at the opposite side with respect to the block boundary. In addition, in the right side of each of the expressions, coefficients which are multiplied with respective pixels to be used for deblocking filtering are filter coefficients.

Furthermore, in the HEVC deblocking filtering, clipping is performed so that the calculated pixel values do not change over a threshold value. In the clipping, the pixel values calculated according to the above expressions are clipped to a value obtained according to "a pre-calculation pixel value ±2×a threshold value" using the threshold value determined based on a quantization parameter. In this way, it is possible to prevent excessive smoothing.

However, in such deblocking filtering, change in pixel value is determined based on the pixel value of a neighboring pixel and a quantization parameter, and a filter characteristic is designed without reflecting non-uniformity in error distribution in a block. Accordingly, a problem as indicated in (a) of FIG. 26 may occur.

In view of this, loop filter 120 according to this embodiment determines a filter characteristic in deblocking filtering by reflecting non-uniformity in error distribution in a block. Specifically, error distribution estimator 1201 estimates that the pixel value of a pixel located at a position at which the amplitude of a basis is larger includes a larger error. Next, filter characteristic determiner 1202 determines a filter characteristic based on an error distribution estimated by error distribution estimator 1201. Here, when determining filter coefficients included in a filter characteristic, filter characteristic determiner 1202 determines a smaller filter coefficient for a pixel having a large error so that a pixel having a small error is less affected by the neighboring pixel having the large error. In addition, filter characteristic determiner 1202 determines a large filter coefficient for the pixel having the small error so that the pixel having the large error is more affected by the neighboring pixel having the small error.

In other words, the filter coefficients or the threshold value determined by loop filter 120 do(es) not always to be symmetrical with respect to a block boundary. Loop filter 120 determines a large filter coefficient for a pixel having a small error when performing deblocking filtering on a current pixel having a large error. In addition, loop filter 120 determines a small filter coefficient for a pixel having a large error when performing deblocking filtering on a current pixel having a small error, among two pixels across a block boundary.

In other words, in the determination of a filtering characteristic in this embodiment, the processing circuitry determines a smaller filter coefficient for a pixel present at a position at which the amplitude of a basis used to transform the block is larger. In addition, as described above, a transform coefficient for a lower-order basis is likely to be larger than a transform coefficient for a higher-order basis. Accordingly, the amplitude of the basis is, for example, the amplitude of a low-order basis, and is the amplitude of a zero-order basis.

For example, a pixel located at a position at which the amplitude of a basis is larger is likely to have a pixel value with a larger error. Encoder 100 according to this embodiment determines a small filter coefficient for the pixel whose pixel value has the large error. Accordingly, deblocking filtering with such filter coefficients further reduces influence of the pixel value with the large error onto the pixel value with the small error. In short, the deblocking filtering further increases the possibility of error reduction. In addition, a lower-order basis affects errors more significantly. Accordingly, it is possible to further increase the possibility of error reduction by determining a small filter coefficient for a pixel located at a position at which the amplitude of a zero-order basis is larger.

It is to be noted that error distribution estimator 1201 may use, as an error-related parameter, at least one of an orthogonal transform basis, a block size, the presence or absence of a pre-stage filter, an intra prediction direction, the number of reference pictures in inter prediction, a quantization parameter, etc.

Figure 34:
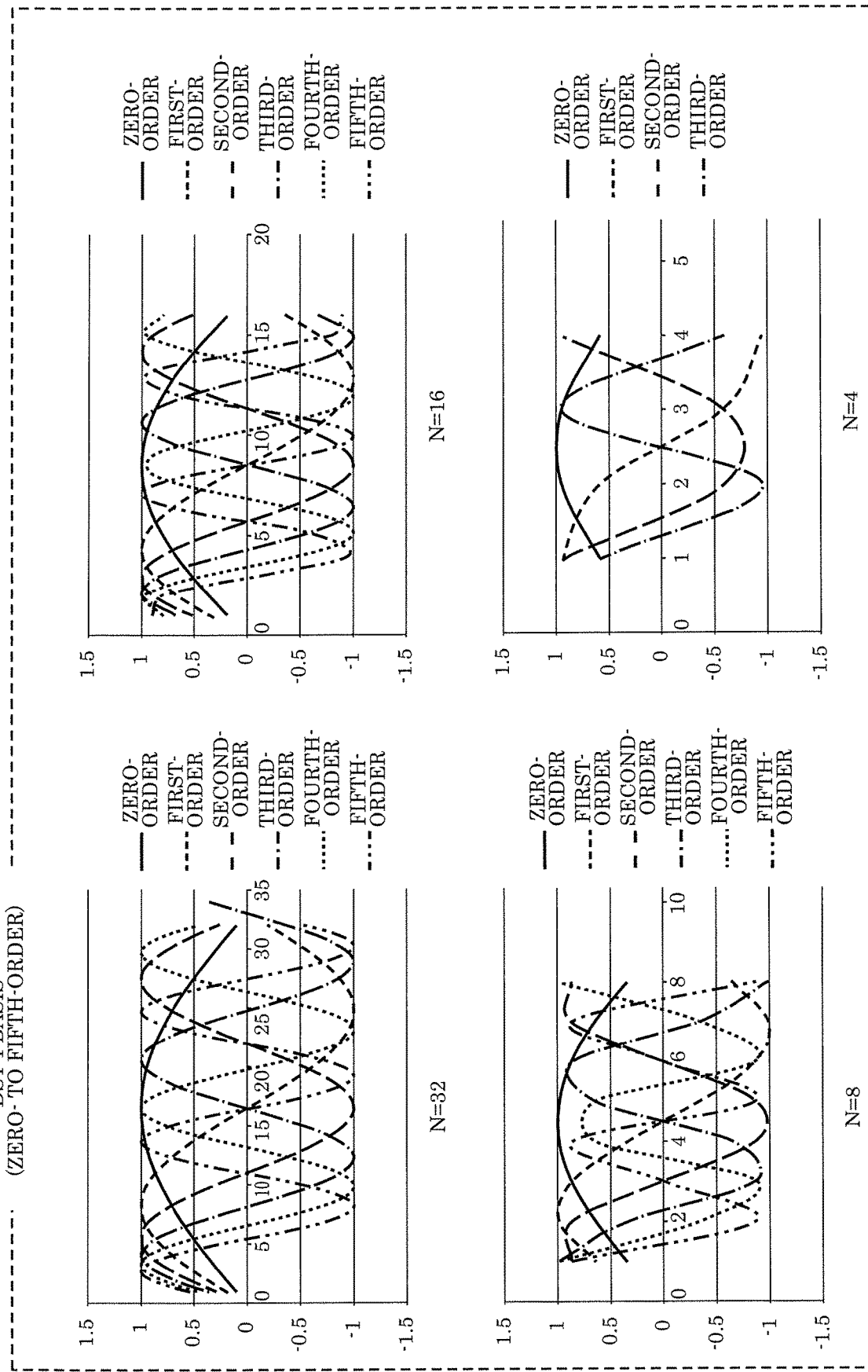
FIG. 34 is a diagram indicating an example of DST-I for each block size.

FIGS. 31 to 35 are each a diagram indicating an example of an orthogonal transform basis for each block size. In other words, these diagrams indicate examples of the orthogonal transform bases in the cases where the block sizes are respectively N=31, 16, 8, and 4. Specifically, FIG. 31 indicates zero-order to fifth-order bases in DCT-II, FIG. 32 indicates zero-order to fifth-order bases in DCT-V, and FIG. 33 indicates zero-order to fifth-order bases in DCT-VIII. FIG. 34 indicates zero-order to fifth-order bases in DST-I, and FIG. 35 indicates zero-order to fifth-order bases in DST-VII. It is to be noted that the horizontal axis of the graph in each of FIGS. 31 to 35 indicates positions on a one-dimensional space, and the vertical axis thereof indicates basis values (that is, amplitudes).

Error distribution estimator 1201 estimates error distributions based on bases such as DCT-II, DCT-V, DCT-VIII, DST-I, and DST-VII indicated in FIGS. 31 to 35. At this time, error distribution estimator 1201 may further estimate the error distributions based on the block sizes of the blocks to which orthogonal transform using these bases have been applied, that is, the number of pixels N.

<Specific Example of DST-VII/DST-VII>

Figure 36:
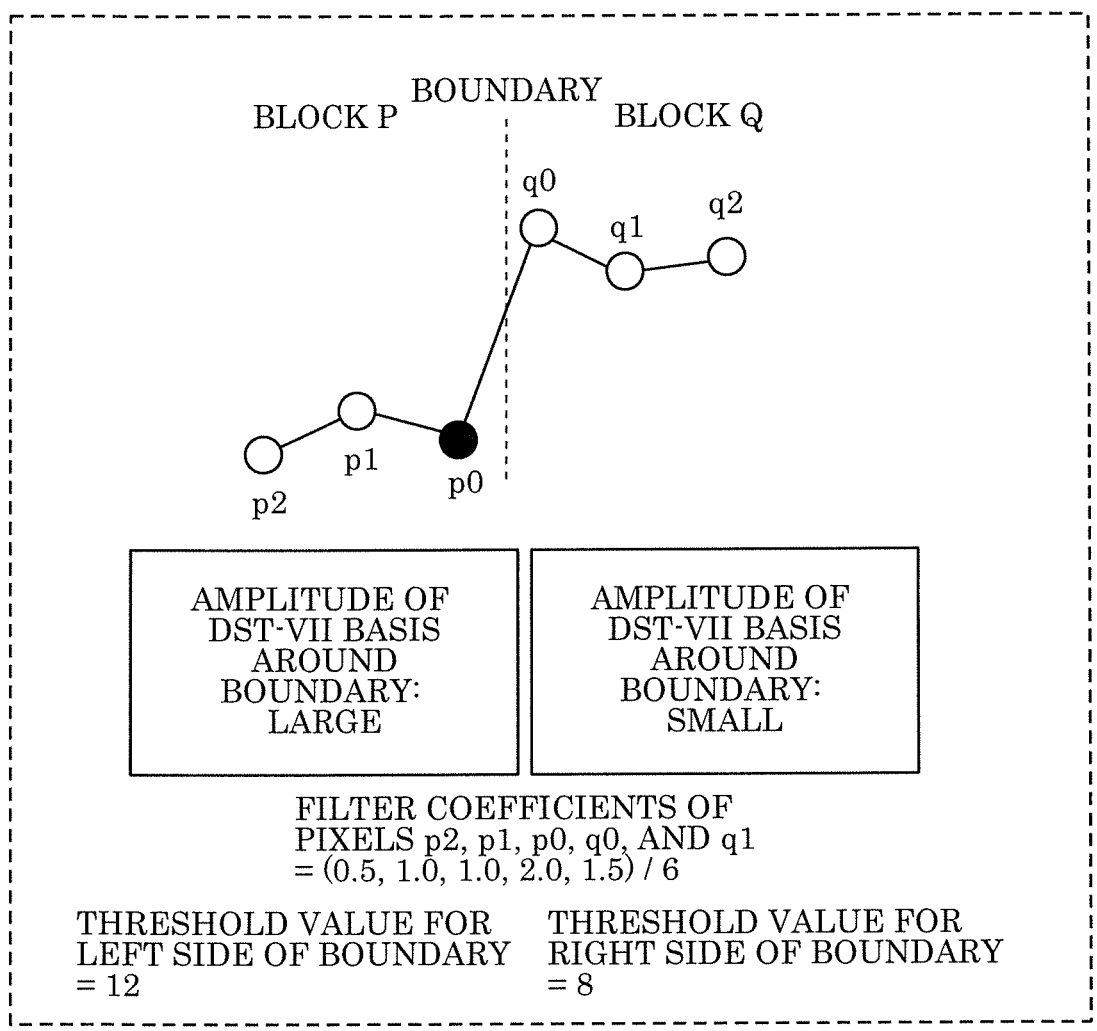
FIG. 36 is a diagram indicating examples of filter coefficients determined in Embodiment 7.

FIG. 36 is a diagram indicating examples of filter coefficients to be determined.

For example, as indicated in FIG. 36, loop filter 120 performs deblocking filtering on current pixel p0. It is to be noted that, for example, block P and block Q neighbor in the horizontal direction, and current pixel p0 is present at a position in block P close to a boundary (that is, a block boundary) with block Q.

Figure 35:
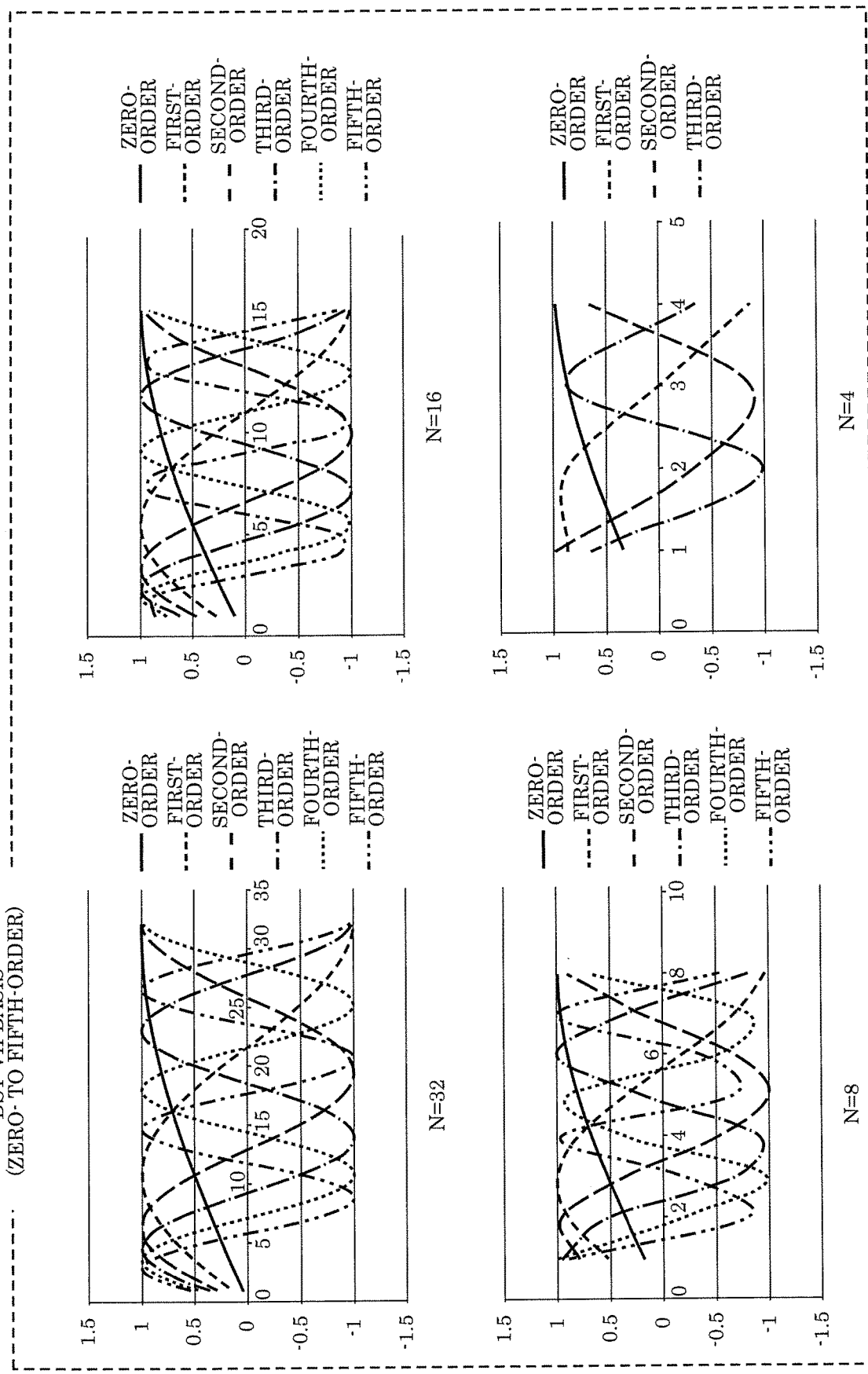
FIG. 35 is a diagram indicating an example of DST-VII for each block size.

Here, for example, each of block P and block Q is a block orthogonal-transformed using DST-VII. In such a case, as indicated in FIG. 35, the amplitude of a low-order basis (specifically, a zero-order basis) is small in the upper-side and left-side areas in blocks, and the amplitude of a low-order basis is large in the lower-side and right-side areas in blocks.

Accordingly, when block P and block Q neighbor in the horizontal direction, the amplitude of a low-order basis (specifically, a zero-order basis) is large in left-side block P around the block boundary, that is, the right side in block P. In addition, the amplitude of a low-order basis is small in right-side block Q around the block boundary, that is, the left-side in block Q.

As a result, error distribution estimator 1201 estimates a large error in an area of block P around the block boundary, and estimates a small error in an area of block Q around the block boundary. In this way, an error distribution around the block boundary is estimated.

Filter characteristic determiner 1202 determines, as a filter characteristic, a filter coefficient of, for example, a 5-tap deblocking filter, based on the estimated error distribution.

It is to be noted that the 5-tap deblocking filter is a deblocking filter using five pixels arranged in the horizontal direction. When pixel p0 is a current pixel, the five pixels are pixels p2, p1, p0, q0, and q1. In addition, the filter coefficient of the 5-tap deblocking filter which becomes a reference is, for example, (1, 2, 2, 2, 1)/8. By performing a calculation using the reference filter coefficient, that is, according to p'0=(1×p2+2×p1+2×p0+2×q0+1×q1)/8, calculated pixel value p'0 of current pixel p0 is obtained.

When the above-described error distribution has been estimated, filter characteristic determiner 1202 according to this embodiment determines a filter coefficient different from the above reference as a filter characteristic. Specifically, filter characteristic determiner 1202 determines a small filter coefficient for a pixel at a position at which an error has been estimated to be large in block P, and determines a large filter coefficient for a pixel at a position at which an error has been estimated to be small in block Q. More specifically, as indicated in FIG. 36, filter characteristic determiner 1202 determines filter coefficients 0.5, 1.0, 1.0, 2.0, and 1.5 as in (0.5, 1.0, 1.0, 2.0, 1.5)/6 respectively for pixels p2, p1, p0, q0, and q1, for performing deblocking filtering on current pixel p0 in block P. In this case, a filter coefficient which is determined for pixel p0 at the position at which an error has been estimated to be large in block P is "1.0/6", and a filter coefficient which is determined for pixel q0 at the position at which an error has been estimated to be small in block P is "2.0/6". In other words, the filter coefficient for pixel p0 is smaller than the filter coefficient for pixel q0, and the filter coefficient for pixel q0 is larger than the filter coefficient for pixel p0.

As a result, by performing the calculation using the filter coefficient determined in this way, that is, according to p'0=0.5×p2+1.0×p1+1.0×p0+2.0×q0+1.5×q1)/6, calculated pixel value p'0 of current pixel p'0 is obtained. The calculated pixel value p'0 is a deblocking-filtered pixel value of current pixel p0.

Here, filter characteristic determiner 1202 according to this embodiment may determine a threshold value for clipping as a filter characteristic, based on the estimated error distribution. It is to be noted that the threshold value is the above-described reference value or clip width. For example, filter characteristic determiner 1202 determines a large threshold value for a pixel at a position at which the amplitude of a basis has been estimated to be large, that is, an error has been estimated to be large. In contrast, filter characteristic determiner 1202 determines a small threshold value for a pixel at a position at which the amplitude of a basis has been estimated to be small, that is, an error has been estimated to be small. It is to be noted that the amplitude of the basis is, for example, the amplitude of a low-order basis, that is for example, the amplitude of a zero-order basis. For example, when a reference threshold value is 10, filter characteristic determiner 1202 determines, to be 12, a threshold value for a right-side pixel in block P with respect to and close to a block boundary, and determines, to be 8, a threshold value for a left-side pixel in block Q with respect to and close to the block boundary.

When a threshold value is determined for current pixel p0, filtering executor 1203 performs clipping on pixel value p'0 calculated from current pixel p0. The threshold value determined for current pixel p0 is, for example, 12. In view of this, when the amount of change from pixel value p0 before the calculation to calculated pixel value p'0 is larger than a threshold value of 12, filtering executor 1203 clips calculated pixel value p'0 to either a pixel value (p0+12) or a pixel value (p0−12). More specifically, filtering executor 1203 clips calculated pixel value p'0 to (p0−12) when (p0−p'0)>12 is satisfied, and clips calculated pixel value p'0 to (p0+12) when (p0−p'0)<−12 is satisfied. In this way, either the pixel value (p0+12) or the pixel value (p0−12) is determined to be a deblocking-filtered pixel value p'0 of current pixel p0. In contrast, when the amount of change is smaller than or equal to 12, the calculated pixel value p'0 is determined to be a deblocking-filtered pixel value of current pixel p0.

In this way, in this embodiment, the two blocks include the first block and the second block located at the right side of or below the first block. When determining the filter characteristic, when the basis used to transform a first block is a first basis and the basis used to transform a second block is a second basis, the processing circuitry determines, as the filter characteristic, each of a first filter coefficient for a pixel around the boundary in the first block and a second filter coefficient for a pixel around the boundary in the second block, based on the first basis and the second basis. More specifically, when the first basis and the second basis are of DST-VII (DST denotes discrete sine transforms), the processing circuitry determines, as the filter characteristic, the second filter coefficient which is larger than the first filter coefficient.

In the case where the first basis and the second basis are of DST-VII, it is highly likely that an error in a first block around a boundary is large and an error in a second block around the boundary is small. Accordingly, it is possible to further increase the possibility of reducing errors appropriately around the boundary by determining a second filter coefficient which is larger than a first filter coefficient in such a case and performing deblocking filtering with the first and second filter coefficients.

In addition, based on a combination of bases for the first block and the second block, the processing circuitry further determines, as the filter characteristic, each of the first threshold value for the first block and the second threshold value for the second block. The processing circuitry then performs a calculation on the pixel value of a current pixel using a first filter coefficient and a second filter coefficient to obtain a calculated pixel value of the current pixel. Next, the processing circuitry determines whether the amount of change from the pre-calculation pixel value of each target pixel to the calculated pixel value is larger than the threshold value for the block to which the current pixel belongs among a first threshold value and a second threshold value. When the amount of change is larger than the threshold value, the processing circuitry then clips the calculated pixel value of the current pixel to the sum of or difference between the pre-calculation pixel value of the current pixel and the threshold value.

In this way, when the amount of change in calculated pixel value of the current pixel is larger than the threshold value, the calculated pixel value of the current pixel is clipped to the sum of or difference between the pre-calculation pixel value of the current pixel and the threshold value. Thus, it is possible to prevent the target pixel value of the current pixel from being changed significantly by the deblocking filtering. In addition, the first threshold value for the first block and the second threshold value for the second block are determined based on the combination of bases for the first block and the second block. Accordingly, for each of the first block and the second block, it is possible to determine a large threshold value for a pixel located at a position at which the amplitude of a basis is large, that is, a pixel having a large error, and determine a small threshold value for a pixel located at a position at which the amplitude of a basis is small, that is a pixel having a small error. As a result, the deblocking filtering makes it possible to allow the pixel value of the pixel having the large error to change significantly and prohibit the pixel value of the pixel having the small error from changing significantly. Accordingly, it is possible to further increase the possibility of reducing errors appropriately around the boundary between the first block and the second block.

<Specific Example of DST-VII/DCT-II>

Figure 37:
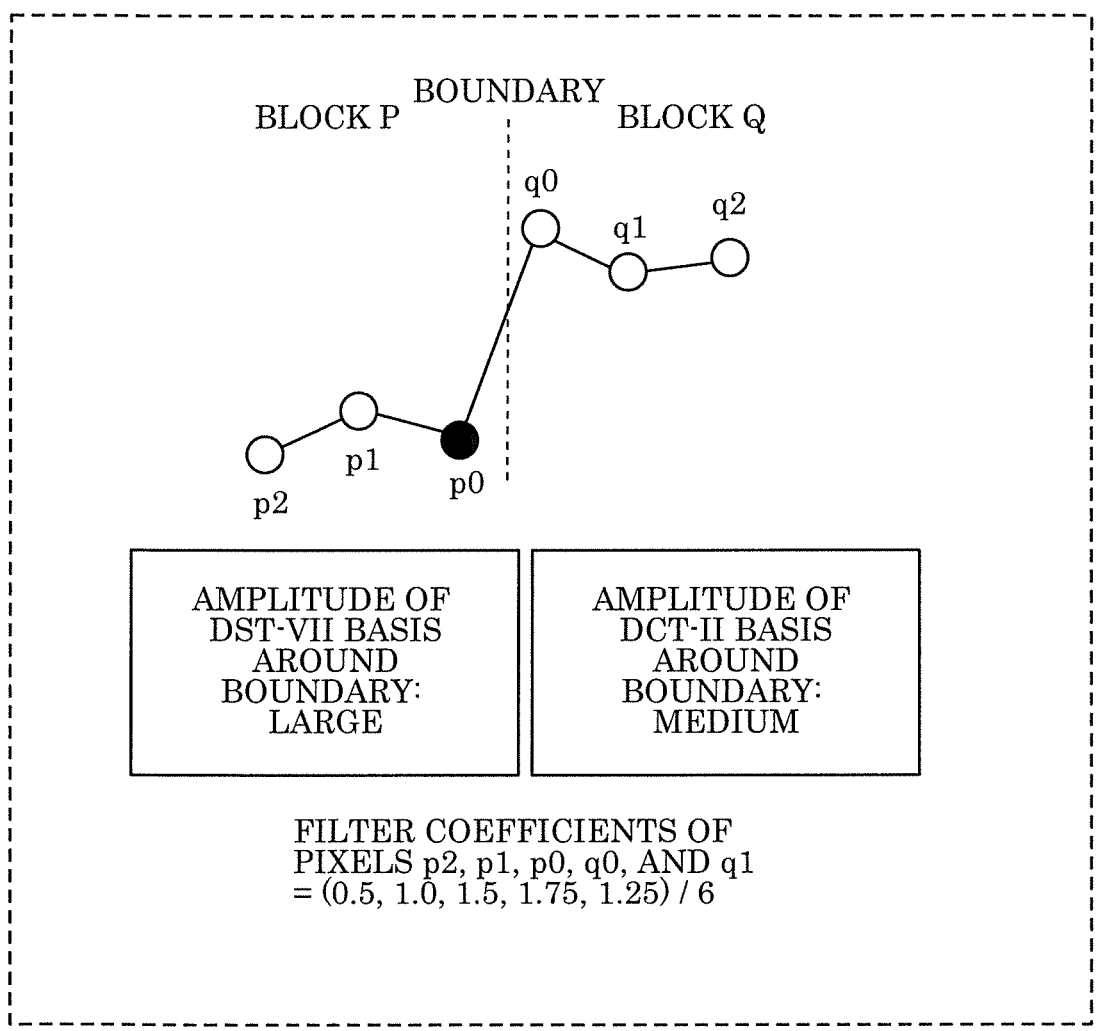
FIG. 37 is a diagram indicating other examples of filter coefficients determined in Embodiment 7.

FIG. 37 is a diagram indicating other examples of filter coefficients to be determined.

For example, as indicated in FIG. 37 similarly in the example indicated in FIG. 36, loop filter 120 performs deblocking filtering on current pixel p0.

Figure 31:
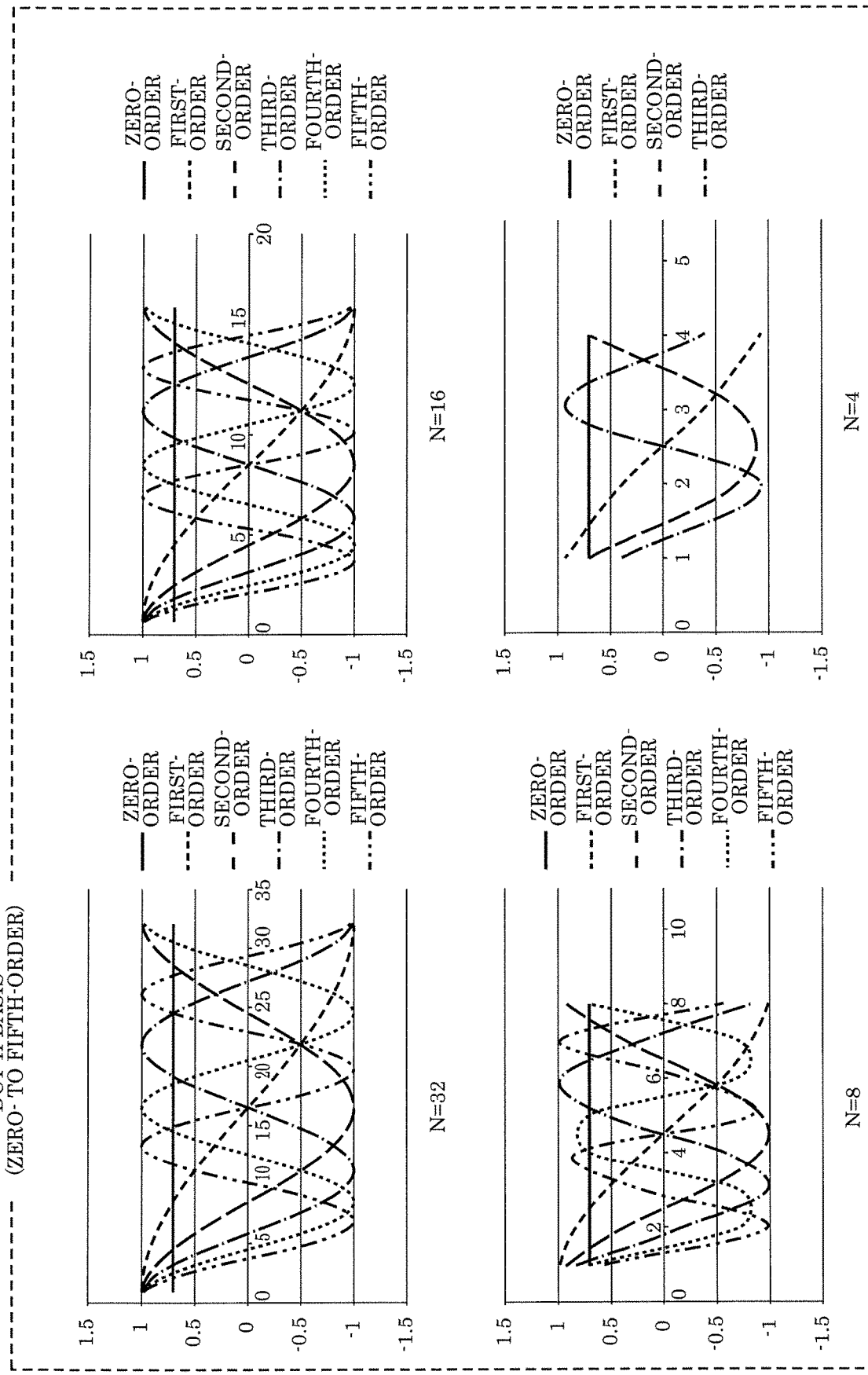
FIG. 31 is a diagram indicating an example of DCT-II for each block size.
Figure 32:
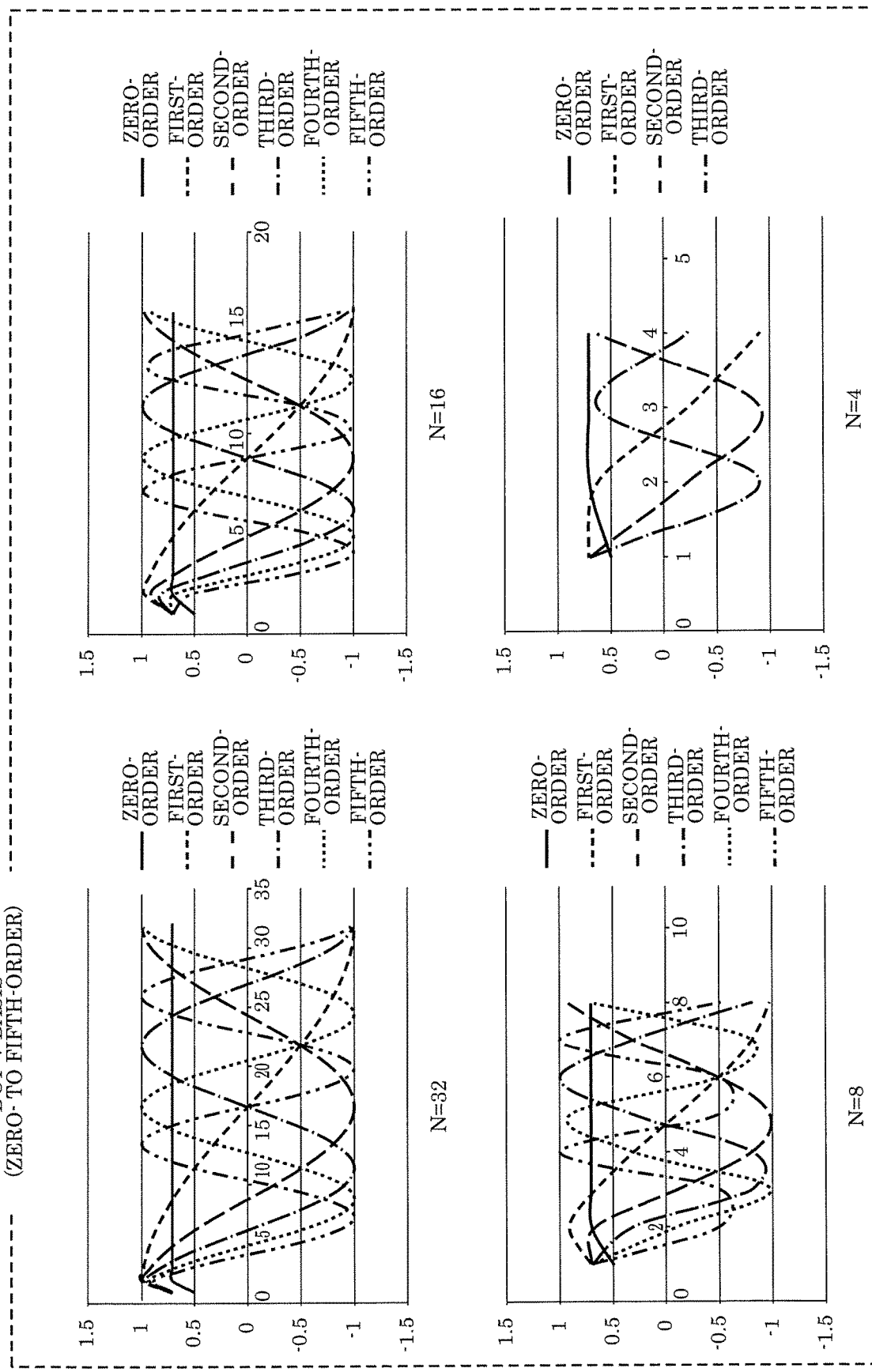
FIG. 32 is a diagram indicating an example of DCT-V for each block size.
Figure 33:
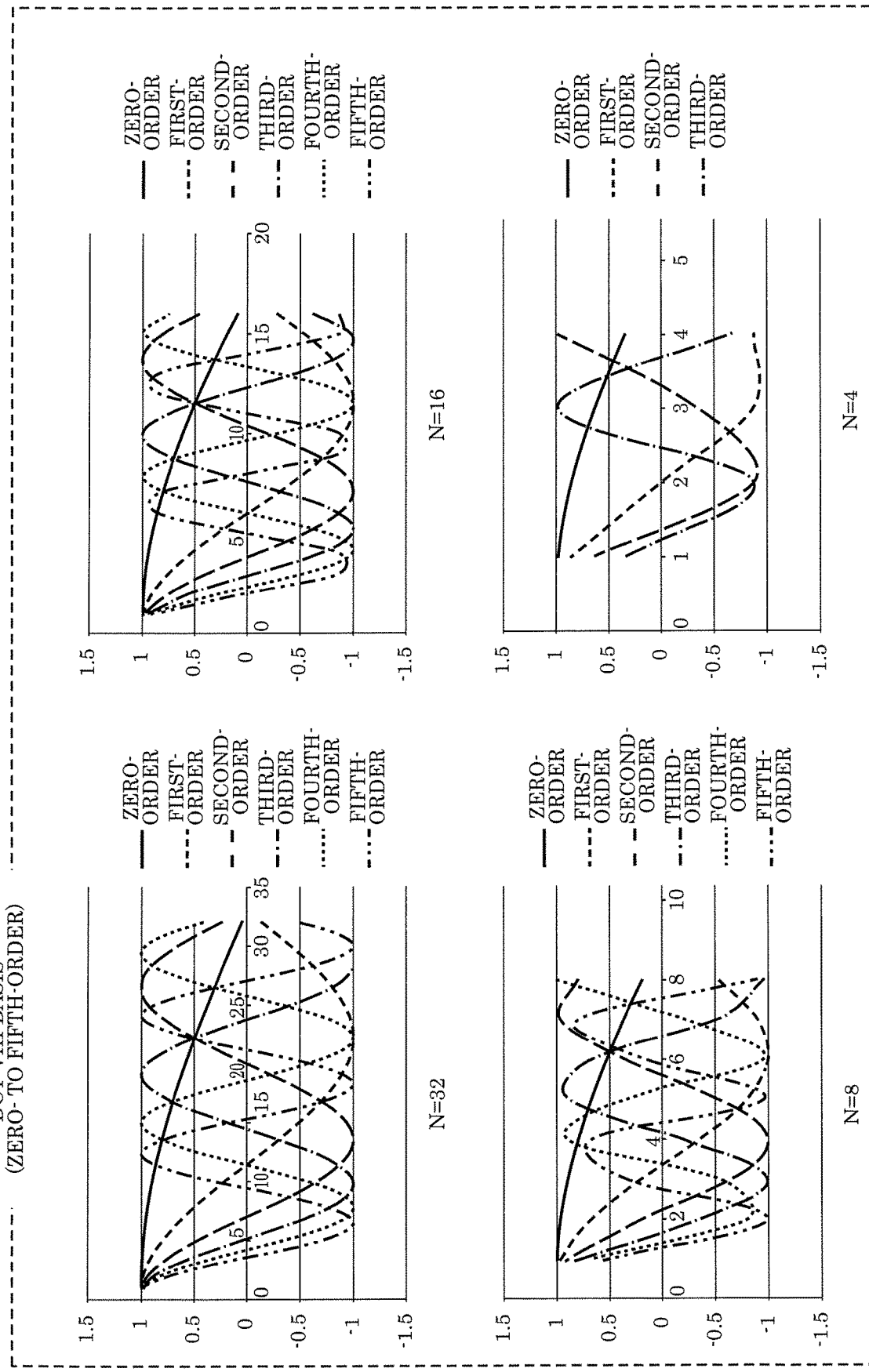
FIG. 33 is a diagram indicating an example of DCT-VIII for each block size.

Here, for example, block P is a block orthogonal-transformed using DST-VII, and block Q is a block orthogonal-transformed using DCT-II. In such a case, as indicated in FIG. 35, the amplitude of a low-order basis (specifically, a zero-order basis) is small in the upper-side and lower-side areas in block P, and the amplitude of a low-order basis is large in the lower-side and right-side areas in block P. In comparison, as indicated in FIG. 31, in block Q, the amplitude of a low-order basis is constant, but is larger than the amplitude in the upper-side and the left-side areas of block P and is smaller than the amplitude in the lower-side and the right-side of block P. In other words, in block Q, the amplitude of the low-order basis is constant at a medium level.

Accordingly, when block P and block Q neighbor in the horizontal direction, the amplitude of a low-order basis (specifically, a zero-order basis) is large in right-side block P around the block boundary, that is, the right side in block P. In addition, the amplitude of a low-order basis is at a medium level in right-side block Q around the block boundary, that is, the left side in block Q.

As a result, error distribution estimator 1201 estimates a large error in a block boundary area in block P, and estimates a medium-level error in a block boundary area in block Q. In this way, an error distribution around the block boundary is estimated. In other words, an error distribution indicating a gentler error change in the direction vertical to the block boundary than the example indicated in FIG. 36 is estimated.

Filter characteristic determiner 1202 determines, as a filter characteristic, a filter coefficient of, for example, a 5-tap deblocking filter, based on the estimated error distribution. In other words, filter characteristic determiner 1202 determines a filter coefficient so that current pixel p0 located at a position at which an error is large in block P is more affected by a pixel having a medium-level error in block Q. In addition, since the error distribution around the block boundary indicates the gentler error change in the direction vertical to the block boundary, filter characteristic determiner 1202 determines five filter coefficients which have smaller differences with each other than in the example indicated in FIG. 36. Specifically, filter characteristic determiner 1202 determines the filter coefficients 0.5, 1.0, 1.5, 1.75, 1.25 as in (0.5, 1.0, 1.5, 1.75, 1.25)/6 for pixels p2, p1, p0, q0, q1, for performing deblocking filtering on current pixel p0 in block P. In this case, a filter coefficient which is determined for pixel p0 at the position at which an error has been estimated to be large in block P is "1.5/6", and a filter coefficient which is determined for pixel q0 at the position at which an error has been estimated to be at a medium level in block Q is "1.75/6". In other words, the filter coefficient for pixel p0 is smaller than the filter coefficient for pixel q0, and the filter coefficient for pixel q0 is larger than the filter coefficient for pixel p0. In addition, the difference between the filter coefficient of pixel p0 and the filter coefficient of pixel q0 is smaller than the case indicated in FIG. 36.

In addition, even when block P and block Q neighbor in the vertical direction, error distribution estimator 1201 estimates an error distribution in the same manner as described above, and filter characteristic determiner 1202 determines a filter coefficient based on the error distribution. Furthermore, filter characteristic determiner 1202 may determine a threshold value for clipping in the same manner as in the example indicated in FIG. 36, and filtering executor 1203 may perform clipping using the threshold value.

<Specific Example of DST-I/DST-I>

Figure 38:
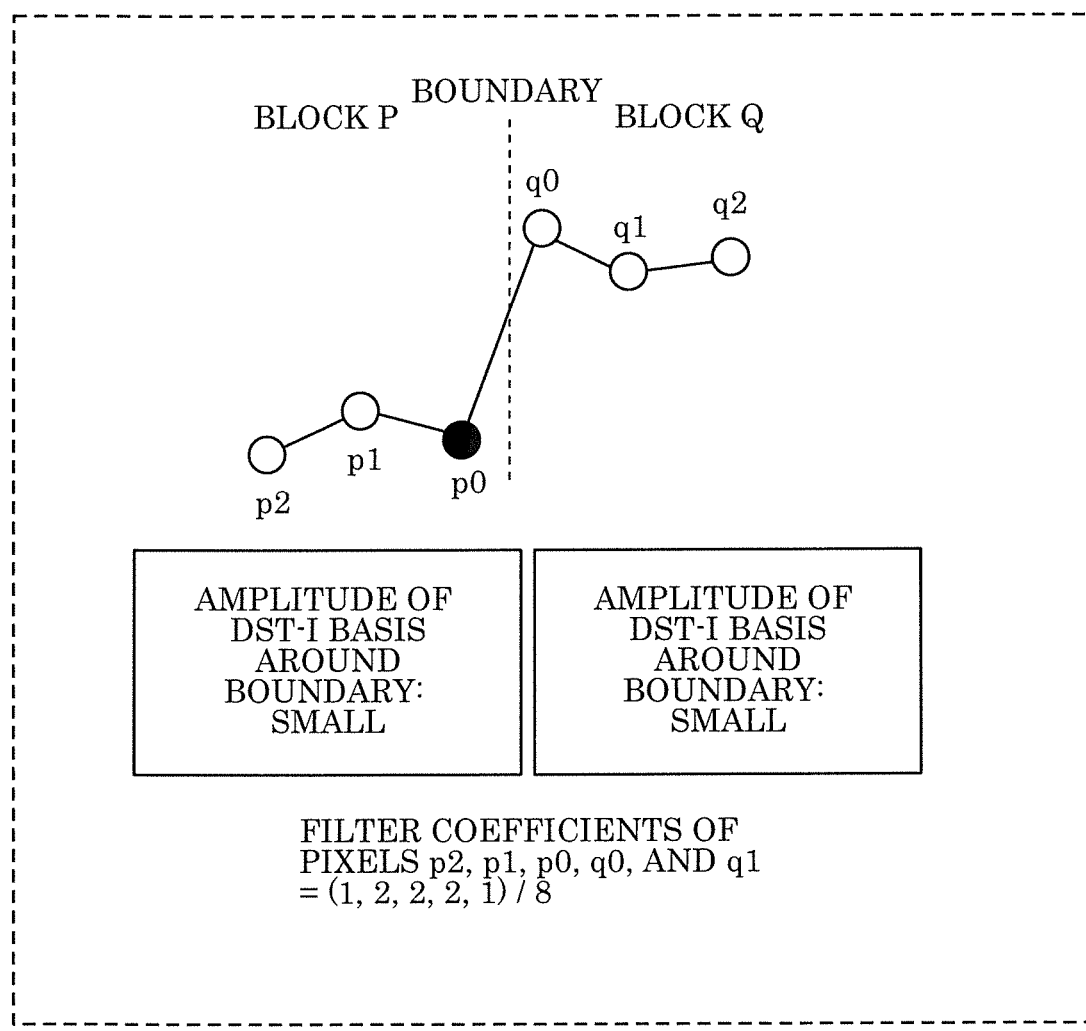
FIG. 38 is a diagram indicating still other examples of filter coefficients determined in Embodiment 7.

FIG. 38 is a diagram indicating other examples of filter coefficients to be determined.

For example, as indicated in FIG. 38 similarly in the examples indicated in FIGS. 36 and 37, loop filter 120 performs deblocking filtering on current pixel p0.

Here, for example, each of block P and block Q is a block orthogonal-transformed using DST-I. In such a case, as indicated in FIG. 34, the amplitude of a low-order (specifically, zero-order) basis in the upper-side and left-side areas of a block and the amplitude of a low-order basis in the lower-side and right-side areas of the block are equal to each other.

Accordingly, when block P and block Q neighbor in the horizontal direction, the amplitude of a low-order basis around a block boundary in block P and the amplitude of a low-order basis around the block boundary in block Q are equal to each other.

As a result, error distribution estimator 1201 estimates a symmetrical error distribution for the block boundary as the error distribution around the block boundary between block P and block Q.

In such a case, filter characteristic determiner 1202 determines the reference filter characteristic as described above, that is, a symmetrical filter characteristic for a block boundary as the filter characteristic based on the error distribution.

In addition, even when each of block P and block Q is a block orthogonal-transformed using DCT-II, as described above, the amplitude of a low-order basis around a block boundary in block P and the amplitude of a basis around a block boundary in block Q are equal to each to other. Accordingly, even in such a case, error distribution estimator 1201 estimates a symmetrical error distribution for the block boundary as the error distribution around the block boundary between block P and block Q. In such a case, filter characteristic determiner 1202 determines the reference filter characteristic as described above, that is, a symmetrical filter characteristic for a block boundary as the filter characteristic based on the error distribution. The filter coefficient of the 5-tap deblocking filter which becomes a reference is, for example, (1, 2, 2, 2, 1)/8. In this case, the filter coefficient which is determined for pixel p0 in block P is "2/8", and the filter coefficient which is determined for pixel q0 in block Q is "2/8". In other words, these filter coefficients are symmetrical with respect to the block boundary.

In such a case, in this embodiment, when the first basis and the second basis are of DCT-II (DCT denotes discrete cosine transforms), the second filter coefficient which is equal to the first filter coefficient is determined as the filter coefficient.

In the case where the first basis and the second basis are of DCT-II, it is highly likely that an error in the first block around the boundary and an error in the second block around the boundary are equal to each other. Accordingly, it is possible to further increase the possibility of reducing errors appropriately around the boundary by determining a second filter coefficient which is equal to a first filter coefficient in such a case and performing deblocking filtering with the first and second filter coefficients.

<Specific Examples of Block Sizes>

Figure 39:
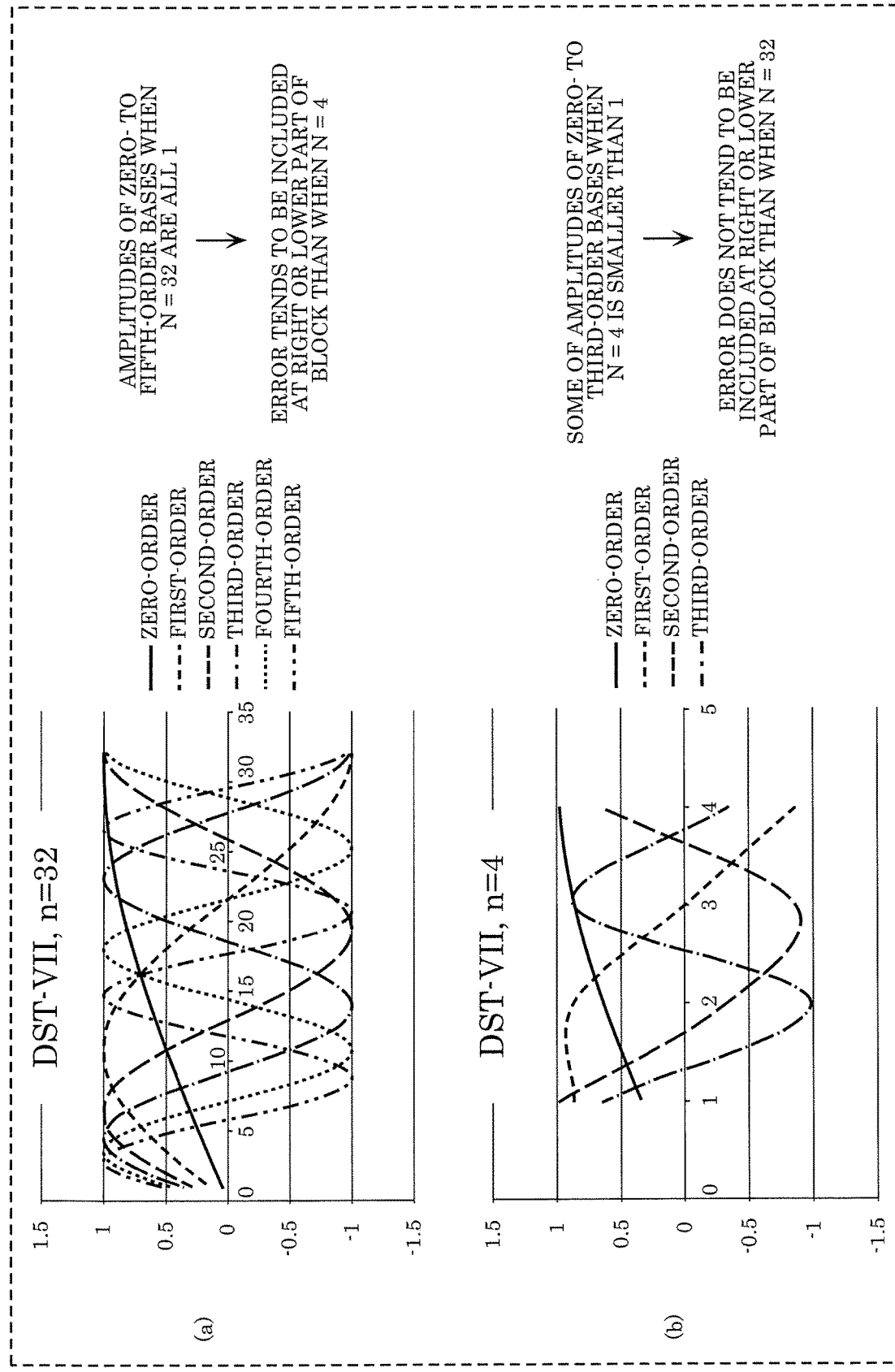
FIG. 39 is a diagram for explaining relationships between block sizes and errors.

FIG. 39 is a diagram for explaining relationships between block sizes and errors. It is to be noted that a block size is a block width or the number of pixels in a block. Specifically, (a) in FIG. 39 indicates zero- to fifth-order bases in DST-VII in the case of a block having a block size of N=32, and (b) in FIG. 39 indicates zero- to fifth-order bases in DST-VII in the case of a block having a block size of N=4. It is to be noted that the horizontal axis of each graph in FIG. 39 indicates positions on a one-dimensional space, and the vertical axis thereof indicates basis values (that is, amplitudes).

The amplitude of a basis at the block boundary varies according to a block size which is the number of pixels of a block to be orthogonal-transformed. In view of this, error distribution estimator 1201 according to this embodiment estimates an error distribution based on the block size. In this way, it is possible to increase the accuracy of filter coefficients to be determined.

For example, as indicated in FIG. 39, even in the case of blocks orthogonal-transformed using DST-VII, the amplitudes of bases around a block boundary in a block having a block size of N=4 and the amplitudes of bases around a block boundary in a block having a block size of N=32 vary. Specifically, in the case of the block having the block size of N=32, as indicated in (a) of FIG. 39, the amplitudes of zero- to fifth-order bases at position n=32 in DST-VII are all 1. It is to be noted that the position n=32 is at the right-side or lower-side end of the block. In the other case of the block having the block size of N=4, as indicated in (b) of FIG. 39, some of the amplitudes of zero- to third-order bases at position n=4 in DST-VII is smaller than 1. It is to be noted that the position n=4 is at the right-side or lower-side end of the block.

Accordingly, error distribution estimator 1201 according to this embodiment estimates small errors in the case of the block having the block size of N=4 and estimates errors larger than the small errors in the case of the block having the block size of N=32, as the errors in the right side and lower side of the blocks orthogonal-transformed using DST-VII.

Figure 40:
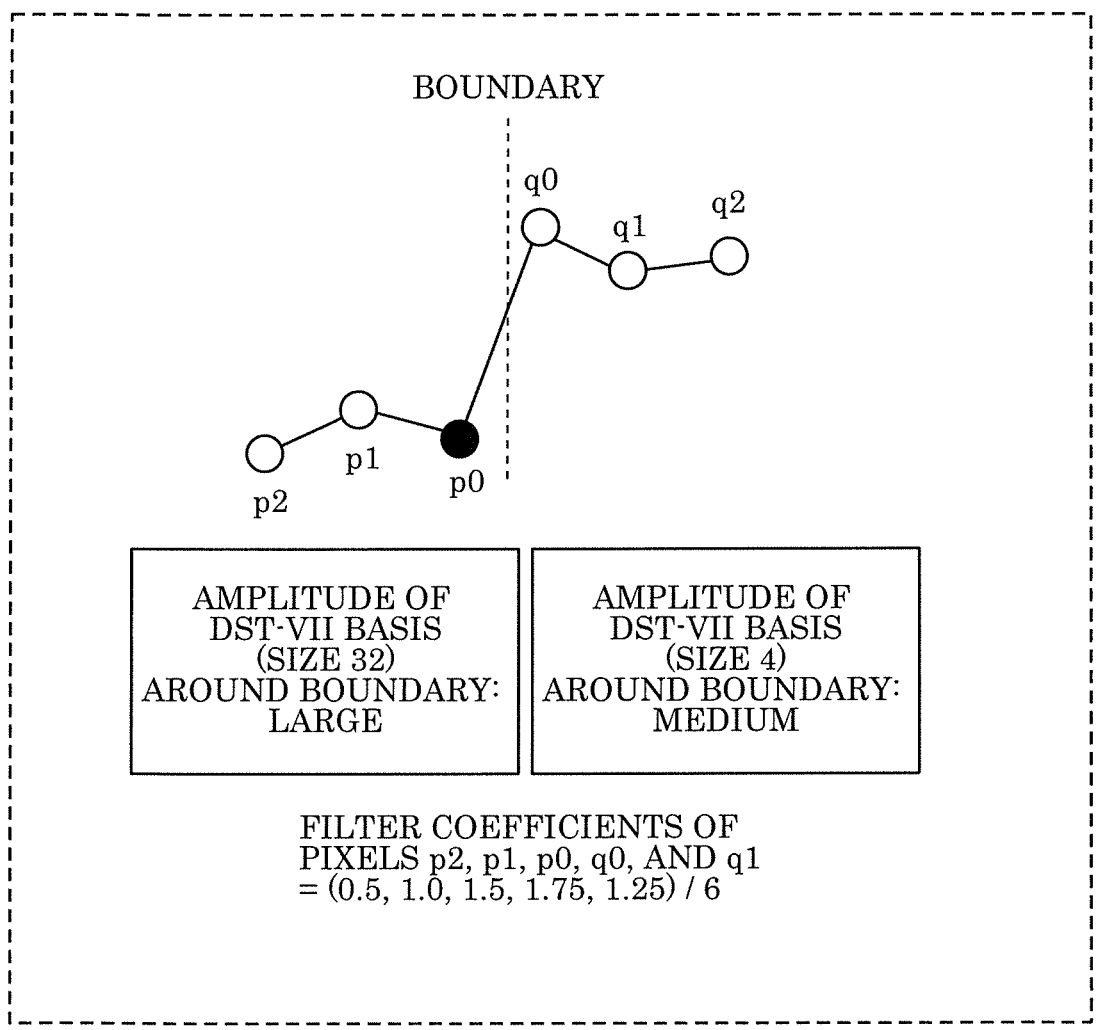
FIG. 40 is a diagram indicating still other examples of filter coefficients determined in Embodiment 7.

FIG. 40 is a diagram indicating still other examples of filter coefficients to be determined.

For example, as indicated in FIG. 40 similarly in the examples indicated in FIGS. 36 to 38, loop filter 120 performs filtering on current pixel p0.

Here, for example, block P is a block having a block size of N=32 orthogonal-transformed using DST-VII, and block Q is a block having a block size of N=4 orthogonal-transformed using DST-VII. In such a case, as indicated in (a) of FIG. 39, the amplitudes of a low-order (specifically, a zero-order) basis are small in the upper-side and left-side areas in block P, and the amplitudes of a low-order basis are large in the lower-side and right-side areas in block P. On the contrary, as indicated in (b) of FIG. 39, the amplitudes of low-order basis in the upper-side and left-side areas of block Q are at a medium level.

As a result, error distribution estimator 1201 estimates a large error in the block boundary area of block P, and estimates a medium-level error in the block boundary area of block Q. In this way, an error distribution around the block boundary is estimated. In other words, an error distribution indicating a gentler error change in the direction vertical to the block boundary than the example indicated in FIG. 36.

Filter characteristic determiner 1202 determines, as a filter characteristic, a filter coefficient of, for example, a 5-tap deblocking filter, based on the estimated error distribution. In other words, filter characteristic determiner 1202 determines the filter coefficient so that current pixel p0 located at a position at which an error is large in block P is more affected by a pixel having a medium-level error in block Q. In addition, since the error distribution around the block boundary indicates the gentler error change in the direction vertical to the block boundary, filter characteristic determiner 1202 determines five filter coefficients which have smaller differences with each other than in the example indicated in FIG. 36. Specifically, filter characteristic determiner 1202 determines the filter coefficients 0.5, 1.0, 1.5, 1.75, 1.25 as in (0.5, 1.0, 1.5, 1.75, 1.25)/6 for pixels p2, p1, p0, q0, q1, for performing deblocking filtering on current pixel p0 in block P. In this case, a filter coefficient which is determined for pixel p0 at the position at which an error has been estimated to be large in block P is "1.5/6", and a filter coefficient which is determined for pixel q0 at the position at which an error has been estimated to be at a medium level in block Q is "1.75/6". In other words, the filter coefficient for pixel p0 is smaller than the filter coefficient for pixel q0, and the filter coefficient for pixel q0 is larger than the filter coefficient for pixel p0. In addition, the difference between the filter coefficient of pixel p0 and the filter coefficient of pixel q0 is smaller than the example indicated in FIG. 36.

In this way, in this embodiment, in the case where the first basis and the second basis are of DST-VII (DST denotes discrete sine transforms) and the size of the second block is smaller than the size of the first block, when determining the filtering characteristic, the processing circuitry may determine, as the filter characteristic, the second filter coefficient which is larger than the first filter coefficient. Here, the determined filter coefficient gradient between the first filter coefficient and the second filter coefficient is gentler than in the case where the first block and the second block are equal in size.

In the case where the first basis and the second basis are of DST-VII and the size of the second block is smaller than the size of the first block, it is likely that an error in the first block around the boundary is large and an error in the second block around the boundary is at a medium level. In other words, it is likely that an error distribution between the first block and the second block around the boundary has a gentle gradient.

Encoder 100 according to this embodiment determines the second filter coefficient which is larger than the first filter coefficient in such a case, and performs deblocking filtering with the first and second filter coefficients. Here, the determined filter coefficient gradient between the first filter coefficient and the second filter coefficient is gentler than in the case where the first block and the second block are equal in size. Accordingly, even when the error distribution around the boundary between the first block and the second block has a gentle gradient, it is possible to increase the possibility of reducing errors appropriately around the boundary.

Variation 1

Filtering executor 1203 performs deblocking filtering also on a pixel having a small error in Embodiment 7, but deblocking filtering may be OFF for a pixel having a small error. It is to be noted that switching OFF deblocking filtering is equivalent to setting a filter coefficient for a current pixel to 1 and setting a filter coefficient for pixels other than the current pixel to 0.

In addition, in Embodiment 7, filter determiner 1206 and filter characteristic determiner 1202 perform processing based on the error distribution estimated by error distribution estimator 1201. However, filter determiner 1206 may determine whether to perform filtering using only a quantization parameter, and filter characteristic determiner 1202 may determine a filter characteristic based on the quantization parameter and an orthogonal transform basis.

In addition, in this variation, deblocking filtering may be performed on each of a luminance signal and a chrominance signal. In this case, loop filter 120 may design a deblocking filter for the luminance signal and a deblocking filter for the chrominance signal independently of or dependently on each other. For example, loop filter 120 may perform deblocking filtering according to Embodiment 7 only on one signal among the luminance signal and the chrominance signal, and may perform other deblocking filtering on the other signal.

In addition, in this variation, for example, loop filter 120 may perform deblocking filtering according to Embodiment 7 only on an intra prediction block. Alternatively, loop filter 120 may perform deblocking filtering according to Embodiment 7 on both an intra prediction block and an inter prediction block.

In addition, loop filter 120 may switch between ON and OFF of deblocking filtering according to Embodiment 7, in units of a slice, a tile, a wavefront dividing unit, or a CTU.

In addition, there is also a technique for increasing coefficient deviation in frequency space and increasing a compression efficiency by further performing transform after orthogonal transform (for example, Non-Separable Secondary Transform in JVET). Also at this time, loop filter 120 may determine a filter characteristic based on an orthogonal transform basis.

In addition, for example, there is a case where orthogonal transform using DST-VII is performed on a first block in each of first and second transform, and orthogonal transform using DST-VII is performed on a second block in a first transform and orthogonal transform using DCT-II is performed on the second block in a second transform. In such a case, loop filter 120 estimates a sharper error distribution for the first block than for the second block. In other words, the error distribution gradient in the horizontal direction and the vertical direction of the first block is sharper than the error distribution gradient of the second block. Loop filter 120 then determines a filter characteristic based on the sharp error distribution.

In addition, a first transform and a second transform may be performed on blocks having different block sizes. In such a case, loop filter 120 performs deblocking filtering on at least one of the two blocks having different block sizes.

In addition, when deblocking filtering according to Embodiment 7 is performed on inter prediction blocks, it is predicted that coefficient distributions or absolute values in respective frequencies after orthogonal transforms vary according to prediction methods. These prediction methods include, for example, Uni-pred (prediction using one reference picture) and Bi-pred (prediction using two reference pictures).

Accordingly, loop filter 120 may determine a filter coefficient according to a prediction method. For example, loop filter 120 decreases a weight for a filter on a Uni-pred block which tends to have a coefficient whose absolute value is large to be smaller than a weight for a Bi-pred block.

In addition, loop filter 120 may independently determine a filter weight for a block to which the merge mode has been applied. For example, loop filter 120 increases or decreases a filter weight for block to which merge mode has been applied to be larger than a filter weight for a block to which prediction other than the merge mode has been applied.

In addition, deblocking filtering according to Embodiment 7 not only makes an image to be processed closer to an original image, but also makes block boundaries less noticeable similarly to conventional deblocking filtering. For this reason, if not only objective evaluation but also subjective evaluation are considered to be important, it is effective to change a filter characteristic for each block size.

More specifically, since block noise is noticeable in a block having a large error, loop filter 120 may set filter coefficients at both sides across a block boundary, a threshold value, or the number of filter taps to be larger than those for a block having a small error.

Specifically, since a correlation between pixels is higher as the distance between pixels is shorter, it is considered that objective evaluation deteriorates as a pixel more distant from a current pixel is used for deblocking filtering on the current pixel. However, block noise becomes subjectively less noticeable as a larger number of pixels are used for deblocking filtering. Accordingly, based on a trade-off between an objective evaluation and a subjective evaluation, loop filter 120 may use even a pixel distant from a current pixel in deblocking filtering on the current pixel.

In addition, in Embodiment 7, an error distribution is estimated according to bases such as DCT and DST, and a filter characteristic is determined based on the estimated error distribution. However, a filter characteristic may be determined by estimating an error distribution according to another transform approach instead of these bases, and a filter characteristic may be determined based on the estimated error distribution. Examples of the other transform approach include Karhunen-Loeve Transform (KLT), Discrete Fourier transform (DFT), Wavelet transform, and lapped transform.

In addition, encoder 100 according to Embodiment 7 includes error distribution estimator 1201 and estimates an error distribution, but does not need to include error distribution estimator 1201. In other words, encoder 100 may directly determine a filter characteristic based on a basis used to transform a block without estimating an error distribution.

Variation 2

In Embodiment 7 and Variation 1 thereof, deblocking filtering with a filter characteristic determined based on a combination of bases has been performed, but loop filtering other than the deblocking filtering may be performed.

For example, loop filter 120 may determine a SAO (Sample Adaptive Offset) filter coefficient using a basis used for transform and the position of a current pixel in a block. Alternatively, loop filter 120 may perform tri-lateral filtering based on three parameters. These three parameters include, for example, the difference between pixel values, the distance between pixels, and an error distribution which is estimated based on orthogonal transform bases. Alternatively, loop filter 120 may perform, in an intra processing loop, filtering according to Embodiment 7 or filtering in which deblocking filtering according to Variation 1 is applied. In addition, loop filter 120 does not need to change the pixel value of a current pixel based on information about a neighboring pixel, and may give, for each current pixel, an offset according to an error distribution.

In addition, loop filter 120 does not need to obtain an error-related parameter for each filtering if loop filter 120 can predict an error distribution. For example, in an intra prediction block by Joint Exploration Model (JEM) 4.0 software, errors are unlikely to be included in the upper side and the left side of a block, and errors are likely to be included in the lower side and the right side of the block, because of the design of EMT as described above. Accordingly, considering this in advance, loop filter 120 may perform deblocking filtering with a weak filter strength in the upper side and the left side of a JEM 4.0 intra prediction block.

Although filter determiner 1206 determines whether to perform deblocking filtering on a current pixel in Embodiment 7 or Variation 1 thereof, deblocking filtering may be performed on all block boundaries without making such a determination.

In addition, in Embodiment 7 or Variation 1 thereof, loop filter 120 performs deblocking filtering with a filter characteristic determined based on a combination of bases, on a block boundary between reconstructed blocks to be output from adder 116. Here, for example, encoder 100 may include a filter different from loop filter 120. In other words, the different filter performs filtering on the reconstructed blocks, and loop filter 120 performs deblocking filtering on the block boundary between reconstructed blocks filtered by the different filter. In such a case, loop filter 120 may determine a filter characteristic in deblocking filtering, based also on a filter characteristic of the different filter, together with a combination of bases. Furthermore, the different filter may perform deblocking filtering with a symmetrical filter characteristic with respect to the block boundary. In this case, the filter coefficients used by the different filter may be set to be smaller than filter coefficients in the case where loop filter 120 according to Embodiment 7 or Variation 1 thereof is not included in encoder 100. In addition, the different filter may perform bilateral filtering based on two parameters as deblocking filtering with a symmetrical filter characteristic with respect to a block boundary. These two parameters include, for example, the difference between pixel values and the distance between pixels. In this case, loop filter 120 may determine filter coefficients smaller on the whole than filter coefficients indicated in FIGS. 36 to 38, and 40.

In addition, although loop filter 120 performs deblocking filtering on a block boundary in Embodiment 7 or Variation 1 thereof, loop filter 120 may perform filtering on a block area which is not a block boundary area. For example, loop filter 120 may change the pixel value of a pixel having a large error using the pixel value of a pixel having a small error in a block. Hereinafter, such filtering is referred to as in-block filtering.

Specifically, as indicated in FIG. 35, in a block orthogonal-transformed using DST-VII, the error of a pixel located at the upper side or the left side of the block is small, and the error of a pixel located at the lower side or the right side of the block is large. Accordingly, loop filter 120 changes the pixel value of the pixel located at the lower side or the right side using the pixel value of the pixel located at the upper side or the left side by performing in-block filtering. In this way, it is possible to increase the possibility that errors are reduced.

Figure 41:
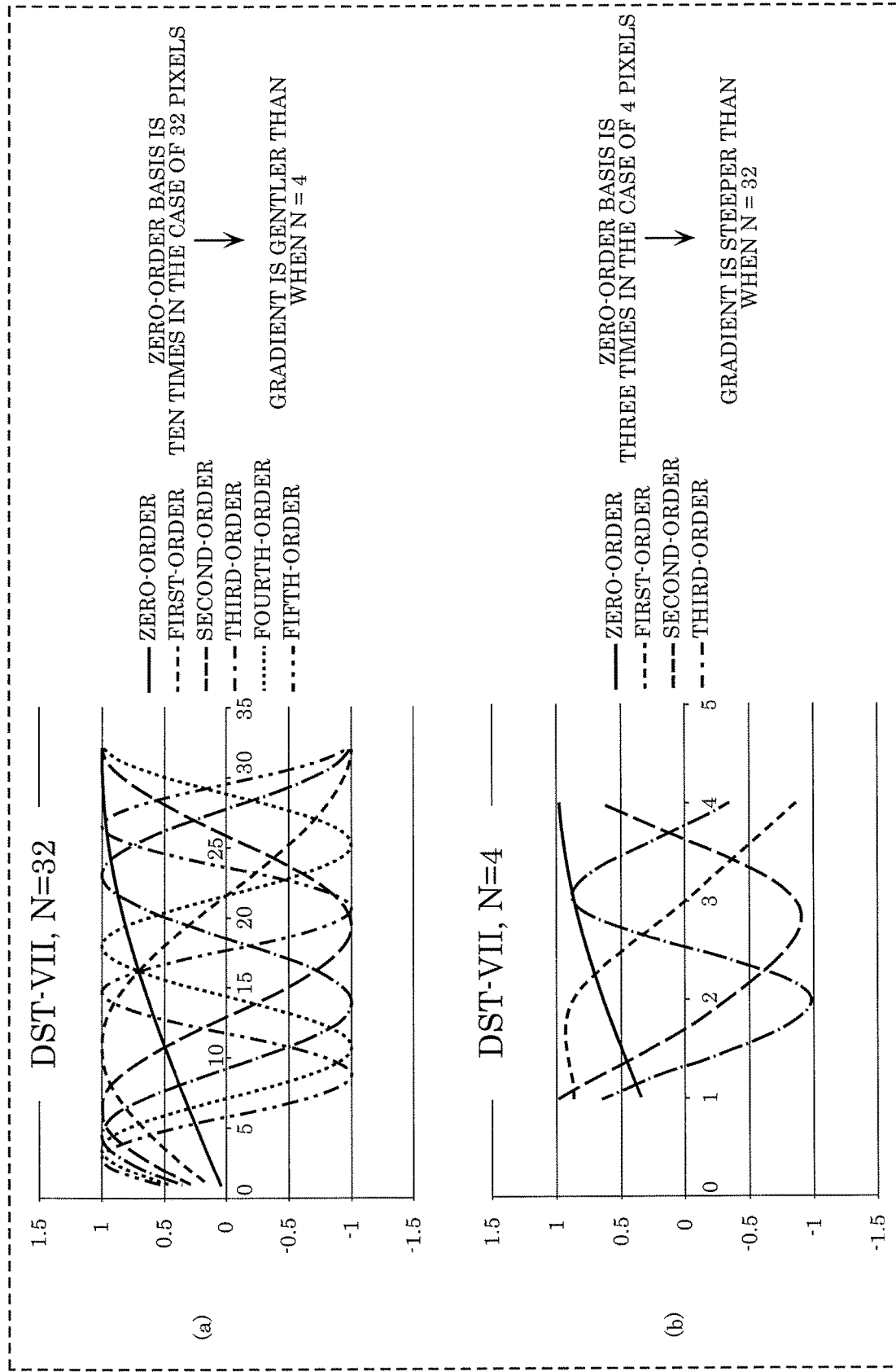
FIG. 41 is a diagram indicating basis gradients that vary depending on block sizes.

FIG. 41 is a diagram indicating basis gradients that vary depending on block sizes. It is to be noted that the horizontal axis of each graph in FIG. 41 indicates positions on a one-dimensional space, and the vertical axis thereof indicates basis values (that is, amplitudes).

As indicated in (a) of FIG. 41, the amplitude of a zero-order basis in DST-VII in the case of a block having a block size of N=32 increases to about ten times from position n=1 to position n=32 in the one-dimensional space. On the contrary, the amplitude of a zero-order basis in DST-VII in the case of a block having a block size of N=4 increases to about three times from position n=1 to position n=4 in the one-dimensional space.

Accordingly, when the block sizes are different, a basis gradient in a larger block is gentler than a basis gradient in a smaller block even when the same basis is used to transform the respective two blocks.

In other words, as described above, when loop filter 120 performs in-block filtering, it is possible to provide a greater effect of increasing the possibility of error reduction in a block in which a low-order basis gradient in orthogonal transform is sharp, that is, in a smaller block.

In addition, even in the case of a block having a large block size, when the correlation between pixels in the block have a weak distance dependency or a weak direction dependency, it is possible to increase the possibility of error reduction by means of loop filter 120 performing in-block filtering. For example, an intra prediction direction affects a distance dependency or a direction dependency of the correlation between pixels. The distance dependency is a property that the correlation between the pixel values of pixels is higher when the distance between the two pixels is shorter. The direction dependency is a property that the correlation between the pixel values of pixels according to the direction from one of the pixels to the other pixel and the correlation between the pixel values of the pixels according to the opposite direction vary. In view of this, loop filter 120 may change the pixel value of a pixel having a large error by performing in-block filtering according to an intra prediction direction.

[Mouting Example]

Figure 42:
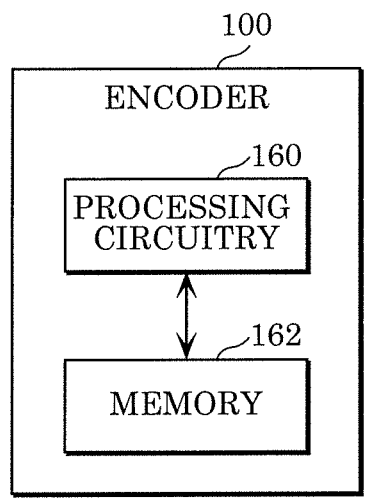
FIG. 42 is a block diagram indicating a mounting example of an encoder according to each of the embodiments.

FIG. 42 is a block diagram indicating a mounting example of encoder 100 according to each of the embodiments. Encoder 100 includes processing circuitry 160 and memory 162. For example, a plurality of constituent elements of encoder 100 indicated in FIG. 1 are mounted on processing circuitry 160 and memory 162 indicated in FIG. 42.

Processing circuitry 160 is circuitry for performing information processing and accessible to memory 162. For example, processing circuitry 160 is an exclusive or general electronic circuit for encoding video. Processing circuitry 160 may be a processor such as a CPU. Alternatively, processing circuitry 160 may be an assembly of a plurality of electronic circuits. In addition, for example, processing circuitry 160 may take the roles of two or more of the constituent elements other than the constituent elements for storing information among the plurality of constituent elements of encoder 100 indicated in FIG. 1.

Memory 162 is exclusive memory or general memory in which information used by processing circuitry 160 to encode video is stored. Memory 162 may be an electronic circuit, or may be connected to processing circuitry 160. In addition, memory 162 may be included in processing circuitry 160. Alternatively, memory 162 may be an assembly of a plurality of electronic circuits. In addition, memory 162 may be a magnetic disc, an optical disc, or the like, or may be represented as storage, a recording medium, or the like. In addition, memory 162 may be non-volatile memory, or volatile memory.

For example, in memory 162, video to be encoded may be stored or a bitstream corresponding to encoded image information may be stored. In addition, a program that is executed by processing circuitry 160 to encode video may be stored in memory 162.

In addition, for example, memory 162 may take the roles of two or more of the constituent elements other than the constituent elements for storing information among the plurality of constituent elements of encoder 100 indicated in FIG. 1. More specifically, memory 162 may take the roles of block memory 118 and frame memory 122 indicated in FIG. 1. More specifically, processed sub-blocks, processed blocks, and processed pictures, etc. may be stored in memory 162.

It is to be noted that, in encoder 100, not all the plurality of constituent elements indicated in FIG. 1, etc. may be mounted, or not all the plurality of processes described above may be performed. Part of the plurality of constituent elements indicated in FIG. 1, etc. may be included in one or more other devices, and part of the plurality of processes described above may be performed by the one or more other devices. In encoder 100, part of the plurality of constituent elements indicated in FIG. 1, etc. may be mounted, and a video can be efficiently processed with a small coding amount by means of part of the above-described processes being executed.

Figure 43:
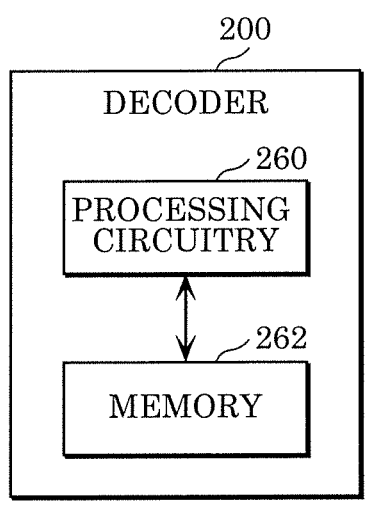
FIG. 43 is a block diagram indicating a mounting example of a decoder according to each of the embodiments.

FIG. 43 is a block diagram indicating a mounting example of decoder 200 according to each of the embodiments. Decoder 200 includes processing circuitry 260 and memory 262. For example, a plurality of constituent elements of decoder 200 indicated in FIG. 10 are mounted as processing circuitry 260 and memory 262 indicated in FIG. 43.

Processing circuitry 260 is circuitry for performing information processing and accessible to memory 262. For example, processing circuitry 260 is an exclusive or general electronic circuit for decoding video. Processing circuitry 260 may be a processor such as a CPU. Alternatively, processing circuitry 260 may be an assembly of a plurality of electronic circuits. In addition, for example, processing circuitry 260 may take the roles of two or more of the constituent elements other than the constituent elements for storing information among the plurality of constituent elements of decoder 200 indicated in FIG. 10.

Memory 262 is exclusive memory or general memory in which information used by processing circuitry 260 to decode video is stored. Memory 262 may be an electronic circuit, or may be connected to processing circuitry 260. In addition, memory 262 may be included in processing circuitry 260. Alternatively, memory 262 may be an assembly of a plurality of electronic circuits. In addition, memory 262 may be a magnetic disc, an optical disc, or the like, or may be represented as storage, a recording medium, or the like. In addition, memory 262 may be non-volatile memory, or volatile memory.

For example, in memory 262, a bitstream corresponding to an encoded video may be stored or a video corresponding to a decoded bitstream may be stored. In addition, a program that is executed by processing circuitry 260 to decode a video may be stored in memory 262.

In addition, for example, memory 262 may take the roles of two or more of the constituent elements other than the constituent elements for storing information among the plurality of constituent elements of decoder 200 indicated in FIG. 10. More specifically, memory 262 may take the roles of block memory 210 and frame memory 214 indicated in FIG. 10. More specifically, processed sub-blocks, processed blocks, and processed pictures, etc. may be stored in memory 262.

It is to be noted that, in decoder 200, not all the plurality of constituent elements indicated in FIG. 10, etc. may be mounted, or not all the plurality of processes described above may be performed. Part of the plurality of constituent elements indicated in FIG. 10, etc. may be included in one or more other devices, and part of the plurality of processes described above may be performed by the one or more other devices. In decoder 200, part of the plurality of constituent elements indicated in FIG. 10, etc. may be mounted, and a video can be efficiently processed with a small coding amount by means of part of the above-described processes being executed.

[Supplement]

Encoder 100 and decoder 200 according to each of the embodiments may be used as an image encoder and an image decoder, or may be used as a video encoder and a video decoder. Alternatively, each of encoder 100 and decoder 200 can be used as an inter prediction apparatus. In other words, encoder 100 and decoder 200 may correspond only to inter predictor 126 and inter predictor 218, respectively.

In addition, although a prediction block is encoded or decoded or a current block to be encoded or a current block to be decoded in each of the embodiments, current blocks to be encoded or current blocks to be decoded are not limited to a prediction block, and may be a sub-block, or another block.

In addition, in each of the embodiments, each of the constituent elements may be configured with exclusive hardware, or may be implemented by executing a software program suitable for each constituent element. Each constituent element may be implemented by means of a program executor that is a CPU, a processor, or the like reading and executing a software program stored in a recording medium that is a hard disc, a semiconductor memory, or the like.

More specifically, each of encoder 100 and decoder 200 may include processing circuitry and storage electrically connected to the processing circuitry and accessible from the processing circuitry.

The processing circuitry includes at least one of the exclusive hardware and the program executor. In addition, when the processing circuitry includes the program executor, the storage stores a software program that is executed by the program executor.

Here, the software which implements encoder 100, decoder 200, etc., according to each of the embodiments is a program as indicated below.

More specifically, this program causes a computer to execute processing according to any of the flowcharts in FIGS. 5B, 5D, 11, 13, 14, 16, 19, 20, 22, and 28.

The respective constituent elements may be circuits as described above. These circuits may be configured with a single circuit as a whole, or may be respectively configured with separate circuits. Alternatively, each constituent element may be implemented as a general processor, or may be implemented as an exclusive processor.

In addition, the processing that is executed by a particular constituent element may be executed by another constituent element. In addition, the processing execution order may be modified, or a plurality of processes may be executed in parallel. In addition, an encoder and decoder may include encoder 100 and decoder 200.

In addition, the ordinal numbers such as "first" and "second" used for explanation may be arbitrarily changed. A new ordinal number may be attached to a constituent element, or an ordinal number attached to a constituent element may be removed.

Although some aspects of encoder 100 and decoder 200 have been explained based on the above embodiments, aspects of encoder 100 and decoder 200 are not limited to these embodiments. The scope of the aspects of encoder 100 and decoder 200 may encompass embodiments obtainable by adding, to any of these embodiments, various kinds of modifications that a person skilled in the art would arrive at without deviating from the scope of the present disclosure and embodiments configurable by arbitrarily combining constituent elements in different embodiments.

Embodiment 8

In each of the embodiments, each of the functional blocks can normally be implemented as an MPU, memory, or the like. In addition, the processing performed by each functional block is normally implemented by a program executor such as a processor reading and executing software (a program) recorded on a recording medium such as a ROM. The software may be distributed by download, or the like, or may be recorded on a recording medium such as a semiconductor memory and then be distributed. It is to be noted that each functional block can naturally be implemented as hardware (an exclusive circuit).

In addition, the processing described in each embodiment may be implemented by performing centralized processing using a single apparatus (system), or by performing distributed processing using a plurality of apparatuses. In addition, one or more processors may execute the program. In other words, any one of centralized processing and distributed processing may be performed.

Aspects of the present disclosure are not limited to the above examples, various modifications are possible, and these modifications, etc. may be encompassed in aspects of the present disclosure.

Furthermore, here, application examples of a video encoding method (image encoding method) or a video decoding method (image decoding method) indicated in each of the embodiments and a system using the application examples are described. The system is characterized by including an image encoder which performs an image encoding method, an image decoder which performs an image decoding method, and an image encoder and decoder which performs both an image encoding method and an image decoding method. The other constituent elements in the system can be appropriately modified according to cases.

Usage Examples

Figure 44:
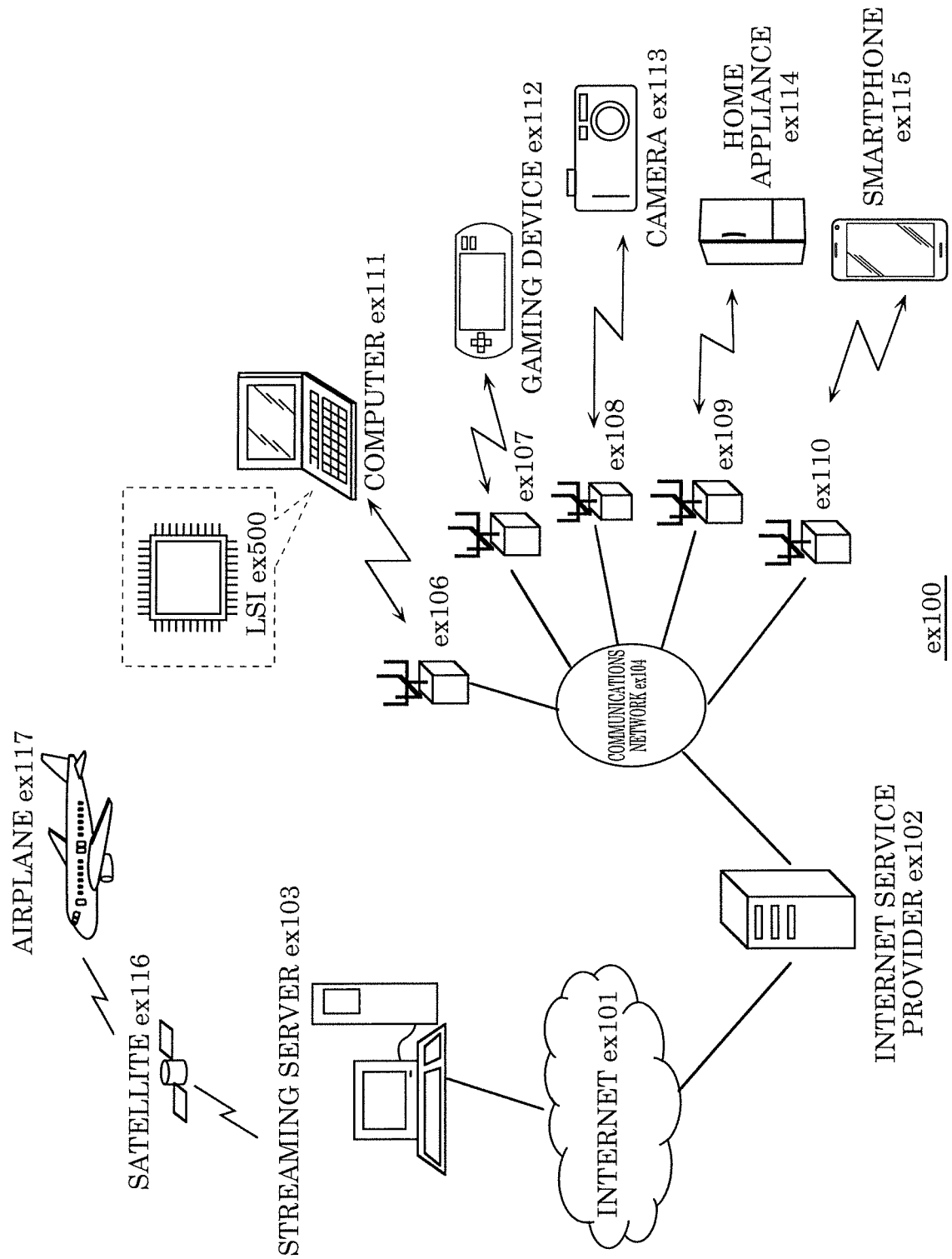
FIG. 44 illustrates an overall configuration of a content providing system for implementing a content distribution service.

FIG. 44 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert 11.264 to 11.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 45:
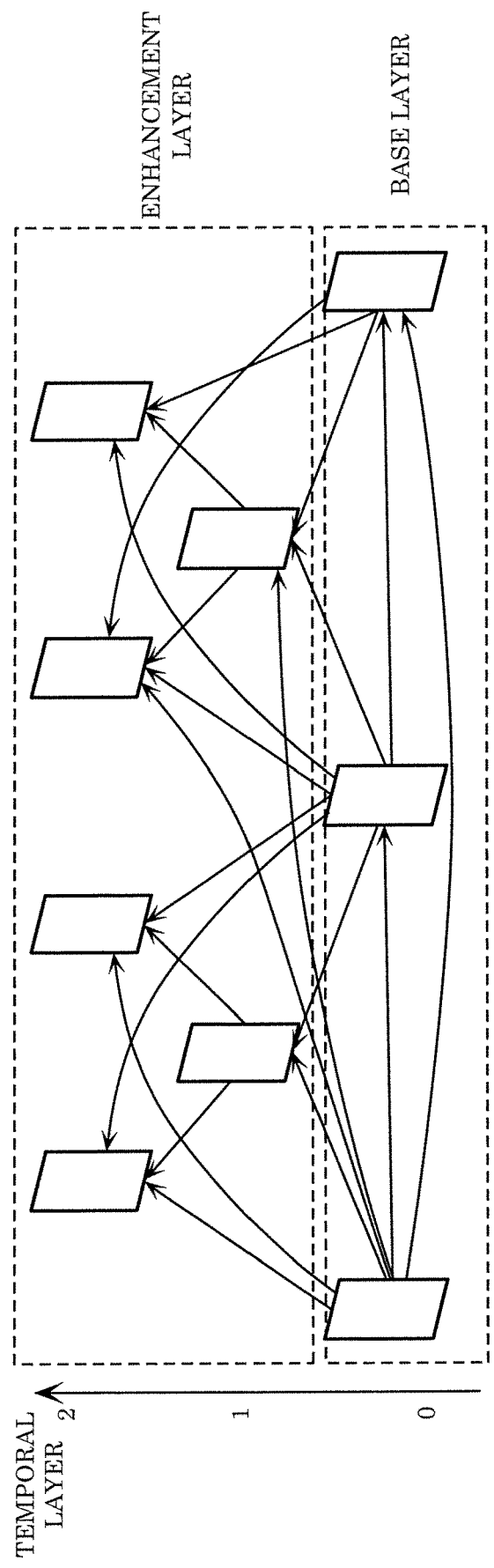
FIG. 45 illustrates one example of an encoding structure in scalable encoding.

The switching of content will be described with reference to a scalable stream, illustrated in FIG. 45, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 45. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 46:
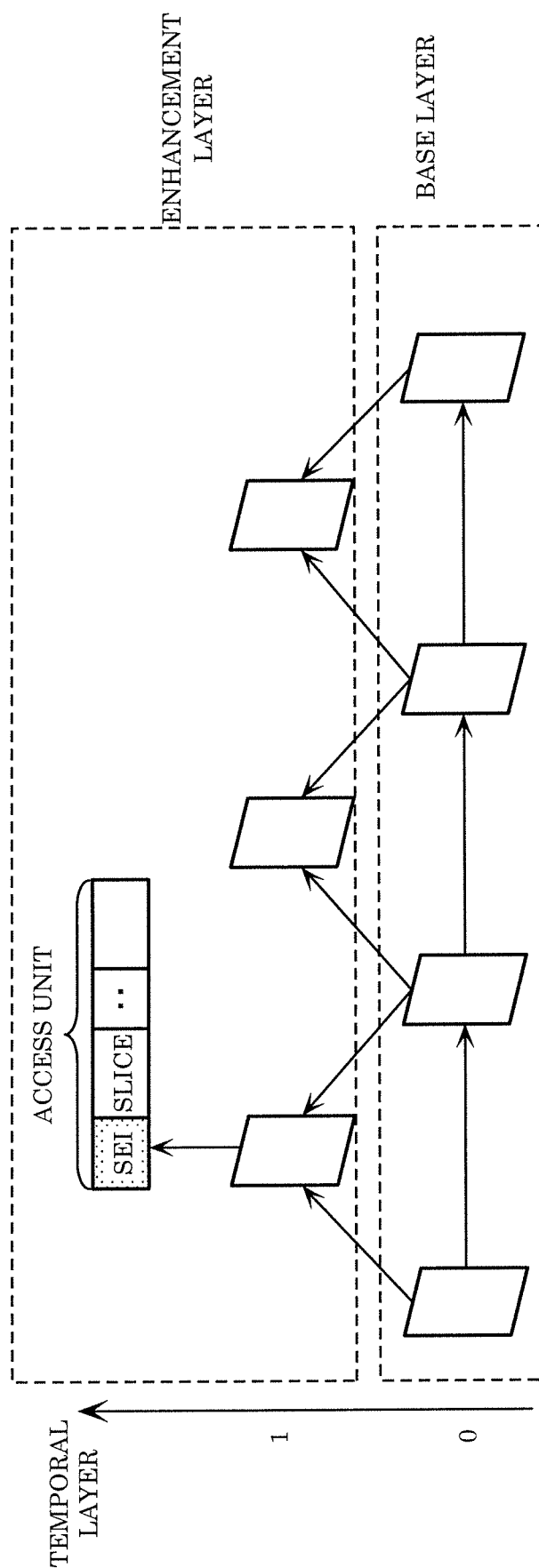
FIG. 46 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 46, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 47:
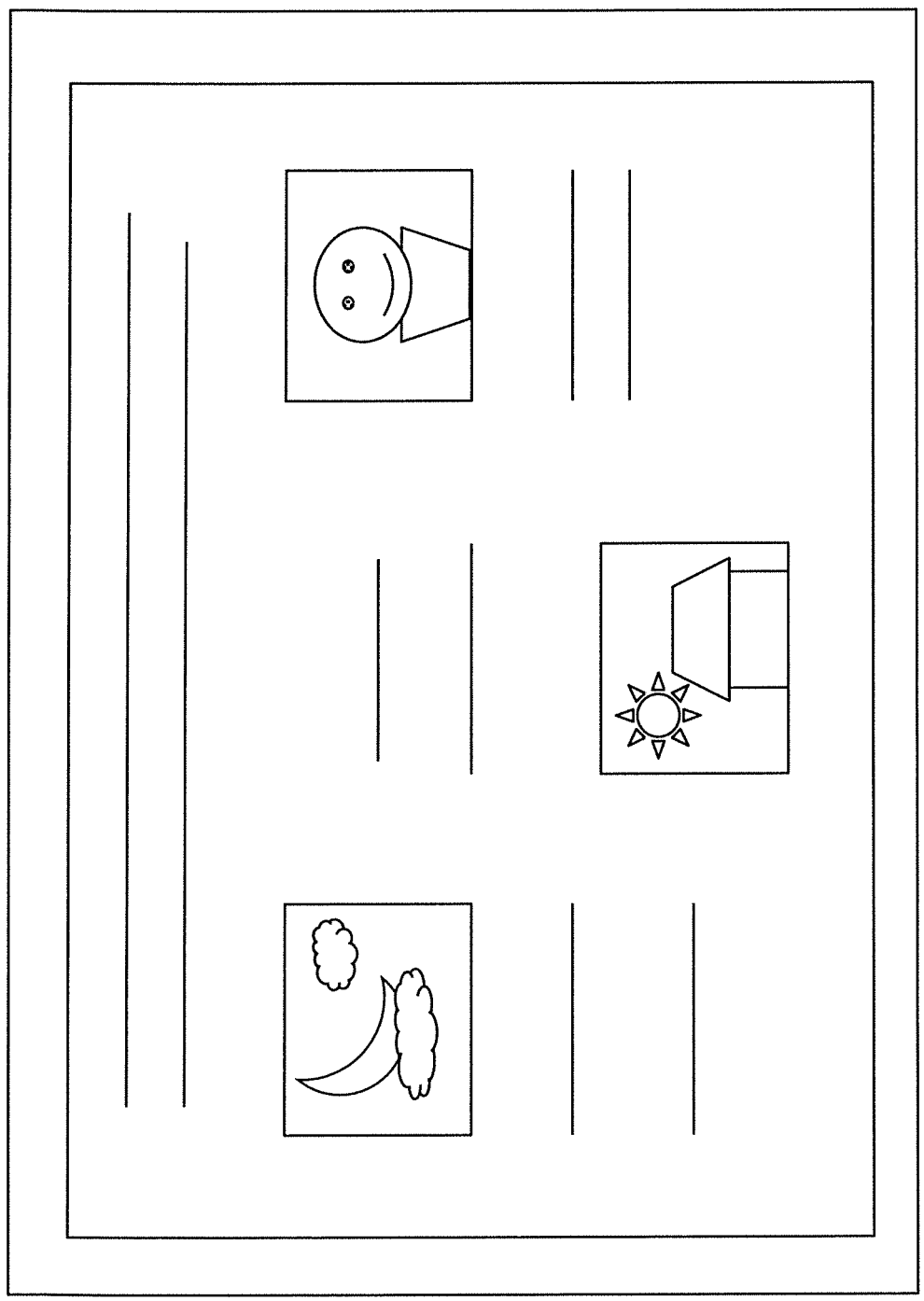
FIG. 47 illustrates an example of a display screen of a web page.
Figure 48:
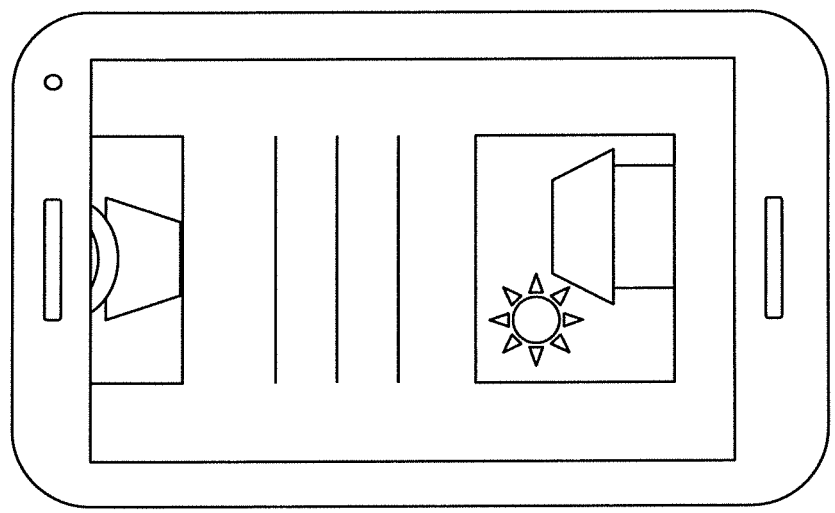
FIG. 48 illustrates an example of a display screen of a web page.

FIG. 47 illustrates an example of a display screen of a web page on, for example, computer ex111. FIG. 48 illustrates an example of a display screen of a web page on, for example, smartphone ex115. As illustrated in FIG. 47 and FIG. 48, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is up dated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person.

Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 49:
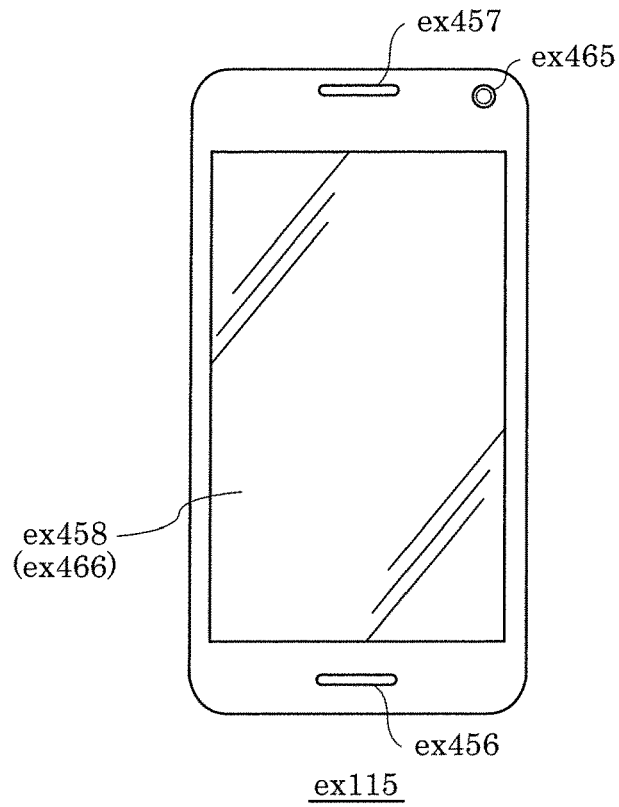
FIG. 49 illustrates one example of a smartphone.
Figure 50:
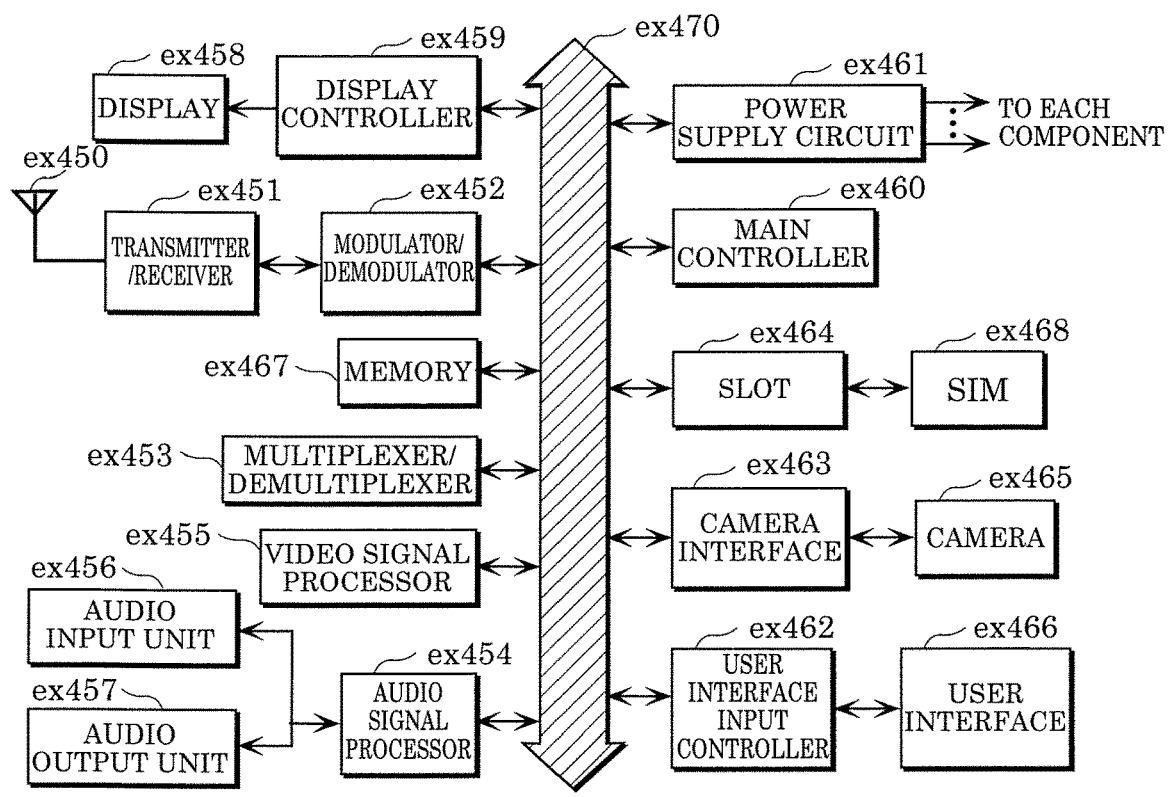
FIG. 50 is a block diagram illustrating a configuration example of a smartphone.

FIG. 49 illustrates smartphone ex115. FIG. 50 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470.

Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

What is claimed is:

1. A decoder comprising:
   a memory; and
   processing circuitry, which is coupled to the memory and which, in operation, changes values of pixels in a first block and a second block to filter a boundary between the first block and the second block, using clipping such that change amounts of the respective values are within respective clip widths, the pixels in the first block and the second block being arranged along a straight line across the boundary;
   wherein the pixels in the first block include a first pixel located at a first position, and the pixels in the second block include a second pixel located at a second position corresponding to the first position with respect to the boundary;
   wherein the clip widths include a first clip width and a second clip width corresponding to the first pixel and the second pixel, respectively;
   wherein the first clip width is different from the second clip width;
   wherein the pixels in the first block include a first additional pixel located at a first additional position and the pixels in the second block include a second additional pixel located at a second additional position which corresponds to the first additional position with respect to the boundary;

wherein the clip widths include a first additional clip width and a second additional clip width corresponding to the first additional pixel and the second additional pixel, respectively; and wherein the first additional clip width is same as the second additional clip width.

\* \* \* \* \*